United States Patent
Hsu et al.

(10) Patent No.: US 7,606,311 B2
(45) Date of Patent: Oct. 20, 2009

(54) MACROBLOCK INFORMATION SIGNALING FOR INTERLACED FRAMES

(75) Inventors: Pohsiang Hsu, Redmond, WA (US); Sridhar Srinivasan, Redmond, WA (US); Chih-Lung Lin, Redmond, WA (US); Thomas W. Holcomb, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 965 days.

(21) Appl. No.: 10/934,929

(22) Filed: Sep. 2, 2004

(65) Prior Publication Data

US 2005/0053145 A1    Mar. 10, 2005

Related U.S. Application Data

(60) Provisional application No. 60/501,081, filed on Sep. 7, 2003.

(51) Int. Cl.
    *H03M 7/42*      (2006.01)
    *H04N 7/50*      (2006.01)
    *H04N 7/36*      (2006.01)
    *H04N 7/28*      (2006.01)

(52) U.S. Cl. ............. 375/240.23; 375/240.14; 375/240.16; 375/240.22

(58) Field of Classification Search ............. 375/240.12, 375/240.16, 240.24, 240.23; 341/50, 67
See application file for complete search history.

(56) References Cited

U.S. PATENT DOCUMENTS

| | | | |
|---|---|---|---|
| 4,454,546 A | 6/1984 | Mori | |
| 4,691,329 A | 9/1987 | Juri et al. | |
| 4,796,087 A | 1/1989 | Guichard et al. | |
| 4,800,432 A | 1/1989 | Barnett et al. | |
| 4,849,812 A | 7/1989 | Borgers et al. | |

(Continued)

FOREIGN PATENT DOCUMENTS

EP      0 279 053      8/1988

(Continued)

OTHER PUBLICATIONS

Chen et al., "Optimizing Intra/Inter Coding Mode Decisions," Proc. Int'l Symp. On Multimedia Info. Processing, pp. 561-568 (Dec. 1997).

(Continued)

*Primary Examiner*—Mehrdad Dastouri
*Assistant Examiner*—David N Werner
(74) *Attorney, Agent, or Firm*—Klarquist Sparkman, LLP

(57) ABSTRACT

A decoder decodes skipped macroblocks of an interlaced frame. Skipped macroblocks use exactly one motion vector and have no motion vector differential information, and lack residual information. The skipped macroblock signal indicates one-motion-vector coding. The skipped macroblock signal can be a compressed bitplane (in a selected bitplane coding mode) sent at frame layer in a bitstream, or an individual bit sent at macroblock layer. In another aspect, an encoder jointly encodes motion compensation type and field/ frame coding type for a macroblock in an interlaced P-frame. The encoder also can jointly encode other information for the macroblock (e.g., the presence of a differential motion vector). A decoder decodes a joint code (e.g., a variable length code in a variable length code table) to obtain both motion compensation type and field/frame coding type (and potentially other information) for the macroblock.

25 Claims, 35 Drawing Sheets

U.S. PATENT DOCUMENTS

| | | | |
|---|---|---|---|
| 4,999,705 A | 3/1991 | Puri | |
| 5,021,879 A | 6/1991 | Vogel | |
| 5,068,724 A | 11/1991 | Krause et al. | |
| 5,089,887 A | 2/1992 | Robert et al. | |
| 5,091,782 A | 2/1992 | Krause et al. | |
| 5,111,292 A | 5/1992 | Kuriacose et al. | |
| 5,117,287 A | 5/1992 | Koike et al. | |
| 5,155,594 A | 10/1992 | Bernstein et al. | |
| 5,157,490 A | 10/1992 | Kawai et al. | |
| 5,193,004 A | 3/1993 | Wang et al. | |
| 5,227,878 A | 7/1993 | Puri et al. | |
| 5,258,836 A | 11/1993 | Murata | |
| 5,274,453 A | 12/1993 | Maeda | |
| 5,287,420 A | 2/1994 | Barrett | |
| 5,317,397 A | 5/1994 | Odaka et al. | |
| 5,319,463 A | 6/1994 | Hongu et al. | |
| 5,343,248 A | 8/1994 | Fujinami | |
| 5,347,308 A | 9/1994 | Wai | |
| 5,376,968 A | 12/1994 | Wu et al. | |
| 5,376,971 A | 12/1994 | Kadono et al. | |
| 5,379,351 A | 1/1995 | Fandrianto et al. | |
| 5,400,075 A | 3/1995 | Savatier | |
| 5,412,435 A | 5/1995 | Nakajima | |
| 5,422,676 A | 6/1995 | Herpel et al. | |
| 5,426,464 A | 6/1995 | Casavant et al. | |
| 5,448,297 A | 9/1995 | Alattar et al. | |
| 5,453,799 A | 9/1995 | Yang et al. | |
| 5,461,421 A | 10/1995 | Moon | |
| 5,465,118 A | 11/1995 | Hancock et al. | |
| 5,467,086 A | 11/1995 | Jeong | |
| 5,477,272 A | 12/1995 | Zhang et al. | |
| RE35,158 E | 2/1996 | Sugiyama | |
| 5,510,840 A | 4/1996 | Yonemitsu et al. | |
| 5,517,327 A | 5/1996 | Nakatani et al. | |
| 5,539,466 A | 7/1996 | Igarashi et al. | |
| 5,544,286 A | 8/1996 | Laney | |
| 5,546,129 A | 8/1996 | Lee | |
| 5,550,541 A | 8/1996 | Todd | |
| 5,552,832 A | 9/1996 | Astle | |
| 5,594,504 A | 1/1997 | Ebrahimi | |
| 5,598,215 A | 1/1997 | Watanabe | |
| 5,598,216 A | 1/1997 | Lee | |
| 5,617,144 A | 4/1997 | Lee | |
| 5,619,281 A | 4/1997 | Jung | |
| 5,648,819 A | 7/1997 | Tranchard | |
| 5,666,461 A | 9/1997 | Igarashi et al. | |
| 5,668,608 A | 9/1997 | Lee | |
| 5,668,932 A | 9/1997 | Laney | |
| 5,687,097 A | 11/1997 | Mizusawa et al. | |
| 5,689,306 A | 11/1997 | Jung | |
| 5,692,063 A | 11/1997 | Lee et al. | |
| 5,701,164 A | 12/1997 | Kato | |
| 5,748,789 A | 5/1998 | Lee et al. | |
| 5,764,814 A | 6/1998 | Chen et al. | |
| 5,767,898 A | 6/1998 | Urano et al. | |
| 5,784,175 A | 7/1998 | Lee | |
| 5,796,438 A | 8/1998 | Hosono | |
| 5,835,144 A | 11/1998 | Matsumura et al. | |
| 5,835,149 A | 11/1998 | Astle | |
| 5,946,042 A | 8/1999 | Kato | |
| 5,946,043 A | 8/1999 | Lee et al. | |
| 5,959,673 A | 9/1999 | Lee et al. | |
| 5,970,173 A | 10/1999 | Lee et al. | |
| 5,973,743 A | 10/1999 | Han | |
| 5,974,184 A | 10/1999 | Eifrig | |
| 5,982,437 A | 11/1999 | Okazaki et al. | |
| 5,982,438 A | 11/1999 | Lin et al. | |
| 6,026,195 A | 2/2000 | Eifrig et al. | |
| 6,035,070 A | 3/2000 | Moon et al. | |
| 6,040,863 A | 3/2000 | Kato | |
| 6,052,150 A | 4/2000 | Kikuchi | |
| 6,094,225 A | 7/2000 | Han | |
| RE36,822 E | 8/2000 | Sugiyama | |
| 6,122,318 A | 9/2000 | Yamaguchi et al. | |
| 6,148,033 A | 11/2000 | Pearlstein et al. | |
| 6,148,109 A | 11/2000 | Boon et al. | |
| 6,154,495 A | 11/2000 | Yamaguchi et al. | |
| 6,192,081 B1 | 2/2001 | Chiang et al. | |
| 6,208,761 B1 | 3/2001 | Passagio et al. | |
| 6,215,905 B1 | 4/2001 | Lee et al. | |
| 6,236,806 B1 | 5/2001 | Kojima et al. | |
| RE37,222 E | 6/2001 | Yonemitsu et al. | |
| 6,243,418 B1 | 6/2001 | Kim | |
| 6,271,885 B2 | 8/2001 | Sugiyama | |
| 6,275,528 B1 | 8/2001 | Isozaki et al. | |
| 6,275,531 B1 | 8/2001 | Li | |
| 6,292,585 B1 | 9/2001 | Yamaguchi et al. | |
| 6,324,216 B1 | 11/2001 | Igarashi et al. | |
| 6,351,563 B1 | 2/2002 | Kim et al. | |
| 6,408,029 B1 | 6/2002 | McVeigh et al. | |
| 6,496,601 B1 | 12/2002 | Migdal et al. | |
| 6,563,953 B2 | 5/2003 | Lin et al. | |
| 6,573,905 B1 | 6/2003 | MacInnis et al. | |
| 6,614,442 B1 | 9/2003 | Ouyang et al. | |
| 6,683,987 B1 | 1/2004 | Sugahara | |
| 6,704,360 B2 | 3/2004 | Haskell et al. | |
| 6,735,345 B2 | 5/2004 | Lin et al. | |
| 6,765,963 B2 | 7/2004 | Karczewicz et al. | |
| 6,778,606 B2 | 8/2004 | Kang et al. | |
| 6,785,331 B1 | 8/2004 | Jozawa et al. | |
| 6,795,584 B2 | 9/2004 | Karczewicz et al. | |
| 6,819,714 B2 | 11/2004 | Yamada et al. | |
| 6,862,402 B2 | 3/2005 | Kim | |
| 6,920,175 B2 | 7/2005 | Karczewicz et al. | |
| 6,975,680 B2 | 12/2005 | Demos | |
| 7,054,494 B2 | 5/2006 | Lin et al. | |
| 7,127,114 B2 | 10/2006 | Lin et al. | |
| 2002/0110196 A1* | 8/2002 | Nguyen et al. | 375/240.22 |
| 2002/0114388 A1 | 8/2002 | Ueda et al. | |
| 2003/0099292 A1 | 5/2003 | Wang et al. | |
| 2003/0113026 A1 | 6/2003 | Srinivasan et al. | |
| 2003/0138150 A1 | 7/2003 | Srinivasan | |
| 2003/0142748 A1 | 7/2003 | Tourapis | |
| 2003/0156643 A1 | 8/2003 | Song | |
| 2003/0179826 A1 | 9/2003 | Jeon | |
| 2003/0202601 A1* | 10/2003 | Bjontegaard et al. | 375/240.22 |
| 2004/0136457 A1 | 7/2004 | Funnell et al. | |
| 2004/0141651 A1 | 7/2004 | Hara et al. | |
| 2004/0179601 A1* | 9/2004 | Kobayashi et al. | 375/240.12 |
| 2005/0053141 A1* | 3/2005 | Holcomb et al. | 375/240.16 |
| 2005/0135484 A1 | 6/2005 | Lee | |
| 2005/0152457 A1 | 7/2005 | Regunathan | |
| 2005/0254584 A1 | 11/2005 | Kim et al. | |

FOREIGN PATENT DOCUMENTS

| | | |
|---|---|---|
| EP | 0 588 653 | 3/1994 |
| EP | 0 614 318 | 9/1994 |
| EP | 0 625 853 | 11/1994 |
| EP | 0 771 114 | 5/1997 |
| EP | 0 786 907 | 7/1997 |
| EP | 0 830 029 | 3/1998 |
| JP | 61205086 | 9/1986 |
| JP | 3001688 | 1/1991 |
| JP | 03-238970 | 10/1991 |
| JP | 6078295 | 3/1994 |
| JP | 06-225279 | 8/1994 |
| JP | 06-276481 | 9/1994 |
| JP | 06-276511 | 9/1994 |
| JP | 07-135660 | 5/1995 |
| JP | 7274171 | 10/1995 |
| JP | 08-140099 | 5/1996 |
| JP | 09-055936 | 2/1997 |
| JP | 09-322163 | 12/1997 |

| | | |
|---|---|---|
| JP | 2001-036908 | 2/2001 |
| JP | 6292188 | 10/2004 |
| WO | WO 03043347 A1 * | 5/2003 |
| WO | WO 2005/004491 | 1/2005 |

OTHER PUBLICATIONS

"DivX Multi Standard Video Encoder," 2 pp. (Downloaded from the World Wide Web on Jan. 24, 2006).

Joint Video Team (JVT) of ISO/IEC MPEG and ITU-T VCEG, "Joint Model No. 1, Revision 1 (JM-1r1)," JVT-A003r1, Pattaya, Thailand, 80 pp. (Dec. 2001).

Kim et al., "Low-Complexity Macroblock Mode Selection for H.264/AVC Encoders," IEEE Int. Conf. on Image Processing, vol. 2, pp. 765-768 (Oct. 2004).

Lainema et al., "Skip Mode Motion Compensation," Joint Video Team (JVT) of ISO/IEC MPEG & ITU-T VCEG (ISO/IEC JTC1/SC29/WG11 and ITU-T SG16 Q.6), Document JVT-C027, 8 pp. (May 2002).

Sullivan et al., "The H.264/AVC Advanced Video Coding Standard: Overview and Introduction to the Fidelity Range Extensions," 21 pp. (Aug. 2004).

Wien, "Variable Block-Size Transforms for Hybrid Video Coding," Dissertation, 182 pp. (Feb. 2004).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 19, 2002) [Downloaded from the World Wide Web on Aug. 8, 2003].

Joint Video Team of ISO/IEC MPEG and ITU-T VCEG, "Final Joint Committee Draft of Joint Video Specification (ITU-T Recommendation H.264, ISO/IEC 14496-10 AVC," 206 pp. (Aug. 2002).

U.S. Appl. No. 60/314,674, filed Dec. 17, 2001, Lee et al.

U.S. Appl. No. 60/488,710, filed Jul. 18, 2003, Srinivasan et al.

Hsu et al., "A Low Bit-Rate Video Codec Based on Two-Dimensional Mesh Motion Compensation with Adaptive Interpolation," *IEEE Transactions on Circuits and Systems for Video Technology*, vol. II, No. 1, pp. 111-117 (Jan. 2001).

ISO/IEC, "Coding of Moving Pictures and Associated Audio Information," JTCI/SC29/WG11, MPEG-4 Video Verification Model (Feb. 1998).

Reader, "History of MPEG Video Compression—Ver. 4.0," document marked Dec. 16, 2003.

Sjoberg et al., "Run-length Coding of Skipped Macroblocks," ITU-T SG16/Q.6 VCEG-M57, pp. 1-5 (Apr. 2001).

Wang et al., "Interlace Coding Tools for H.26L Video Coding," ITU-T SG16/Q.6 VCEG-O37, pp. 1-20 (Dec. 2001).

Printouts of FTP directories from http://ftp3.itu.ch , 8 pp. (downloaded from the World Wide Web on Sep. 20, 2005).

Gibson et al., *Digital Compression of Multimedia*, "Lossless Source Coding," Chapter 2, pp. 17-62 (Jan. 1998).

Gibson et al., *Digital Compression of Multimedia*, "Universal Lossless Source Coding," Chapter 3, pp. 63-112 (Jan. 1998).

Gibson et al., *Digital Compression of Multimedia*, "Multimedia Conferencing Standards," Chapter 10, pp. 309-362 (Jan. 1998).

Gibson et al., *Digital Compression of Multimedia*, "MPEG Compression," Chapter 11, pp. 363-418 (Jan. 1998).

ISO/IEC, "Information Technology—Coding of Audio-Visual Objects: Visual, ISO/IEC 14496-2, Committee Draft," 330 pp. (Mar. 1998).

ITU-T, "ITU-T Recommendation H.261: Video Codec for Audiovisual Services at $p \times 64$ kbits," 28 pp. (Mar. 1993).

ITU-T, "ITU-T Recommendation H.262: Information Technology—Generic Coding of Moving Pictures and Associated Audio Information: Video!," 218 pp. (Jul. 1995).

ITU-T, "ITU-T Recommendation H.263: Video Coding for Low Bit Rate Communication," 167 pp. (Feb. 1998).

Yu et al., "Two-Dimensional Motion Vector Coding for Low Bitrate Videophone Applications," *IEEE Proc. Int'l Conf. on Image Processing*, pp. 414-417 (Oct. 1995).

* cited by examiner

Figure 1, prior art
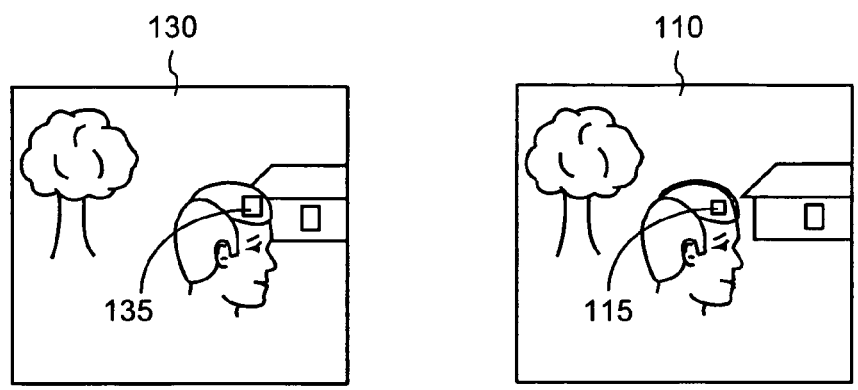
Figure 4, prior art
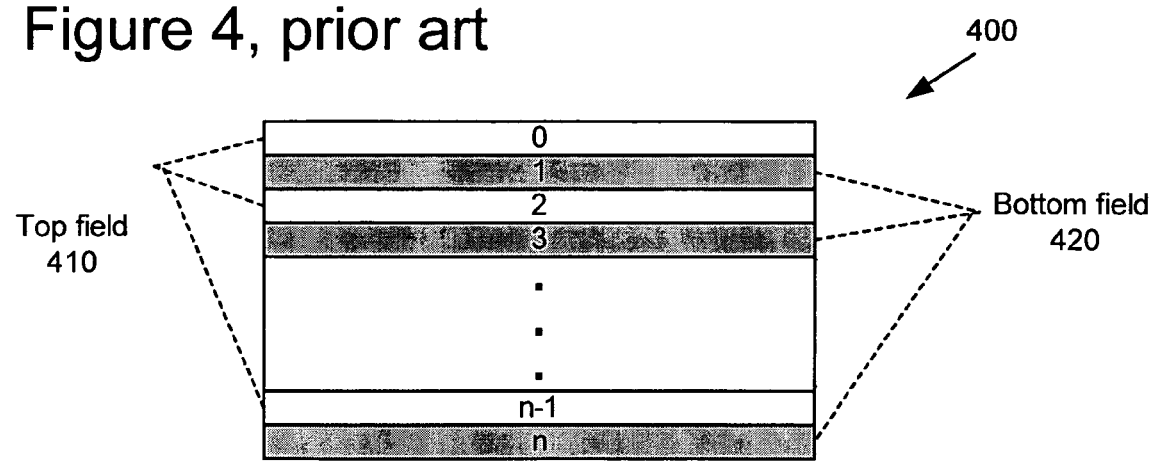

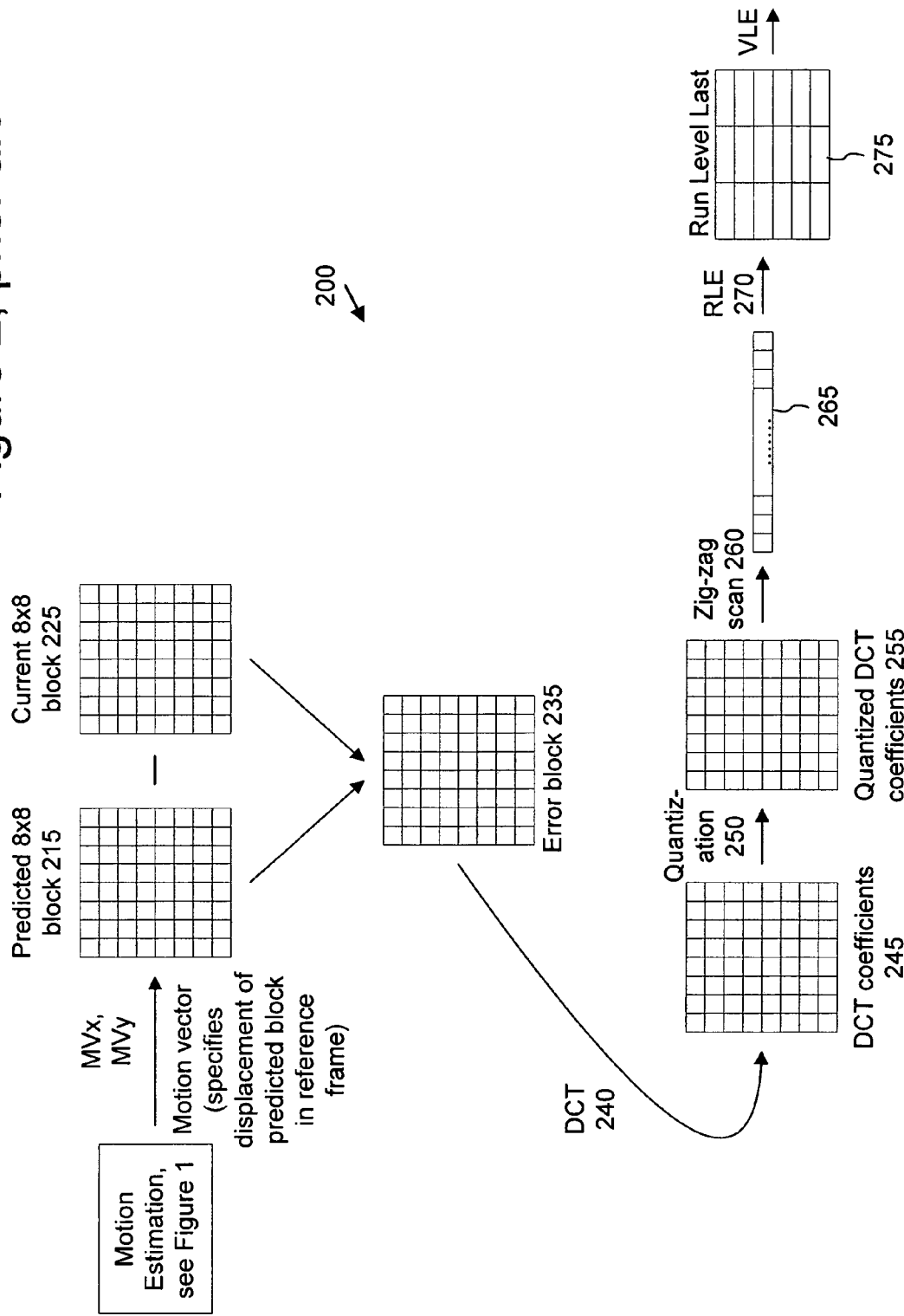

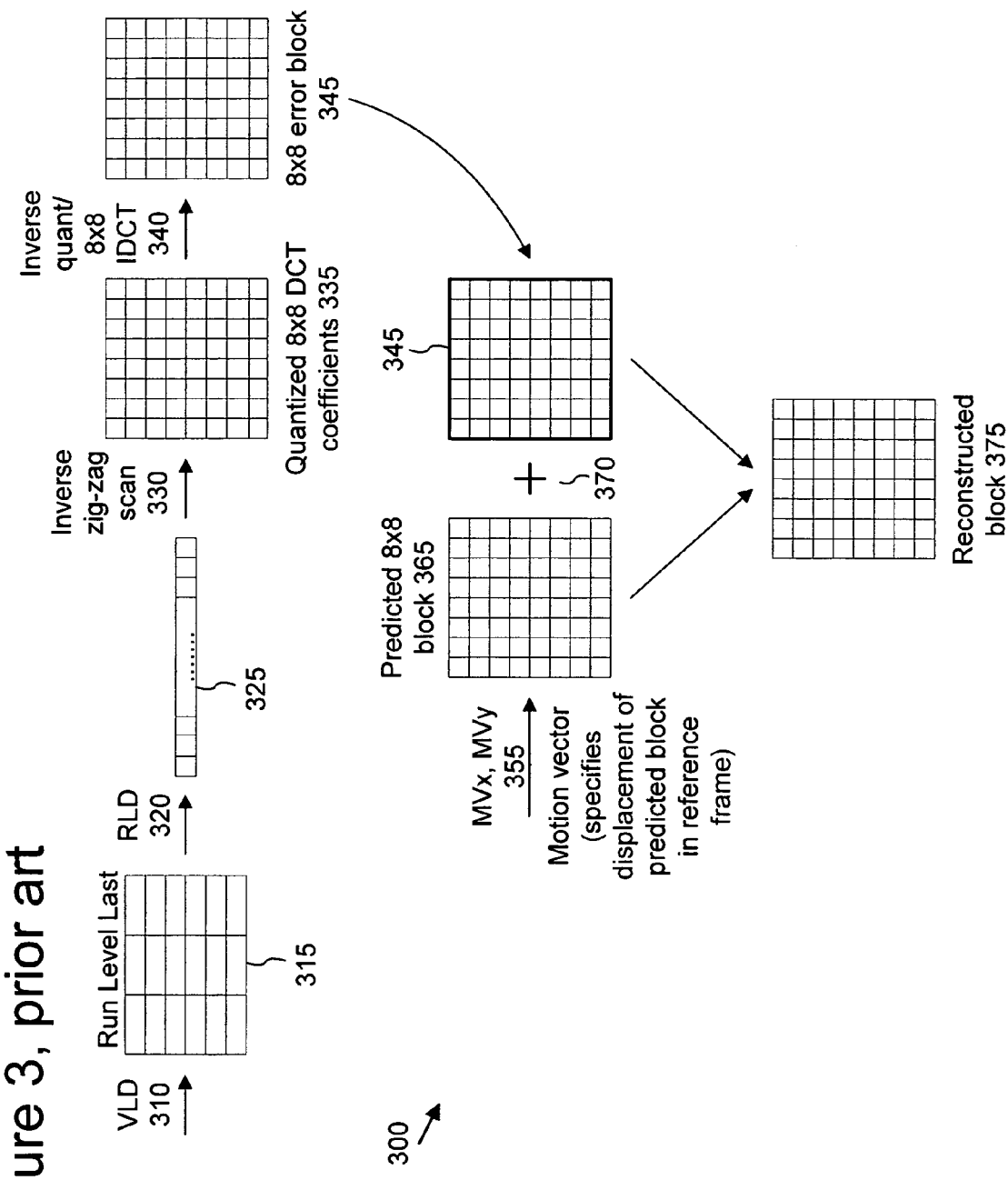
Figure 3, prior art

Figure 5A,
prior art
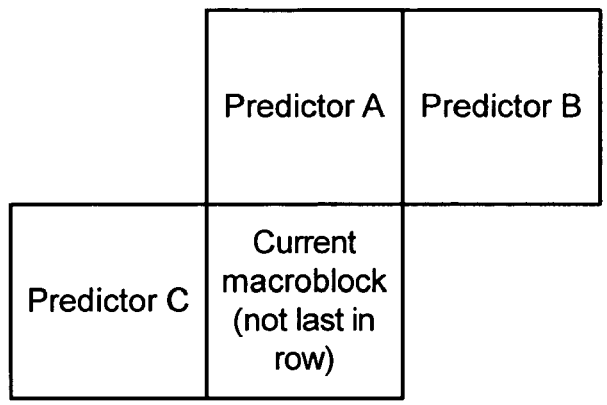
Figure 5B,
prior art
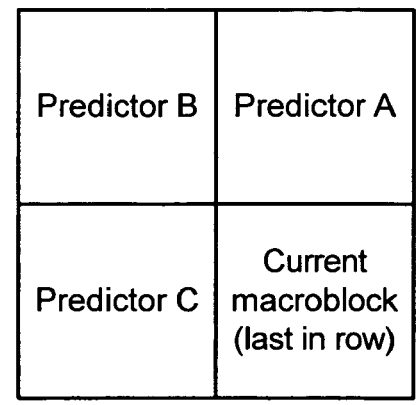
Figure 6A,
prior art
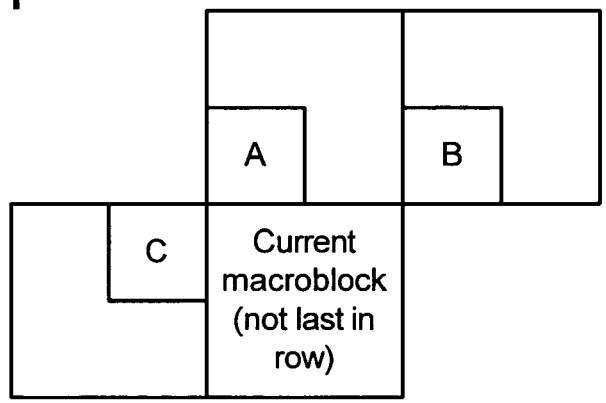
Figure 6B,
prior art
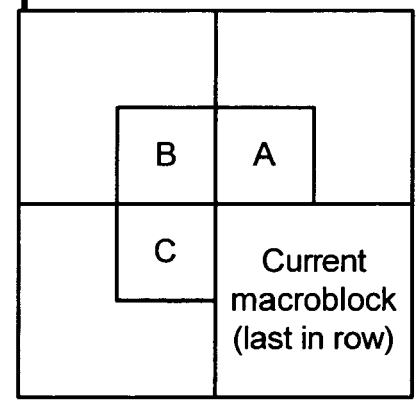

Figure 7A, prior art
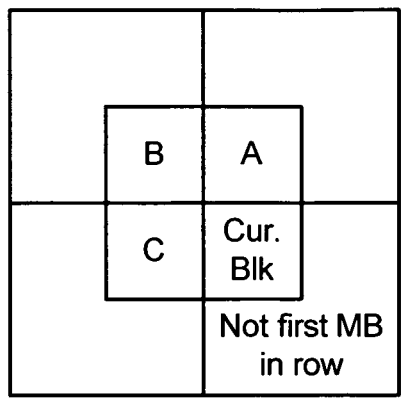
Figure 7B, prior art
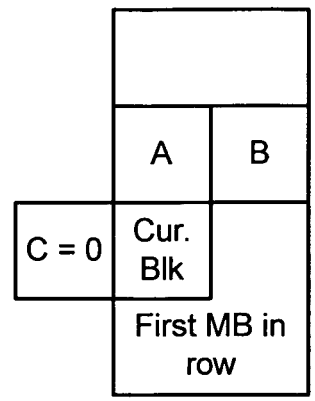
Figure 8A, prior art
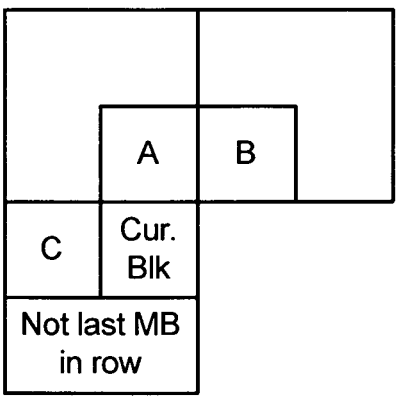
Figure 8B, prior art
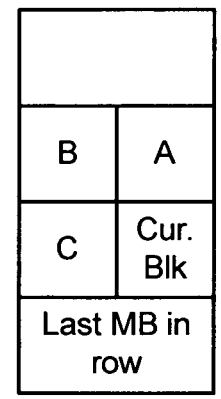
Figure 9, prior art
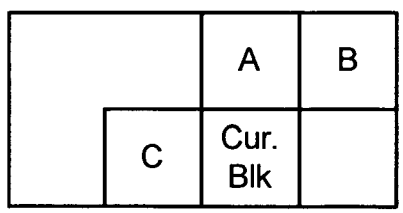
Figure 10, prior art
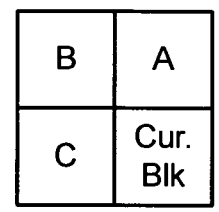

Figure 11, prior art

|                                                      |                                                      |
| ---------------------------------------------------- | ---------------------------------------------------- |
| Predictor A (compute average if field-coded)         | Predictor B (compute average if field-coded)         |
| Predictor C (compute average if field-coded)         | Current macroblock                                   |

Figure 12, prior art

|             |             |
| ----------- | ----------- |
|             |             |
| Predictor A | Predictor B |
|             |             |
| Predictor C | Current     |

Figure 13, prior art

|             |             |
| ----------- | ----------- |
| Predictor A | Predictor B |
|             |             |
| Predictor C | Current     |
|             |             |

```
Median3 (a, b, c) {
    if (a > b) {
        if (b > c)
            median = b
        else if (a > c)
            median = c
        else
            median = a
    }
    else if (a > c)
        median = a
    else if (b > c)
        median = c
    else median = b
    return median
}
```

Figure 15, prior art
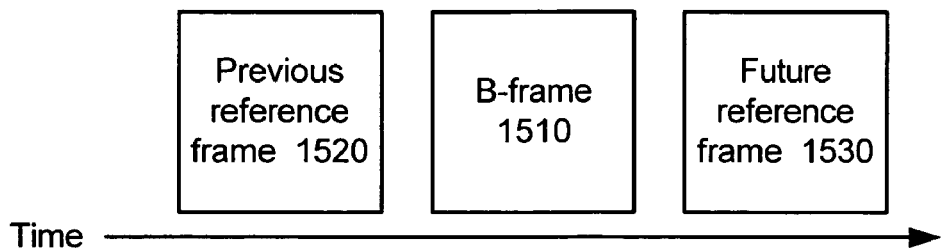
Figure 16
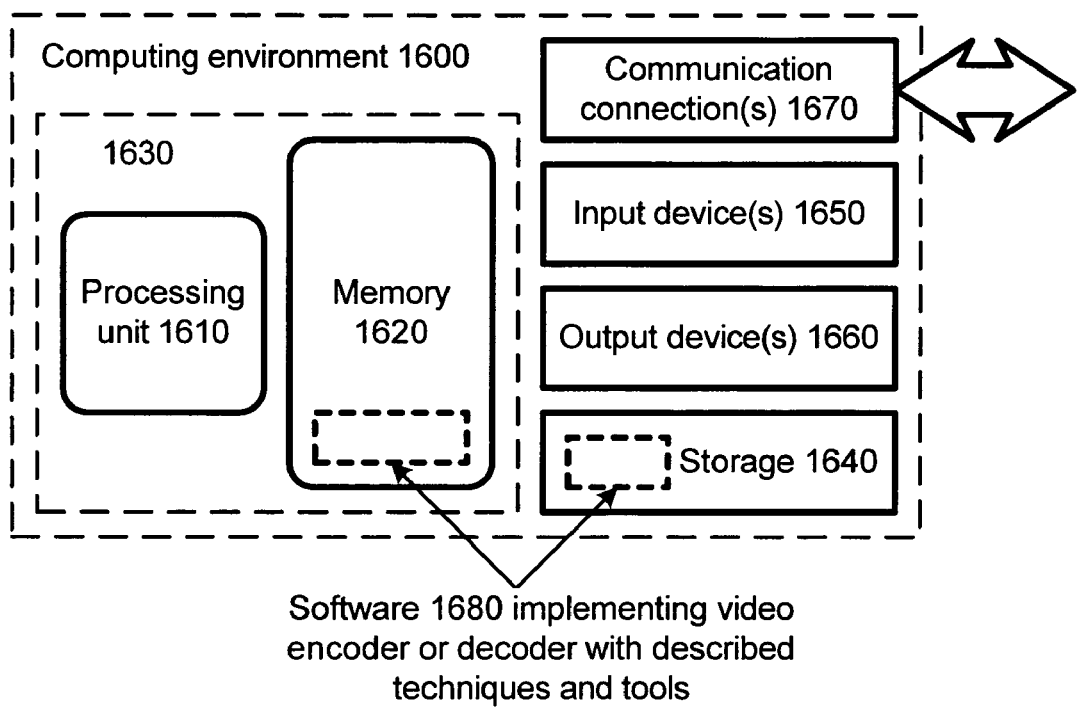
Software 1680 implementing video encoder or decoder with described techniques and tools Figure 19
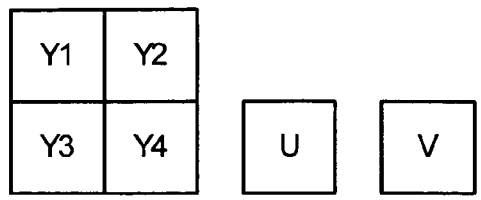
Figure 20A
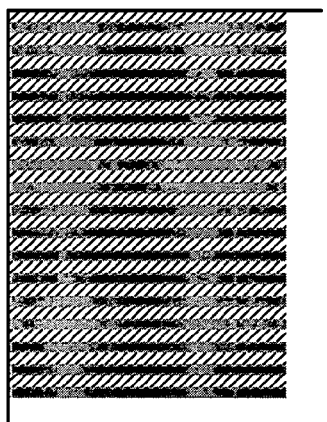
Figure 20B
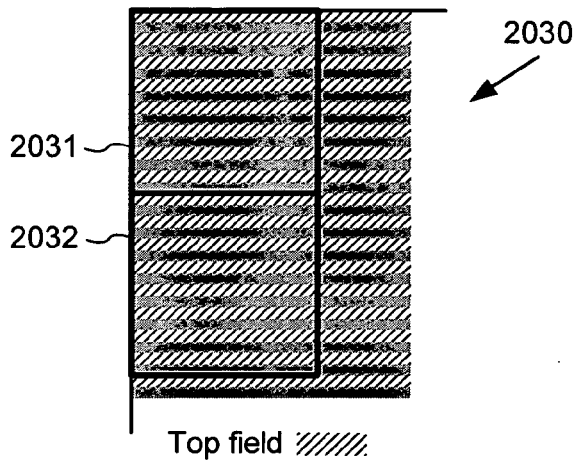
Figure 20C
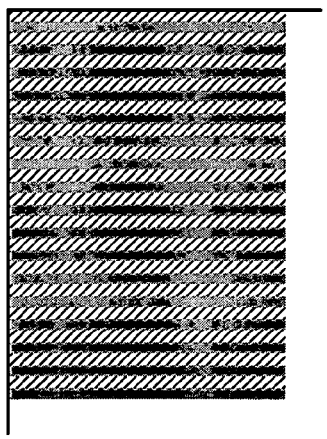
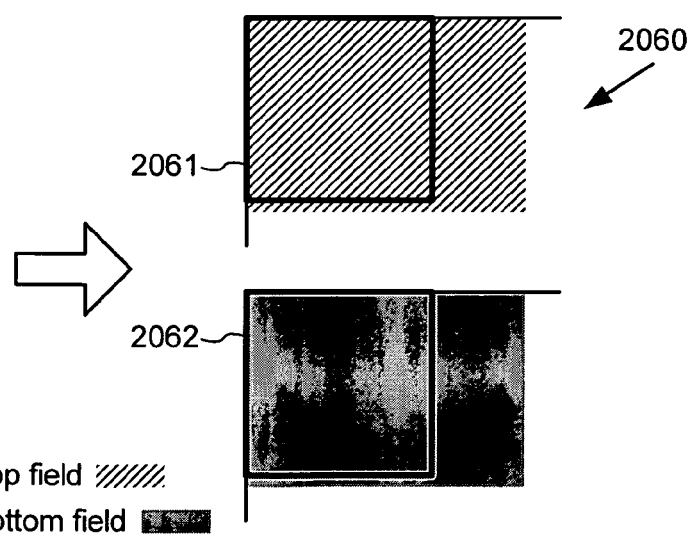

Top Field MV
Luminance Blocks
Bottom Field MV
Derived Top Field MV
Chrominance Block
Derived Bottom Field MV Luminance Blocks
Chrominance Block

Figure 23
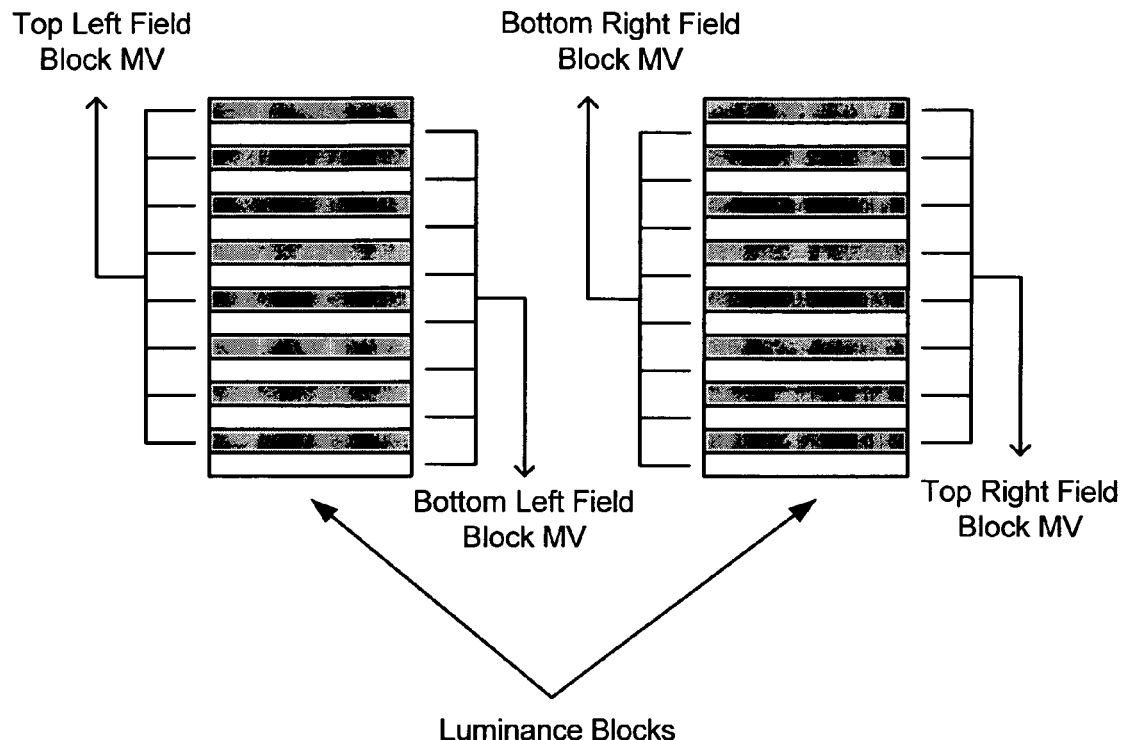
Luminance Blocks
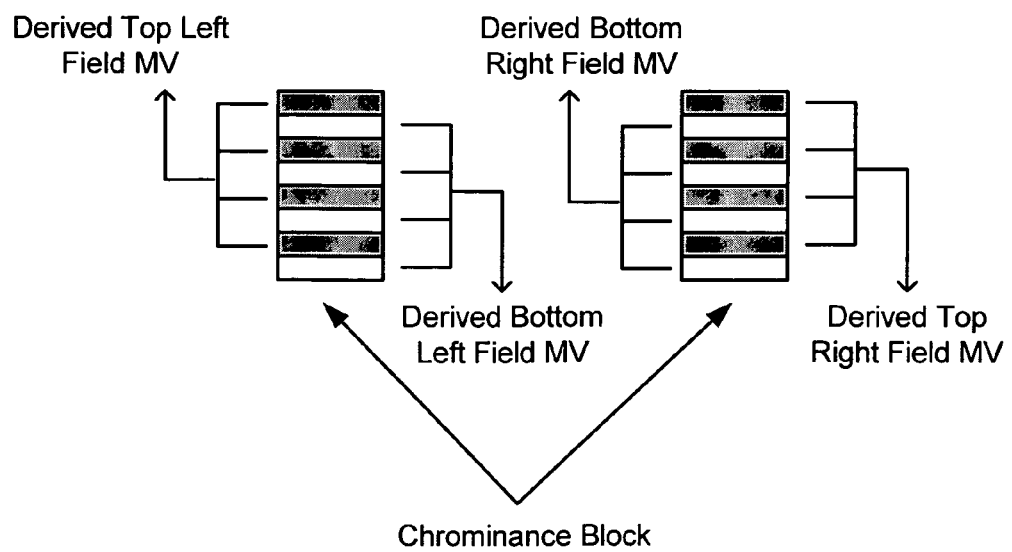
Chrominance Block

Figure 24A

| | Candidate MB - B | Candidate MB - C |
|---|---|---|
| Candidate MB - A | Current MB (not last MB in MB row) | |

Figure 24B

| Candidate MB - C | Candidate MB - B |
|---|---|
| Candidate MB - A | Current MB (last MB in MB row) |

Entry Point Layer Bitstream Syntax 2700

Frame Layer
Interlace P-frame
Bitstream Syntax
2800

Macroblock Layer Interlace P-frame Bitstream Syntax 3100

```
if (A exists and A is not intra coded) {
   if (A is 1 MV) {
      Add MV of A to the set of candidate MVs.
   } else if (A is 4 Frame MV) {
      Add the top right block MV of A to the set of candidate MVs.
   } else if (A is 2 Field MV) {
      Average the two field MVs of A and add the resulting MV to the set of candidate MVs.
   } else if (A is 4 Field MV) {
      Average the top right block field MV and bottom right block field MV of A and add the
resulting MV to the set of candidate MVs.
   }
} if (B exists and B is not intra coded) {
   if (B is 1 MV) {
      Add MV of B to the set of candidate MVs.
   } else if (B is 4 Frame MV) {
      Add the bottom left block MV of B to the set of candidate MVs.
   } else if (B is 2 Field MV) {
      Average the two field MVs of B and add the resulting MV to the set of candidate MVs.
   } else if (B is 4 Field MV) {
      Average the top left block field MV and bottom left block field MV of B and add the resulting
MV to the set of candidate MVs.
   }
} if (C exists and C is not intra coded) {
   if (C is 1 MV) {
      Add MV of C to the set of candidate MVs.
   } else if (C is 4 Frame MV) {
      if (C is top right MB) {
         Add the bottom left block MV of C to the set of candidate MVs.
      } else { // C is top left MB
         Add the bottom right block MV of C to the set of candidate MVs.
      }
   } else if (C is 2 Field MV) {
      Average the two field MVs of C and add the resulting MV to the set of candidate MVs.
   } else if (C is 4 Field MV) {
      if (C is top right MB) {
         Average the top left block field MV and bottom left block field MV of C and add the
resulting MV to the set of candidate MVs.
      } else { // C is top left MB
         Average the top right block field MV and bottom right block field MV of C and add the
         resulting MV to the set of candidate MVs.
      }
   }
}
```

```
// Top Left Block MV
if (A exists and A is not intra coded) {
    if (A is 1 MV) {
        Add MV of A to the set of candidate MVs.
    } else if (A is 4 Frame MV) {
        Add the top right block MV of A to the set of candidate MVs.
    } else if (A is 2 Field MV) {
        Average the two field MVs of A and add the resulting MV to the set of candidate MVs.
    } else if (A is 4 Field MV) {
        Average the top right block field MV and bottom right block field MV of A and add the
resulting MV to the set of candidate MVs.
    }
}
if (B exists and B is not intra coded) {
    if (B is 1 MV) {
        Add MV of B to the set of candidate MVs.
    } else if (B is 4 Frame MV) {
        Add the bottom left block MV of B to the set of candidate MVs.
    } else if (B is 2 Field MV) {
        Average the two field MVs of B and add the resulting MV to the set of candidate MVs.
    } else if (B is 4 Field MV) {
        Average the top left block field MV and bottom left block field MV of B and add the resulting
MV to the set of candidate MVs.
    }
}
if (C exists and C is not intra coded) {
    if (C is 1 MV) {
        Add MV of C to the set of candidate MVs.
    } else if (C is 4 Frame MV) {
        if (C is top right MB) {
            Add the bottom left block MV of C to the set of candidate MVs.
        } else { // C is top left MB
            Add the bottom right block MV of C to the set of candidate MVs.
        }
    } else if (C is 2 Field MV) {
        Average the two field MVs of C and add the resulting MV to the set of candidate MVs.
    } else if (C is 4 Field MV) {
        if (C is top right MB) {
            Average the top left block field MV and bottom left block field MV of C and add the
resulting MV to the set of candidate MVs.
        } else { // C is top left MB
            Average the top right block field MV and bottom right block field MV of C and add the
            resulting MV to the set of candidate MVs.
        }
    }
}
```

```
// Top Right Block MV
Add the top left block MV of the current MB to the set of candidate MVs.

if (B exists and B is not intra coded) {
   if (B is 1 MV) {
      Add MV of B to the set of candidate MVs.
   } else if (B is 4 Frame MV) {
      Add the bottom right block MV of B to the set of candidate MVs.
   } else if (B is 2 Field MV) {
      Average the two field MVs of B and add the resulting MV to the set of candidate MVs.
   } else if (B is 4 Field MV) {
      Average the top right block field MV and bottom right
      block field MV of B and add the resulting MV to the set of candidate MVs.
   }
} if (C exists and C is not intra coded) {
   if (C is 1 MV) {
      Add MV of C to the set of candidate MVs.
   } else if (C is 4 Frame MV) {
      if (C is top right MB) {
         Add the bottom left block MV of C to the set of candidate MVs.
      } else { // C is top left MB
         Add the bottom right block MV of C to the set of candidate MVs.
      }
   } else if (C is 2 Field MV) {
      Average the two field MVs of C and add the resulting MV to the set of candidate MVs.
   } else if (C is 4 Field MV) {
      if (C is top right MB) {
         Average the top left block field MV and bottom left block field MV of C and add the
resulting MV to the set of candidate MVs.
      } else { // C is top left MB
         Average the top right block field MV and bottom right block field MV of C and add the
         resulting MV to the set of candidate MVs.
      }
   }
}
```

```
// Bottom Left Block MV
if (A exists and A is not intra coded) {
   if (A is 1 MV) {
      Add MV of A to the set of candidate MVs.
   } else if (A is 4 Frame MV) {
      Add the bottom right block MV of A to the set of candidate MVs.
   } else if (A is 2 Field MV) {
      Average the two field MVs of A and add the resulting MV to the set of candidate
      MVs.
   } else if (A is 4 Field MV) {
      Average the top right block field MV and bottom right block field MV of A and add the
resulting MV to the set of candidate MVs.
   }
}

Add the top left block MV of the current MB to the set of candidate MVs.

Add the top right block MV of the current MB to the set of candidate MVs.
```

```
// Bottom Right Block MV
Add the bottom left block MV of the current MB to the set of candidate MVs.

Add the top left block MV of the current MB to the set of candidate MVs.

Add the top right block MV of the current MB to the set of candidate MVs.
```

```
// Top Field MV
if (A exists and A is not intra coded) {
    if (A is 1 MV) {
        Add MV of A to the set of candidate MVs.
    } else if (A is 4 Frame MV) {
        Add the top right block MV of A to the set of candidate MVs.
    } else if (A is 2 Field MV) {
        Add the top field MV of A to the set of candidate MVs.
    } else if (A is 4 Field MV) {
        Add the top right field block MV of A to the set of candidate MVs.
    }
}
if (B exists and B is not intra coded) {
    if (B is 1 MV) {
        Add MV of B to the set of candidate MVs.
    } else if (B is 4 Frame MV) {
        Add the bottom left block MV of B to the set of candidate MVs.
    } else if (B is 2 Field MV) {
        Add the top field MV of B to the set of candidate MVs.
    } else if (B is 4 Field MV) {
        Add the top left field block MV of B to the set of candidate MVs.
    }
}
if (C exists and C is not intra coded) {
    if (C is 1 MV) {
        Add MV of C to the set of candidate MVs.
    } else if (C is 4 Frame MV) {
        if (C is top right MB) {
            Add the bottom left block MV of C to the set of candidate MVs.
        } else { // C is top left MB
            Add the bottom right block MV of C to the set of candidate MVs.
        }
    } else if (C is 2 Field MV) {
        Add the top field MV of C to the set of candidate MVs.
    } else if (C is 4 Field MV) {
        if (C is top right MB) {
            Add the top left field block MV of C to the set of candidate MVs.
        } else { // C is top left MB
            Add the top right field block MV of C to the set of candidate MVs.
        }
    }
}
```

```
// Bottom Field MV
if (A exists and A is not intra coded) {
    if (A is 1 MV) {
        Add MV of A to the set of candidate MVs.
    } else if (A is 4 Frame MV) {
        Add the bottom right block MV of A to the set of candidate MVs.
    } else if (A is 2 Field MV) {
        Add the bottom field MV of A to the set of candidate MVs.
    } else if (A is 4 Field MV) {
        Add the bottom right field block MV of A to the set of candidate MVs.
    }
}
if (B exists and B is not intra coded) {
    if (B is 1 MV) {
        Add MV of B to the set of candidate MVs.
    } else if (B is 4 Frame MV) {
        Add the bottom left block MV of B to the set of candidate MVs.
    } else if (B is 2 Field MV) {
        Add the bottom field MV of B to the set of candidate MVs.
    } else if (B is 4 Field MV) {
        Add the bottom left field block MV of B to the set of candidate MVs.
    }
}
if (C exists and C is not intra coded) {
    if (C is 1 MV) {
        Add MV of C to the set of candidate MVs.
    } else if (C is 4 Frame MV) {
        if (C is top right MB) {
            Add the bottom left block MV of C to the set of candidate MVs.
        } else { // C is top left MB
            Add the bottom right block MV of C to the set of candidate MVs.
        }
    } else if (C is 2 Field MV) {
        Add the bottom field MV of C to the set of candidate MVs.
    } else if (C is 4 Field MV) {
        if (C is top right MB) {
            Add the bottom left field block MV of C to the set of candidate MVs.
        } else { // C is top left MB
            Add the bottom right field block MV of C to the set of candidate MVs.
        }
    }
}
```

```
// Top Left Field Block MV
if (A exists and A is not intra coded) {
   if (A is 1 MV) {
      Add MV of A to the set of candidate MVs.
   } else if (A is 4 Frame MV) {
      Add the top right block MV of A to the set of candidate MVs.
   } else if (A is 2 Field MV) {
      Add the top field MV of A to the set of candidate MVs.
   } else if (A is 4 Field MV) {
      Add the top right field block MV of A to the set of candidate MVs.
   }
}
if (B exists and B is not intra coded) {
   if (B is 1 MV) {
      Add MV of B to the set of candidate MVs.
   } else if (B is 4 Frame MV) {
      Add the bottom left block MV of B to the set of candidate MVs.
   } else if (B is 2 Field MV) {
      Add the top field MV of B to the set of candidate MVs.
   } else if (B is 4 Field MV) {
      Add the top left field block MV of B to the set of candidate MVs.
   }
}
if (C exists and C is not intra coded) {
   if (C is 1 MV) {
      Add MV of C to the set of candidate MVs.
   } else if (C is 4 Frame MV) {
      if (C is top right MB) {
         Add the bottom left block MV of C to the set of candidate MVs.
      } else { // C is top left MB
         Add the bottom right block MV of C to the set of candidate MVs.
      }
   } else if (C is 2 Field MV) {
      Add the top field MV of C to the set of candidate MVs.
   } else if (C is 4 Field MV) {
      if (C is top right MB) {
         Add the top left field block MV of C to the set of candidate MVs.
      } else { // C is top left MB
         Add the top right field block MV of C to the set of candidate MVs.
      }
   }
}
```

Figure 40

```
// Top Right Field Block MV
Add the top left field block MV of the current MB to the set of candidate MVs.

if (B exists and B is not intra coded) {
   if (B is 1 MV) {
      Add MV of B to the set of candidate MVs.
   } else if (B is 4 Frame MV) {
      Add the bottom right block MV of B to the set of candidate MVs.
   } else if (B is 2 Field MV) {
      Add the top field MV of B to the set of candidate MVs.
   } else if (B is 4 Field MV) {
      Add the top right field block MV of B to the set of candidate MVs.
   }
} if (C exists and C is not intra coded) {
   if (C is 1 MV) {
      Add MV of C to the set of candidate MVs.
   } else if (C is 4 Frame MV) {
      if (C is top right MB) {
         Add the bottom left block MV of C to the set of candidate MVs.
      } else { // C is top left MB
         Add the bottom right block MV of C to the set of candidate MVs.
      }
   } else if (C is 2 Field MV) {
      Add the top field MV of C to the set of candidate MVs.
   } else if (C is 4 Field MV) {
      if (C is top right MB) {
         Add the top left field block MV of C to the set of candidate MVs.
      } else { // C is top left MB
         Add the top right field block MV of C to the set of candidate MVs.
      }
   }
}
```

```
// Bottom Left Field Block MV
if (A exists and A is not intra coded) {
    if (A is 1 MV) {
        Add MV of A to the set of candidate MVs.
    } else if (A is 4 Frame MV) {
        Add the bottom right block MV of A to the set of candidate MVs.
    } else if (A is 2 Field MV) {
        Add the bottom field MV of A to the set of candidate MVs.
    } else if (A is 4 Field MV) {
        Add the bottom right field block MV of A to the set of candidate MVs.
    }
}
if (B exists and B is not intra coded) {
    if (B is 1 MV) {
        Add MV of B to the set of candidate MVs.
    } else if (B is 4 Frame MV) {
        Add the bottom left block MV of B to the set of candidate MVs.
    } else if (B is 2 Field MV) {
        Add the bottom field MV of B to the set of candidate MVs.
    } else if (B is 4 Field MV) {
        Add the bottom left field block MV of B to the set of candidate MVs.
    }
}
if (C exists and C is not intra coded) {
    if (C is 1 MV) {
        Add MV of C to the set of candidate MVs.
    } else if (C is 4 Frame MV) {
        if (C is top right MB) {
            Add the bottom left block MV of C to the set of candidate MVs.
        } else { // C is top left MB
            Add the bottom right block MV of C to the set of candidate MVs.
        }
    } else if (C is 2 Field MV) {
        Add the bottom field MV of C to the set of candidate MVs.
    } else if (C is 4 Field MV) {
        if (C is top right MB) {
            Add the bottom left field block MV of C to the set of candidate MVs.
        } else { // C is top left MB
            Add the bottom right field block MV of C to the set of candidate MVs.
        }
    }
}
```

```
// Bottom Right Field Block MV
Add the bottom left field block MV of the current MB to the set of candidate MVs.

if (B exists and B is not intra coded) {
   if (B is 1 MV) {
      Add MV of B to the set of candidate MVs.
   } else if (B is 4 Frame MV) {
      Add the bottom right block MV of B to the set of candidate MVs.
   } else if (B is 2 Field MV) {
      Add the bottom field MV of B to the set of candidate MVs.
   } else if (B is 4 Field MV) {
      Add the bottom right field block MV of B to the set of candidate MVs.
   }
} if (C exists and C is not intra coded) {
   if (C is 1 MV) {
      Add MV of C to the set of candidate MVs.
   } else if (C is 4 Frame MV) {
      if (C is top right MB) {
         Add the bottom left block MV of C to the set of candidate MVs.
      } else { // C is top left MB
         Add the bottom right block MV of C to the set of candidate MVs.
      }
   } else if (C is 2 Field MV) {
      Add the bottom field MV of C to the set of candidate MVs.
   } else if (C is 4 Field MV) {
      if (C is top right MB) {
         Add the bottom left field block MV of C to the set of candidate MVs.
      } else { // C is top left MB
         Add the bottom right field block MV of C to the set of candidate MVs.
      }
   }
}
```

Figure 43

```
if (TotalValidMV >= 2) {
    // Note that if there are only two valid MVs, then the
    // third ValidMV is set to be (0, 0)
    PMVx = median3 (ValidMVx [0], ValidMVx [1], ValidMVx [2]);
    PMVy = median3 (ValidMVy [0], ValidMVy [1], ValidMVy [2]);
} else if (TotalValidMV is 1) {
    PMVx = ValidMVx [0];
    PMVy = ValidMVy [0];
} else {
    PMVx = 0;
    PMVy = 0;
}
```

Figure 44

```
if (TotalValidMV == 3) {
    if (NumSameFieldMV == 3 || NumOppFieldMV == 3) {
        PMVx = median3 (ValidMVx [0], ValidMVx [1], ValidMVx [2]);
        PMVy = median3 (ValidMVy [0], ValidMVy [1], ValidMVy [2]);
    } else if (NumSameFieldMV >= NumOppFieldMV) {
        PMVx = SameFieldMVx [0];
        PMVy = SameFieldMVy [0];
    } else {
        PMVx = OppFieldMVx [0];
        PMVy = OppFieldMVy [0];
    }
} else if (TotalValidMV == 2) {
    if (NumSameFieldMV >= NumOppFieldMV) {
        PMVx = SameFieldMVx [0];
        PMVy = SameFieldMVy [0];
    } else {
        PMVx = OppFieldMVx [0];
        PMVy = OppFieldMVy [0];
    }
} else if (TotalValidMV == 1) {
    PMVx = ValidMVx [0];
    PMVy = ValidMVy [0];
} else {
    PMVx = 0;
    PMVy = 0;
}
```

```
offset_table1[9] = {0, 1, 2, 4, 8, 16, 32, 64, 128,}
offset_table2[9] = {0, 1, 3, 7, 15, 31, 63, 127, 255}
index = vlc_decode()    // Use the table indicated by MVTAB in the picture layer
if (index == 71)
{
        dmv_x = get_bits(k_x)
        dmv_y = get_bits(k_y)
}
else
{
    if (extend_x == 1)
       offset_table = offset_table2
    else
       offset_table = offset_table1
index1 = (index + 1) % 9
    if (index1 != 0)
    {
       val = get_bits (index1 + extend_x)
       sign = 0 - (val & 1)
       dmv_x = sign ^ ((val >> 1) + offset_table[index1])
       dmv_x = dmv_x - sign
    }
    else
       dmv_x = 0
    if (extend_y == 1)
       offset_table = offset_table2
    else
       offset_table = offset_table1
index1 = (index + 1) / 9
    if (index1 != 0)
    {
       val = get_bits (index1 + extend_y)
       sign = 0 - (val & 1)
       dmv_y = sign ^ ((val >> 1) + offset_table[index1])
       dmv_y = dmv_y - sign
    }
    else
       dmv_y = 0
}
```

```
offset_table[9] = {0, 1, 2, 4, 8, 16, 32, 64, 128}
index = vlc_decode()      // Use the table indicated by MVTAB in the picture layer
if (index == 0) {
        dmv_x = 1 - 2 * get_bits(1)
        dmv_y = 0
}
if (index == 125)
{
        dmv_x = get_bits(k_x - halfpel_flag)
        dmv_y = get_bits(k_y - halfpel_flag)
}
else
{
index1 = (index + 1) % 9
     val = get_bits (index1)
     sign = 0 - (val & 1)
     dmv_x = sign ^ ((val >> 1) + offset_table[index1])
     dmv_x = dmv_x - sign index1 = (index + 1) / 9
     val = get_bits (index1)
     sign = 0 - (val & 1)
     dmv_y = sign ^ ((val >> 1) + offset_table[index1])
     dmv_y = dmv_y - sign
}
```

Figure 46
```
Int s_RndTbl [] = {0, 0, 0, 1};
Int s_RndTblField [] = {0, 0, 1, 2, 4, 4, 5, 6, 2, 2, 3, 8, 6, 6, 7, 12};
CMV_X = (LMV_X + s_RndTbl[LMV_X & 3]) >> 1;
if (LMV is a field motion vector) {
    CMV_Y = (LMV_Y >> 4)*8 + s_RndTblField [LMV_Y & 0xF];
} else {
    CMV_Y = (LMV_Y + s_RndTbl[LMV_Y & 3]) >> 1;
}
```
Figure 47A
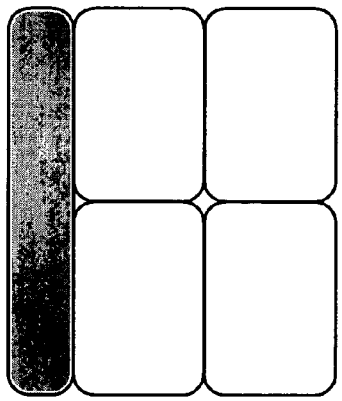
Figure 47B
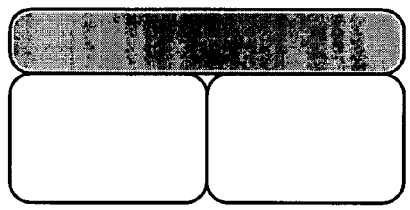
Figure 47C
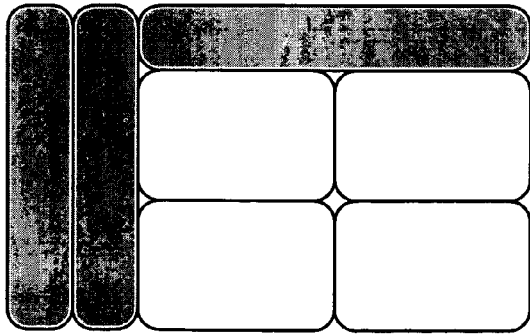

MACROBLOCK INFORMATION SIGNALING FOR INTERLACED FRAMES

RELATED APPLICATION INFORMATION

This application claims the benefit of U.S. Provisional Patent Application No. 60/501,081, entitled "Video Encoding and Decoding Tools and Techniques," filed Sep. 7, 2003, which is hereby incorporated by reference.

The following U.S. patent applications relate to the present application and are hereby incorporated by reference: 1) U.S. patent application Ser. No. 10/933,882, entitled, "Motion Vector Coding and Decoding in Interlaced Frame Coded Pictures," filed concurrently herewith; and 2) U.S. patent application Ser. No. 10/933,908, entitled, "Chroma Motion Vector Derivation," filed concurrently herewith, now U.S. Pat. No. 7,352,905.

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

Techniques and tools for interlaced video coding and decoding are described. For example, an encoder signals macroblock mode information for macroblocks in an interlaced frame coded picture. A decoder performs corresponding decoding.

BACKGROUND

Digital video consumes large amounts of storage and transmission capacity. A typical raw digital video sequence includes 15 or 30 pictures per second. Each picture can include tens or hundreds of thousands of pixels (also called pels). Each pixel represents a tiny element of the picture. In raw form, a computer commonly represents a pixel with 24 bits or more. Thus, the number of bits per second, or bit rate, of a typical raw digital video sequence can be 5 million bits/second or more.

Most computers and computer networks lack the resources to process raw digital video. For this reason, engineers use compression (also called coding or encoding) to reduce the bit rate of digital video. Compression can be lossless, in which quality of the video does not suffer but decreases in bit rate are limited by the complexity of the video. Or, compression can be lossy, in which quality of the video suffers but decreases in bit rate are more dramatic. Decompression reverses compression.

In general, video compression techniques include "intra" compression and "inter" or predictive compression. Intra compression techniques compress individual pictures, typically called I-frames or key frames. Inter compression techniques compress frames with reference to preceding and/or following frames, and inter-compressed frames are typically called predicted frames, P-frames, or B-frames.

I. Inter Compression in Windows Media Video, Versions 8 and 9

Microsoft Corporation's Windows Media Video, Version 8 ["WMV8"] includes a video encoder and a video decoder. The WMV8 encoder uses intra and inter compression, and the WMV8 decoder uses intra and inter decompression. Windows Media Video, Version 9 ["WMV9"] uses a similar architecture for many operations.

Inter compression in the WMV8 encoder uses block-based motion compensated prediction coding followed by transform coding of the residual error. FIGS. 1 and 2 illustrate the block-based inter compression for a predicted frame in the WMV8 encoder. In particular, FIG. 1 illustrates motion estimation for a predicted frame 110 and FIG. 2 illustrates compression of a prediction residual for a motion-compensated block of a predicted frame.

For example, in FIG. 1, the WMV8 encoder computes a motion vector for a macroblock 115 in the predicted frame 110. To compute the motion vector, the encoder searches in a search area 135 of a reference frame 130. Within the search area 135, the encoder compares the macroblock 115 from the predicted frame 110 to various candidate macroblocks in order to find a candidate macroblock that is a good match. The encoder outputs information specifying the motion vector (entropy coded) for the matching macroblock.

Since a motion vector value is often correlated with the values of spatially surrounding motion vectors, compression of the data used to transmit the motion vector information can be achieved by selecting a motion vector predictor based upon motion vectors of neighboring macroblocks and predicting the motion vector for the current macroblock using the motion vector predictor. The encoder can encode the differential between the motion vector and the predictor. After reconstructing the motion vector by adding the differential to the predictor, a decoder uses the motion vector to compute a prediction macroblock for the macroblock 115 using information from the reference frame 130, which is a previously reconstructed frame available at the encoder and the decoder. The prediction is rarely perfect, so the encoder usually encodes blocks of pixel differences (also called the error or residual blocks) between the prediction macroblock and the macroblock 115 itself.

FIG. 2 illustrates an example of computation and encoding of an error block 235 in the WMV8 encoder. The error block 235 is the difference between the predicted block 215 and the original current block 225. The encoder applies a discrete cosine transform ["DCT"] 240 to the error block 235, resulting in an 8×8 block 245 of coefficients. The encoder then quantizes 250 the DCT coefficients, resulting in an 8×8 block of quantized DCT coefficients 255. The encoder scans 260 the 8×8 block 255 into a one-dimensional array 265 such that coefficients are generally ordered from lowest frequency to highest frequency. The encoder entropy encodes the scanned coefficients using a variation of run length coding 270. The encoder selects an entropy code from one or more run/level/last tables 275 and outputs the entropy code.

FIG. 3 shows an example of a corresponding decoding process 300 for an inter-coded block. In summary of FIG. 3, a decoder decodes (310, 320) entropy-coded information representing a prediction residual using variable length decoding 310 with one or more run/level/last tables 315 and run length decoding 320. The decoder inverse scans 330 a one-dimensional array 325 storing the entropy-decoded information into a two-dimensional block 335. The decoder inverse quantizes and inverse discrete cosine transforms (together, 340) the data, resulting in a reconstructed error block 345. In a separate motion compensation path, the decoder computes a predicted block 365 using motion vector information 355 for displacement from a reference frame. The decoder combines 370 the predicted block 365 with the reconstructed error block 345 to form the reconstructed block 375.

The amount of change between the original and reconstructed frames is the distortion and the number of bits required to code the frame indicates the rate for the frame. The amount of distortion is roughly inversely proportional to the rate.

II. Interlaced Video and Progressive Video

A video frame contains lines of spatial information of a video signal. For progressive video, these lines contain samples starting from one time instant and continuing through successive lines to the bottom of the frame. A progressive I-frame is an intra-coded progressive video frame. A progressive P-frame is a progressive video frame coded using forward prediction, and a progressive B-frame is a progressive video frame coded using bi-directional prediction.

A typical interlaced video frame consists of two fields scanned starting at different times. For example, referring to FIG. 4, an interlaced video frame 400 includes top field 410 and bottom field 420. Typically, the even-numbered lines (top field) are scanned starting at one time (e.g., time t) and the odd-numbered lines (bottom field) are scanned starting at a different (typically later) time (e.g., time t+1). This timing can create jagged tooth-like features in regions of an interlaced video frame where motion is present because the two fields are scanned starting at different times. For this reason, interlaced video frames can be rearranged according to a field structure, with the odd lines grouped together in one field, and the even lines grouped together in another field. This arrangement, known as field coding, is useful in high-motion pictures for reduction of such jagged edge artifacts. On the other hand, in stationary regions, image detail in the interlaced video frame may be more efficiently preserved without such a rearrangement. Accordingly, frame coding is often used in stationary or low-motion interlaced video frames, in which the original alternating field line arrangement is preserved.

A typical progressive video frame consists of one frame of content with non-alternating lines. In contrast to interlaced video, progressive video does not divide video frames into separate fields, and an entire frame is scanned left to right, top to bottom starting at a single time.

III. P-Frame Coding and Decoding in a Previous WMV Encoder and Decoder

The encoder and decoder use progressive and interlace coding and decoding in P-frames. In interlaced and progressive P-frames, a motion vector is encoded in the encoder by computing a differential between the motion vector and a motion vector predictor, which is computed based on neighboring motion vectors. And, in the decoder, the motion vector is reconstructed by adding the motion vector differential to the motion vector predictor, which is again computed (this time in the decoder) based on neighboring motion vectors. Thus, a motion vector predictor for the current macroblock or field of the current macroblock is selected based on the candidates, and a motion vector differential is calculated based on the motion vector predictor. The motion vector can be reconstructed by adding the motion vector differential to the selected motion vector predictor at either the encoder or the decoder side. Typically, luminance motion vectors are reconstructed from the encoded motion information, and chrominance motion vectors are derived from the reconstructed luminance motion vectors.

A. Progressive P-Frame Coding and Decoding

For example, in the encoder and decoder, progressive P-frames can contain macroblocks encoded in one motion vector (1MV) mode or in four motion vector (4MV) mode, or skipped macroblocks, with a decision generally made on a macroblock-by-macroblock basis. P-frames with only 1MV macroblocks (and, potentially, skipped macroblocks) are referred to as 1MV P-frames, and P-frames with both 1MV and 4MV macroblocks (and, potentially, skipped macroblocks) are referred to as Mixed-MV P-frames. One luma motion vector is associated with each 1MV macroblock, and up to four luma motion vectors are associated with each 4MV macroblock (one for each block).

FIGS. 5A and 5B are diagrams showing the locations of macroblocks considered for candidate motion vector predictors for a macroblock in a 1MV progressive P-frame. The candidate predictors are taken from the left, top and top-right macroblocks, except in the case where the macroblock is the last macroblock in the row. In this case, Predictor B is taken from the top-left macroblock instead of the top-right. For the special case where the frame is one macroblock wide, the predictor is always Predictor A (the top predictor). When Predictor A is out of bounds because the macroblock is in the top row, the predictor is Predictor C. Various other rules address other special cases such as intra-coded predictors.

FIGS. 6A-10 show the locations of the blocks or macroblocks considered for the up-to-three candidate motion vectors for a motion vector for a 1MV or 4MV macroblock in a Mixed-MV frame. In the following figures, the larger squares are macroblock boundaries and the smaller squares are block boundaries. For the special case where the frame is one macroblock wide, the predictor is always Predictor A (the top predictor). Various other rules address other special cases such as top row blocks for top row 4MV macroblocks, top row 1MV macroblocks, and intra-coded predictors.

FIGS. 6A and 6B are diagrams showing locations of blocks considered for candidate motion vector predictors for a 1MV current macroblock in a Mixed-MV frame. The neighboring macroblocks may be 1MV or 4MV macroblocks. FIGS. 6A and 6B show the locations for the candidate motion vectors assuming the neighbors are 4MV (i.e., predictor A is the motion vector for block 2 in the macroblock above the current macroblock, and predictor C is the motion vector for block 1 in the macroblock immediately to the left of the current macroblock). If any of the neighbors is a 1MV macroblock, then the motion vector predictor shown in FIGS. 5A and 5B is taken to be the motion vector predictor for the entire macroblock. As FIG. 6B shows, if the macroblock is the last macroblock in the row, then Predictor B is from block 3 of the top-left macroblock instead of from block 2 in the top-right macroblock as is the case otherwise.

FIGS. 7A-10 show the locations of blocks considered for candidate motion vector predictors for each of the 4 luminance blocks in a 4MV macroblock. FIGS. 7A and 7B are diagrams showing the locations of blocks considered for candidate motion vector predictors for a block at position 0; FIGS. 8A and 8B are diagrams showing the locations of blocks considered for candidate motion vector predictors for a block at position 1; FIG. 9 is a diagram showing the locations of blocks considered for candidate motion vector predictors for a block at position 2; and FIG. 10 is a diagram showing the locations of blocks considered for candidate motion vector predictors for a block at position 3. Again, if a neighbor is a 1MV macroblock, the motion vector predictor for the macroblock is used for the blocks of the macroblock.

For the case where the macroblock is the first macroblock in the row, Predictor B for block 0 is handled differently than block 0 for the remaining macroblocks in the row (see FIGS. 7A and 7B). In this case, Predictor B is taken from block 3 in the macroblock immediately above the current macroblock instead of from block 3 in the macroblock above and to the left of current macroblock, as is the case otherwise. Similarly, for the case where the macroblock is the last macroblock in the row, Predictor B for block 1 is handled differently (FIGS. 8A and 8B). In this case, the predictor is taken from block 2 in the macroblock immediately above the current macroblock instead of from block 2 in the macroblock above and to the right of the current macroblock, as is the case otherwise. In general, if the macroblock is in the first macroblock column, then Predictor C for blocks 0 and 2 are set equal to 0.

B. Interlaced P-Frame Coding and Decoding

The encoder and decoder use a 4:1:1 macroblock format for interlaced P-frames, which can contain macroblocks encoded in field mode or in frame mode, or skipped macroblocks, with a decision generally made on a macroblock-by-macroblock basis. Two motion vectors are associated with each field-coded macroblock (one motion vector per field), and one motion vector is associated with each frame-coded macroblock. An encoder jointly encodes motion information, including horizontal and vertical motion vector differential components, potentially along with other signaling information.

FIGS. 11, 12 and 13 show examples of candidate predictors for motion vector prediction for frame-coded 4:1:1 macroblocks and field-coded 4:1:1 macroblocks, respectively, in interlaced P-frames in the encoder and decoder. FIG. 11 shows candidate predictors A, B and C for a current frame-coded 4:1:1 macroblock in an interior position in an interlaced P-frame (not the first or last macroblock in a macroblock row, not in the top row). Predictors can be obtained from different candidate directions other than those labeled A, B, and C (e.g., in special cases such as when the current macroblock is the first macroblock or last macroblock in a row, or in the top row, since certain predictors are unavailable for such cases). For a current frame-coded macroblock, predictor candidates are calculated differently depending on whether the neighboring macroblocks are field-coded or frame-coded. For a neighboring frame-coded macroblock, the motion vector is simply taken as the predictor candidate. For a neighboring field-coded macroblock, the candidate motion vector is determined by averaging the top and bottom field motion vectors.

FIGS. 12 and 13 show candidate predictors A, B and C for a current field in a field-coded 4:1:1 macroblock in an interior position in the field. In FIG. 12, the current field is a bottom field, and the bottom field motion vectors in the neighboring macroblocks are used as candidate predictors. In FIG. 13, the current field is a top field, and the top field motion vectors in the neighboring macroblocks are used as candidate predictors. Thus, for each field in a current field-coded macroblock, the number of motion vector predictor candidates for each field is at most three, with each candidate coming from the same field type (e.g., top or bottom) as the current field. Again, various special cases (not shown) apply when the current macroblock is the first macroblock or last macroblock in a row, or in the top row, since certain predictors are unavailable for such cases.

To select a predictor from a set of predictor candidates, the encoder and decoder use different selection algorithms, such as a median-of-three algorithm. A procedure for median-of-three prediction is described in pseudo-code 1400 in FIG. 14.

IV. B-Frame Coding and Decoding in a Previous WMV Encoder and Decoder

The encoder and decoder use progressive and interlaced B-frames. B-frames use two frames from the source video as reference (or anchor) frames rather than the one anchor used in P-frames. Among anchor frames for a typical B-frame, one anchor frame is from the temporal past and one anchor frame is from the temporal future. Referring to FIG. 15, a B-frame 1510 in a video sequence has a temporally previous reference frame 1520 and a temporally future reference frame 1530. Encoded bit streams with B-frames typically use less bits than encoded bit streams with no B-frames, while providing similar visual quality. A decoder also can accommodate space and time restrictions by opting not to decode or display B-frames, since B-frames are not generally used as reference frames.

While macroblocks in forward-predicted frames (e.g., P-frames) have only one directional mode of prediction (forward, from previous I- or P-frames), macroblocks in B-frames can be predicted using five different prediction modes: forward, backward, direct, interpolated and intra. The encoder selects and signals different prediction modes in the bit stream. Forward mode is similar to conventional P-frame prediction. In forward mode, a macroblock is derived from a temporally previous anchor. In backward mode, a macroblock is derived from a temporally subsequent anchor. Macroblocks predicted in direct or interpolated modes use both forward and backward anchors for prediction.

V. Signaling Macroblock Information in a Previous WMV Encoder and Decoder

In the encoder and decoder, macroblocks in interlaced P-frames can be one of three possible types: frame-coded, field-coded and skipped. The macroblock type is indicated by a multi-element combination of frame-level and macroblock-level syntax elements.

For interlaced P-frames, the frame-level element INTRLCF indicates the mode used to code the macroblocks in that frame. If INTRLCF=0, all macroblocks in the frame are frame-coded. If INTRLCF=1, the macroblocks may be field-coded or frame-coded. The INTRLCMB element is present at in the frame layer when INTRLCF=1. INTRLCMB is a bit-plane-coded array that indicates the field/frame coding status for each macroblock in the picture. The decoded bitplane represents the interlaced status for each macroblock as an array of 1-bit values. A value of 0 for a particular bit indicates that a corresponding macroblock is coded in frame mode. A value of 1 indicates that the corresponding macroblock is coded in field mode.

For frame-coded macroblocks, the macroblock-level MVDATA element is associated with all blocks in the macroblock. MVDATA signals whether the blocks in the macroblocks are intra-coded or inter-coded. If they are inter-coded, MVDATA also indicates the motion vector differential.

For field-coded macroblocks, a TOPMVDATA element is associated with the top field blocks in the macroblock and a BOTMVDATA element is associated with the bottom field blocks in the macroblock. TOPMVDATA and BOTMVDATA are sent at the first block of each field. TOPMVDATA indicates whether the top field blocks are intra-coded or inter-coded. Likewise, BOTMVDATA indicates whether the bottom field blocks are intra-coded or inter-coded. For inter-coded blocks, TOPMVDATA and BOTMVDATA also indicate motion vector differential information.

The CBPCY element indicates coded block pattern (CBP) information for luminance and chrominance components in a macroblock. The CBPCY element also indicates which fields have motion vector data elements present in the bitstream.

CBPCY and the motion vector data elements are used to specify whether blocks have AC coefficients. CBPCY is present for a frame-coded macroblock of an interlaced P-frame if the "last" value decoded from MVDATA indicates that there are data following the motion vector to decode. If CBPCY is present, it decodes to a 6-bit field, one bit for each of the four Y blocks, one bit for both U blocks (top field and bottom field), and one bit for both V blocks (top field and bottom field).

CBPCY is always present for a field-coded macroblock. CBPCY and the two field motion vector data elements are used to determine the presence of AC coefficients in the blocks of the macroblock. The meaning of CBPCY is the same as for frame-coded macroblocks for bits 1, 3, 4 and 5. That is, they indicate the presence or absence of AC coefficients in the right top field Y block, right bottom field Y block, top/bottom U blocks, and top/bottom V blocks, respectively. For bit positions 0 and 2, the meaning is slightly different. A 0 in bit position 0 indicates that TOPMVDATA is not present and the motion vector predictor is used as the motion vector for the top field blocks. It also indicates that the left top field block does not contain any nonzero coefficients. A 1 in bit position 0 indicates that TOPMVDATA is present. TOPMVDATA indicates whether the top field blocks are inter or intra and, if they are inter, also indicates the motion vector differential. If the "last" value decoded from TOPMVDATA decodes to 1, then no AC coefficients are present for the left top field block, otherwise, there are nonzero AC coefficients for the left top field block. Similarly, the above rules apply to bit position 2 for BOTMVDATA and the left bottom field block.

VI. Skipped Macroblocks in a Previous WMV Encoder and Decoder

The encoder and decoder use skipped macroblocks to reduce bitrate. For example, the encoder signals skipped macroblocks in the bitstream. When the decoder receives information (e.g., a skipped macroblock flag) in the bitstream indicating that a macroblock is skipped, the decoder skips decoding residual block information for the macroblock. Instead, the decoder uses corresponding pixel data from a co-located or motion compensated (with a motion vector predictor) macroblock in a reference frame to reconstruct the macroblock. The encoder and decoder select between multiple coding/decoding modes for encoding and decoding the skipped macroblock information. For example, skipped macroblock information is signaled at frame level of the bitstream (e.g., in a compressed bitplane) or at macroblock level (e.g., with one "skip" bit per macroblock). For bitplane coding, the encoder and decoder select between different bitplane coding modes.

One previous encoder and decoder define a skipped macroblock as a predicted macroblock whose motion is equal to its causally predicted motion and which has zero residual error. Another previous encoder and decoder define a skipped macroblock as a predicted macroblock with zero motion and zero residual error.

For more information on skipped macroblocks and bitplane coding, see U.S. patent application Ser. No. 10/321,415, entitled "Skip Macroblock Coding," filed Dec. 16, 2002.

VII. Standards for Video Compression and Decompression

Several international standards relate to video compression and decompression. These standards include the Motion Picture Experts Group ["MPEG"] 1, 2, and 4 standards and the H.261, H.262 (another title for MPEG-2), H.263 and H.264 (also called JVT/AVC) standards from the International Telecommunication Union ["ITU"]. These standards specify aspects of video decoders and formats for compressed video information. Directly or by implication, they also specify certain encoder details, but other encoder details are not specified. These standards use (or support the use of) different combinations of intraframe and interframe decompression and compression.

A. Signaling Field- or Frame-Coded Macroblocks in the Standards

Some international standards describe signaling of field/frame coding type (e.g., field-coding or frame-coding) for macroblocks in interlaced pictures.

Draft JVT-d157 of the JVT/AVC standard describes the mb_field_decoding_flag syntax element, which is used to signal whether a macroblock pair is decoded in frame mode or field mode in interlaced P-frames. Section 7.3.4 describes a bitstream syntax where mb_field_decoding_flag is sent as an element of slice data in cases where a sequence parameter (mb_frame_field_adaptive_flag) indicates switching between frame and field decoding in macroblocks and a slice header element (pic_structure) identifies the picture structure as a progressive picture or an interlaced frame picture.

The May 28, 1998 committee draft of MPEG-4 describes the dct_type syntax element, which is used to signal whether a macroblock is frame DCT coded or field DCT coded. According to Sections 6.2.7.3 and 6.3.7.3, dct_type is a macroblock-layer element that is only present in the MPEG-4 bitstream in interlaced content where the macroblock has a non-zero coded block pattern or is intra-coded.

In MPEG-2, the dct_type element indicates whether a macroblock is frame DCT coded or field DCT coded. MPEG-2 also describes a picture coding extension element frame_pred_frame_dct. When frame_pred_frame_dct is set to '1', only frame DCT coding is used in interlaced frames. The condition dct_type=0 is "derived" when frame_pred_frame_dct=1 and the dct_type element is not present in the bitstream.

B. Skipped Macroblocks in the Standards

Some international standards use skipped macroblocks. For example, draft JVT-d157 of the JVT/AVC standard defines a skipped macroblock as "a macroblock for which no data is coded other than an indication that the macroblock is to be decoded as 'skipped.'" Similarly, the committee draft of MPEG-4 states, "A skipped macroblock is one for which no information is transmitted."

C. Limitations of the Standards

These international standards are limited in several important ways. For example, although the standards provide for signaling of macroblock types, field/frame coding type information is signaled separately from motion compensation types (e.g., field prediction or frame prediction, one motion vector or multiple motion vectors, etc.). As another example, although some international standards allow for bitrate savings by skipping certain macroblocks, the skipped macroblock condition in these standards only indicates that no further information for the macroblock is encoded, and fails to provide other potentially valuable information about the macroblock.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for encoding and decoding interlaced video frames. Described embodiments implement one or more of the described techniques and tools including, but not limited to, the following:

In one aspect, a decoder decodes one or more skipped macroblocks among plural macroblocks of an interlaced frame (e.g., an interlaced P-frame, interlaced B-frame, or a frame having interlaced P-fields and/or interlaced B-fields). Each of the one or more skipped macroblocks (1) is indicated by a skipped macroblock signal in a bitstream, (2) uses exactly one predicted motion vector (e.g., a frame motion vector) and has no motion vector differential information, and (3) lacks residual information. The skipped macroblock signal for each of the one or more skipped macroblocks indicates one-motion-vector motion-compensated decoding for the respective skipped macroblock. The skipped macroblock signal can be part of a compressed bitplane sent at frame layer in a bitstream having plural layers. Or, the skipped macroblock signal can be an individual bit sent at macroblock layer.

In another aspect, a coding mode from a group of plural available coding modes is selected, and a bitplane is processed in an encoder or decoder according to the selected coding mode. The bitplane includes binary information signifying whether macroblocks in an interlaced frame are skipped or not skipped. A macroblock in the interlaced frame is skipped if the macroblock has only one motion vector, the only one motion vector is equal to a predicted motion vector for the macroblock, and the macroblock has no residual error. A macroblock is not skipped if it has plural motion vectors.

In another aspect, an encoder selects a motion compensation type (e.g., 1MV, 4 Frame MV, 2 Field MV, or 4 Field MV) for a macroblock in an interlaced P-frame and selects a field/frame coding type (e.g., field-coded, frame-coded, or no coded blocks) for the macroblock. The encoder jointly encodes the motion compensation type and the field/frame coding type for the macroblock. The encoder also can jointly encode other information for the macroblock with the motion compensation type and the field/frame coding type (e.g., an indicator of the presence of a differential motion vector, such as for a one-motion-vector macroblock).

In another aspect, a decoder receives macroblock information for a macroblock in an interlaced P-frame, including a joint code representing motion compensation type and field/frame coding type for the macroblock. The decoder decodes the joint code (e.g., a variable length code in a variable length coding table) to obtain both motion compensation type information and field/frame coding type information for the macroblock.

The various techniques and tools can be used in combination or independently.

Additional features and advantages will be made apparent from the following detailed description of different embodiments that proceeds with reference to the accompanying drawings.

BRIEF DESCRIPTION OF THE DRAWINGS

FIG. 1 is a diagram showing motion estimation in a video encoder according to the prior art.

FIG. 2 is a diagram showing block-based compression for an 8×8 block of prediction residuals in a video encoder according to the prior art.

FIG. 3 is a diagram showing block-based decompression for an 8×8 block of prediction residuals in a video encoder according to the prior art.

FIG. 4 is a diagram showing an interlaced frame according to the prior art.

FIGS. 5A and 5B are diagrams showing locations of macroblocks for candidate motion vector predictors for a 1MV macroblock in a progressive P-frame according to the prior art.

FIGS. 6A and 6B are diagrams showing locations of blocks for candidate motion vector predictors for a 1MV macroblock in a mixed 1MV/4MV progressive P-frame according to the prior art.

FIGS. 7A, 7B, 8A, 8B, 9, and 10 are diagrams showing the locations of blocks for candidate motion vector predictors for a block at various positions in a 4MV macroblock in a mixed 1MV/4MV progressive P-frame according to the prior art.

FIG. 11 is a diagram showing candidate motion vector predictors for a current frame-coded macroblock in an interlaced P-frame according to the prior art.

FIGS. 12 and 13 are diagrams showing candidate motion vector predictors for a current field-coded macroblock in an interlaced P-frame according to the prior art.

FIG. 14 is a code diagram showing pseudo-code for performing a median-of-3 calculation according to the prior art.

FIG. 15 is a diagram showing a B-frame with past and future reference frames according to the prior art.

FIG. 16 is a block diagram of a suitable computing environment in conjunction with which several described embodiments may be implemented.

FIG. 19 is a diagram of a macroblock format used in several described embodiments.

FIG. 20A is a diagram of part of an interlaced video frame, showing alternating lines of a top field and a bottom field. FIG. 20B is a diagram of the interlaced video frame organized for encoding/decoding as a frame, and FIG. 20C is a diagram of the interlaced video frame organized for encoding/decoding as fields.

FIG. 23 is a diagram showing motion vectors for luminance blocks and derived motion vectors for chrominance blocks in a 4 field MV macroblock of an interlaced P-frame.

FIGS. 24A-24B are diagrams showing candidate predictors for a current macroblock of an interlaced P-frame.

FIG. 32 is a code listing showing pseudo-code for collecting candidate motion vectors for 1MV macroblocks in an interlaced P-frame in a combined implementation.

FIGS. 33, 34, 35, and 36 are code listings showing pseudo-code for collecting candidate motion vectors for 4 Frame MV macroblocks in an interlaced P-frame in a combined implementation.

FIGS. 37 and 38 are code listings showing pseudo-code for collecting candidate motion vectors for 2 Field MV macroblocks in an interlaced P-frame in a combined implementation.

FIGS. 39, 40, 41, and 42 are code listings showing pseudo-code for collecting candidate motion vectors for 4 Field MV macroblocks in an interlaced P-frame in a combined implementation.

FIG. 43 is a code listing showing pseudo-code for computing motion vector predictors for frame motion vectors in an interlaced P-frame in a combined implementation.

FIG. 44 is a code listing showing pseudo-code for computing motion vector predictors for field motion vectors in an interlaced P-frame in a combined implementation.

FIGS. 45A and 45B are code listings showing pseudo-code for decoding a motion vector differential for interlaced P-frames in a combined implementation.

FIG. 46 is a code listing showing pseudo-code for deriving a chroma motion vector in an interlaced P-frame in a combined implementation.

FIGS. 47A-47C are diagrams showing tiles for Norm-6 and Diff-6 bitplane coding modes in a combined implementation.

DETAILED DESCRIPTION

Figure 17:
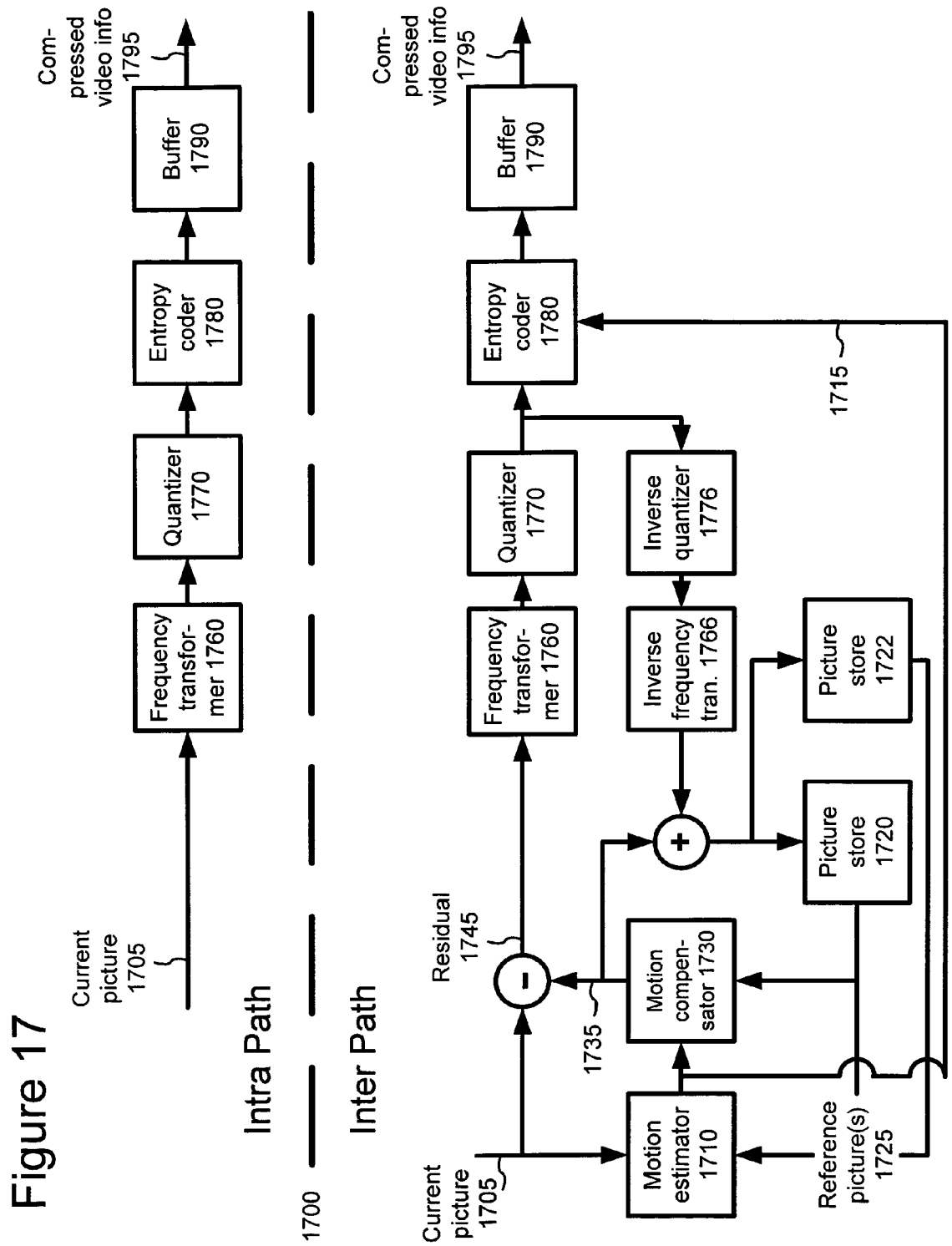
FIG. 17 is a block diagram of a generalized video encoder system in conjunction with which several described embodiments may be implemented.

The present application relates to techniques and tools for efficient compression and decompression of interlaced video. In various described embodiments, a video encoder and decoder incorporate techniques for encoding and decoding interlaced video, and corresponding signaling techniques for use with a bit stream format or syntax comprising different layers or levels (e.g., sequence level, frame level, field level, macroblock level, and/or block level).

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific macroblock formats, other formats also can be used. Further, techniques and tools described with reference to forward prediction may also be applicable to other types of prediction.

The various techniques and tools can be used in combination or independently. Different embodiments implement one or more of the described techniques and tools. Some techniques and tools described herein can be used in a video encoder or decoder, or in some other system not specifically limited to video encoding or decoding.

I. Computing Environment

FIG. 16 illustrates a generalized example of a suitable computing environment 1600 in which several of the described embodiments may be implemented. The computing environment 1600 is not intended to suggest any limitation as to scope of use or functionality, as the techniques and tools may be implemented in diverse general-purpose or special-purpose computing environments.

With reference to FIG. 16, the computing environment 1600 includes at least one processing unit 1610 and memory 1620. In FIG. 16, this most basic configuration 1630 is included within a dashed line. The processing unit 1610 executes computer-executable instructions and may be a real or a virtual processor. In a multi-processing system, multiple processing units execute computer-executable instructions to increase processing power. The memory 1620 may be volatile memory (e.g., registers, cache, RAM), non-volatile memory (e.g., ROM, EEPROM, flash memory, etc.), or some combination of the two. The memory 1620 stores software 1680 implementing a video encoder or decoder with one or more of the described techniques and tools.

A computing environment may have additional features. For example, the computing environment 1600 includes storage 1640, one or more input devices 1650, one or more output devices 1660, and one or more communication connections 1670. An interconnection mechanism (not shown) such as a bus, controller, or network interconnects the components of the computing environment 1600. Typically, operating system software (not shown) provides an operating environment for other software executing in the computing environment 1600, and coordinates activities of the components of the computing environment 1600.

The storage 1640 may be removable or non-removable, and includes magnetic disks, magnetic tapes or cassettes, CD-ROMs, DVDs, or any other medium which can be used to store information and which can be accessed within the computing environment 1600. The storage 1640 stores instructions for the software 1680 implementing the video encoder or decoder.

The input device(s) 1650 may be a touch input device such as a keyboard, mouse, pen, or trackball, a voice input device, a scanning device, or another device that provides input to the computing environment 1600. For audio or video encoding, the input device(s) 1650 may be a sound card, video card, TV tuner card, or similar device that accepts audio or video input in analog or digital form, or a CD-ROM or CD-RW that reads audio or video samples into the computing environment 1600. The output device(s) 1660 may be a display, printer, speaker, CD-writer, or another device that provides output from the computing environment 1600.

The communication connection(s) 1670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 1600, computer-readable media include memory 1620, storage 1640, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "estimate," "compensate," "predict," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 18:
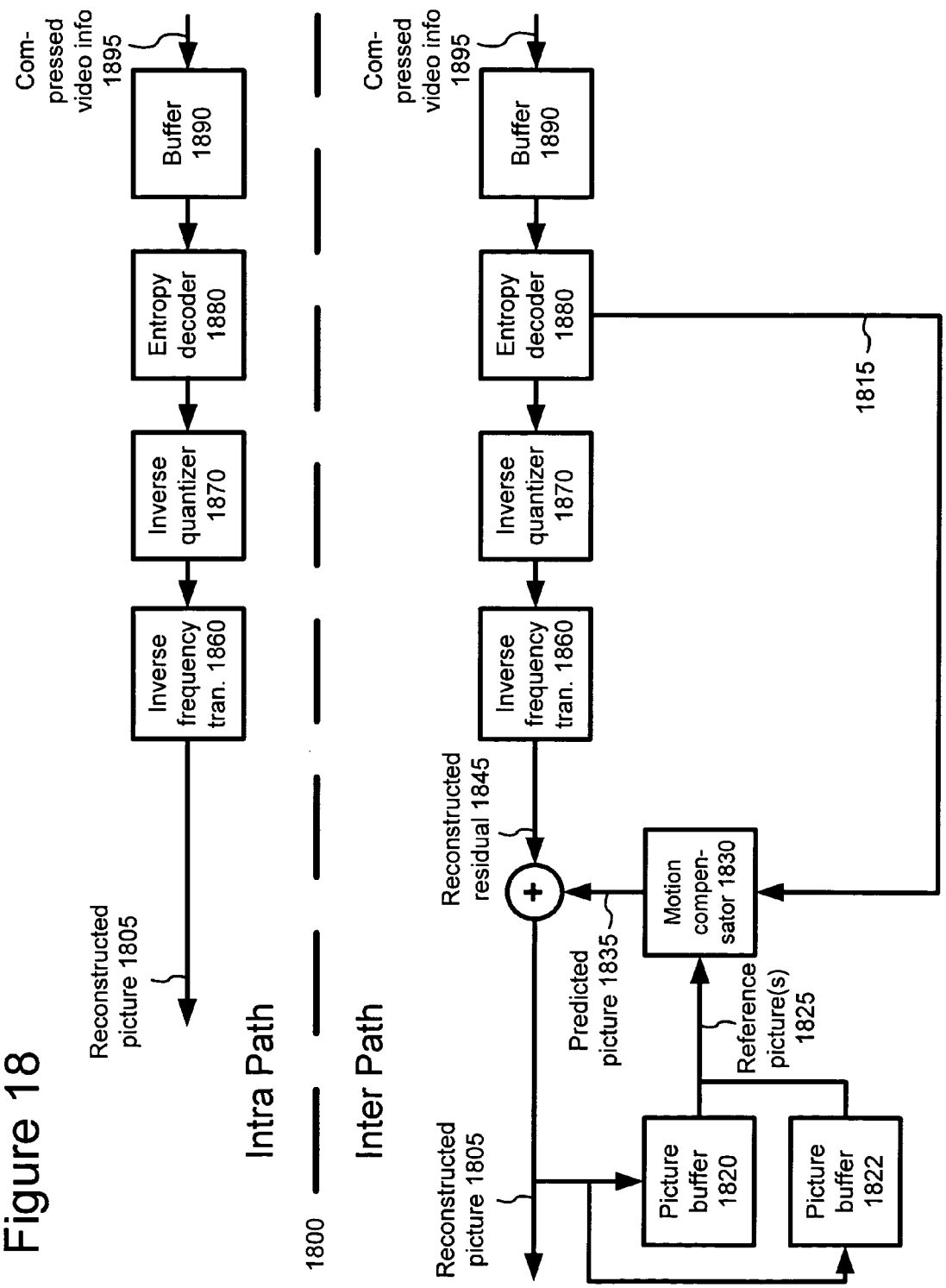
FIG. 18 is a block diagram of a generalized video decoder system in conjunction with which several described embodiments may be implemented.

FIG. 17 is a block diagram of a generalized video encoder 1700 in conjunction with which some described embodiments may be implemented. FIG. 18 is a block diagram of a generalized video decoder 1800 in conjunction with which some described embodiments may be implemented.

The relationships shown between modules within the encoder 1700 and decoder 1800 indicate general flows of information in the encoder and decoder; other relationships are not shown for the sake of simplicity. In particular, FIGS. 17 and 18 usually do not show side information indicating the encoder settings, modes, tables, etc. used for a video sequence, picture, macroblock, block, etc. Such side information is sent in the output bitstream, typically after entropy encoding of the side information. The format of the output bitstream can be a Windows Media Video version 9 format or other format.

The encoder 1700 and decoder 1800 process video pictures, which may be video frames, video fields or combinations of frames and fields. The bitstream syntax and semantics at the picture and macroblock levels may depend on whether frames or fields are used. There may be changes to macroblock organization and overall timing as well. The encoder 1700 and decoder 1800 are block-based and use a 4:2:0 macroblock format for frames, with each macroblock including four 8×8 luminance blocks (at times treated as one 16×16 macroblock) and two 8×8 chrominance blocks. For fields, the same or a different macroblock organization and format may be used. The 8×8 blocks may be further sub-divided at different stages, e.g., at the frequency transform and entropy encoding stages. Example video frame organizations are described in more detail below. Alternatively, the encoder 1700 and decoder 1800 are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

A. Video Frame Organizations

In some implementations, the encoder 1700 and decoder 1800 process video frames organized as follows. A frame contains lines of spatial information of a video signal. For progressive video, these lines contain samples starting from one time instant and continuing through successive lines to the bottom of the frame. A progressive video frame is divided into macroblocks such as the macroblock 1900 shown in FIG. 19. The macroblock 1900 includes four 8×8 luminance blocks (Y1 through Y4) and two 8×8 chrominance blocks that are co-located with the four luminance blocks but half resolution horizontally and vertically, following the conventional 4:2:0 macroblock format. The 8×8 blocks may be further sub-divided at different stages, e.g., at the frequency transform (e.g., 8×4, 4×8 or 4×4 DCTs) and entropy encoding stages. A progressive I-frame is an intra-coded progressive video frame. A progressive P-frame is a progressive video frame coded using forward prediction, and a progressive B-frame is a progressive video frame coded using bi-directional prediction. Progressive P- and B-frames may include intra-coded macroblocks as well as different types of predicted macroblocks.

An interlaced video frame consists of two scans of a frame—one comprising the even lines of the frame (the top field) and the other comprising the odd lines of the frame (the bottom field). The two fields may represent two different time periods or they may be from the same time period. FIG. 20A shows part of an interlaced video frame 2000, including the alternating lines of the top field and bottom field at the top left part of the interlaced video frame 2000.

FIG. 20B shows the interlaced video frame 2000 of FIG. 20A organized for encoding/decoding as a frame 2030. The interlaced video frame 2000 has been partitioned into macroblocks such as the macroblocks 2031 and 2032, which use a 4:2:0 format as shown in FIG. 19. In the luminance plane, each macroblock 2031, 2032 includes 8 lines from the top field alternating with 8 lines from the bottom field for 16 lines total, and each line is 16 pixels long. (The actual organization and placement of luminance blocks and chrominance blocks within the macroblocks 2031, 2032 are not shown, and in fact may vary for different encoding decisions.) Within a given macroblock, the top-field information and bottom-field information may be coded jointly or separately at any of various phases. An interlaced I-frame is two intra-coded fields of an interlaced video frame, where a macroblock includes information for the two fields. An interlaced P-frame is two fields of an interlaced video frame coded using forward prediction, and an interlaced B-frame is two fields of an interlaced video frame coded using bi-directional prediction, where a macroblock includes information for the two fields. Interlaced P- and B-frames may include intra-coded macroblocks as well as different types of predicted macroblocks. Interlaced BI-frames are a hybrid of interlaced I-frames and interlaced B-frames; they are intra-coded, but are not used as anchors for other frames.

FIG. 20C shows the interlaced video frame 2000 of FIG. 20A organized for encoding/decoding as fields 2060. Each of the two fields of the interlaced video frame 2000 is partitioned into macroblocks. The top field is partitioned into macroblocks such as the macroblock 2061, and the bottom field is partitioned into macroblocks such as the macroblock 2062. (Again, the macroblocks use a 4:2:0 format as shown in FIG. 19, and the organization and placement of luminance blocks and chrominance blocks within the macroblocks are not shown.) In the luminance plane, the macroblock 2061 includes 16 lines from the top field and the macroblock 2062 includes 16 lines from the bottom field, and each line is 16 pixels long. An interlaced I-field is a single, separately represented field of an interlaced video frame. An interlaced P-field is a single, separately represented field of an interlaced video frame coded using forward prediction, and an interlaced B-field is a single, separately represented field of an interlaced video frame coded using bi-directional prediction.

Interlaced P- and B-fields may include intra-coded macroblocks as well as different types of predicted macroblocks. Interlaced BI-fields are a hybrid of interlaced I-fields and interlaced B-fields; they are intra-coded, but are not used as anchors for other fields.

Interlaced video frames organized for encoding/decoding as fields can include various combinations of different field types. For example, such a frame can have the same field type in both the top and bottom fields or different field types in each field. In one implementation, the possible combinations of field types include I/I, I/P, P/I, P/P, B/B, B/BI, BI/B, and BI/BI.

The term picture generally refers to source, coded or reconstructed image data. For progressive video, a picture is a progressive video frame. For interlaced video, a picture may refer to an interlaced video frame, the top field of the frame, or the bottom field of the frame, depending on the context.

Alternatively, the encoder 1700 and decoder 1800 are object-based, use a different macroblock or block format, or perform operations on sets of pixels of different size or configuration than 8×8 blocks and 16×16 macroblocks.

B. Video Encoder

FIG. 17 is a block diagram of a generalized video encoder system 1700. The encoder system 1700 receives a sequence of video pictures including a current picture 1705 (e.g., progressive video frame, interlaced video frame, or field of an interlaced video frame), and produces compressed video information 1795 as output. Particular embodiments of video encoders typically use a variation or supplemented version of the generalized encoder 1700.

The encoder system 1700 compresses predicted pictures and key pictures. For the sake of presentation, FIG. 17 shows a path for key pictures through the encoder system 1700 and a path for predicted pictures. Many of the components of the encoder system 1700 are used for compressing both key pictures and predicted pictures. The exact operations performed by those components can vary depending on the type of information being compressed.

A predicted picture (e.g., progressive P-frame or B-frame, interlaced P-field or B-field, or interlaced P-frame or B-frame) is represented in terms of prediction (or difference) from one or more other pictures (which are typically referred to as reference pictures or anchors). A prediction residual is the difference between what was predicted and the original picture. In contrast, a key picture (e.g., progressive I-frame, interlaced I-field, or interlaced I-frame) is compressed without reference to other pictures.

If the current picture 1705 is a forward-predicted picture, a motion estimator 1710 estimates motion of macroblocks or other sets of pixels of the current picture 1705 with respect to one or more reference pictures, for example, the reconstructed previous picture 1725 buffered in the picture store 1720. If the current picture 1705 is a bi-directionally-predicted picture, a motion estimator 1710 estimates motion in the current picture 1705 with respect to up to four reconstructed reference pictures (for an interlaced B-field, for example). Typically, a motion estimator estimates motion in a B-picture with respect to one or more temporally previous reference pictures and one or more temporally future reference pictures. Accordingly, the encoder system 1700 can use the separate stores 1720 and 1722 for multiple reference pictures. For more information on progressive B-frames and interlaced B-frames and B-fields, see U.S. patent application Ser. No. 10/622,378, entitled, "Advanced Bi-Directional Predictive Coding of Video Frames," filed Jul. 18, 2003, and U.S. patent application Ser. No. 10/882,135, entitled, "Advanced Bi-Directional Predictive Coding of Interlaced Video," filed Jun. 29, 2004, which is hereby incorporated herein by reference.

The motion estimator 1710 can estimate motion by pixel, ½ pixel, ¼ pixel, or other increments, and can switch the resolution of the motion estimation on a picture-by-picture basis or other basis. The motion estimator 1710 (and compensator 1730) also can switch between types of reference picture pixel interpolation (e.g., between bicubic and bilinear) on a per-frame or other basis. The resolution of the motion estimation can be the same or different horizontally and vertically. The motion estimator 1710 outputs as side information motion information 1715 such as differential motion vector information. The encoder 1700 encodes the motion information 1715 by, for example, computing one or more predictors for motion vectors, computing differentials between the motion vectors and predictors, and entropy coding the differentials. To reconstruct a motion vector, a motion compensator 1730 combines a predictor with differential motion vector information. Various techniques for computing motion vector predictors, computing differential motion vectors, and reconstructing motion vectors for interlaced P-frames are described below.

The motion compensator 1730 applies the reconstructed motion vector to the reconstructed picture(s) 1725 to form a motion-compensated current picture 1735. The prediction is rarely perfect, however, and the difference between the motion-compensated current picture 1735 and the original current picture 1705 is the prediction residual 1745. During later reconstruction of the picture, the prediction residual 1745 is added to the motion compensated current picture 1735 to obtain a reconstructed picture that is closer to the original current picture 1705. In lossy compression, however, some information is still lost from the original current picture 1705. Alternatively, a motion estimator and motion compensator apply another type of motion estimation/compensation.

A frequency transformer 1760 converts the spatial domain video information into frequency domain (i.e., spectral) data. For block-based video pictures, the frequency transformer 1760 applies a DCT, variant of DCT, or other block transform to blocks of the pixel data or prediction residual data, producing blocks of frequency transform coefficients. Alternatively, the frequency transformer 1760 applies another conventional frequency transform such as a Fourier transform or uses wavelet or sub-band analysis. The frequency transformer 1760 may apply an 8×8, 8×4, 4×8, 4×4 or other size frequency transform.

A quantizer 1770 then quantizes the blocks of spectral data coefficients. The quantizer applies uniform, scalar quantization to the spectral data with a step-size that varies on a picture-by-picture basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder 1700 can use frame dropping, adaptive filtering, or other techniques for rate control.

The encoder 1700 may use special signaling for a skipped macroblock, which is a macroblock that has no information of certain types. Skipped macroblocks are described in further detail below.

When a reconstructed current picture is needed for subsequent motion estimation/compensation, an inverse quantizer 1776 performs inverse quantization on the quantized spectral data coefficients. An inverse frequency transformer 1766 then performs the inverse of the operations of the frequency transformer 1760, producing a reconstructed prediction residual (for a predicted picture) or a reconstructed key picture. If the current picture 1705 was a key picture, the reconstructed key picture is taken as the reconstructed current picture (not shown). If the current picture 1705 was a predicted picture, the reconstructed prediction residual is added to the motion-compensated current picture 1735 to form the reconstructed current picture. One or both of the picture stores 1720, 1722 buffers the reconstructed current picture for use in motion compensated prediction. In some embodiments, the encoder applies a de-blocking filter to the reconstructed frame to adaptively smooth discontinuities and other artifacts in the picture.

The entropy coder 1780 compresses the output of the quantizer 1770 as well as certain side information (e.g., motion information 1715, quantization step size). Typical entropy coding techniques include arithmetic coding, differential coding, Huffman coding, run length coding, LZ coding, dictionary coding, and combinations of the above. The entropy coder 1780 typically uses different coding techniques for different kinds of information (e.g., DC coefficients, AC coefficients, different kinds of side information), and can choose from among multiple code tables within a particular coding technique.

The entropy coder 1780 provides compressed video information 1795 to the multiplexer ["MUX"] 1790. The MUX 1790 may include a buffer, and a buffer level indicator may be fed back to bit rate adaptive modules for rate control. Before or after the MUX 1790, the compressed video information 1795 can be channel coded for transmission over the network. The channel coding can apply error detection and correction data to the compressed video information 1795.

C. Video Decoder

FIG. 18 is a block diagram of a general video decoder system 1800. The decoder system 1800 receives information 1895 for a compressed sequence of video pictures and produces output including a reconstructed picture 1805 (e.g., progressive video frame, interlaced video frame, or field of an interlaced video frame). Particular embodiments of video decoders typically use a variation or supplemented version of the generalized decoder 1800.

The decoder system 1800 decompresses predicted pictures and key pictures. For the sake of presentation, FIG. 18 shows a path for key pictures through the decoder system 1800 and a path for forward-predicted pictures. Many of the components of the decoder system 1800 are used for decompressing both key pictures and predicted pictures. The exact operations performed by those components can vary depending on the type of information being decompressed.

A DEMUX 1890 receives the information 1895 for the compressed video sequence and makes the received information available to the entropy decoder 1880. The DEMUX 1890 may include a jitter buffer and other buffers as well. Before or after the DEMUX 1890, the compressed video information can be channel decoded and processed for error detection and correction.

The entropy decoder 1880 entropy decodes entropy-coded quantized data as well as entropy-coded side information (e.g., motion information 1815, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder 1880 typically uses different decoding techniques for different kinds of information (e.g., DC coefficients, AC coefficients, different kinds of side information), and can choose from among multiple code tables within a particular decoding technique.

The decoder 1800 decodes the motion information 1815 by, for example, computing one or more predictors for motion vectors, entropy decoding differential motion vectors, and combining decoded differential motion vectors with predictors to reconstruct motion vectors.

A motion compensator 1830 applies motion information 1815 to one or more reference pictures 1825 to form a prediction 1835 of the picture 1805 being reconstructed. For example, the motion compensator 1830 uses one or more macroblock motion vector to find macroblock(s) in the reference picture(s) 1825. One or more picture stores (e.g., picture store 1820, 1822) store previous reconstructed pictures for use as reference pictures. Typically, B-pictures have more than one reference picture (e.g., at least one temporally previous reference picture and at least one temporally future reference picture). Accordingly, the decoder system 1800 can use separate picture stores 1820 and 1822 for multiple reference pictures. The motion compensator 1830 can compensate for motion at pixel, ½ pixel, ¼ pixel, or other increments, and can switch the resolution of the motion compensation on a picture-by-picture basis or other basis. The motion compensator 1830 also can switch between types of reference picture pixel interpolation (e.g., between bicubic and bilinear) on a per-frame or other basis. The resolution of the motion compensation can be the same or different horizontally and vertically. Alternatively, a motion compensator applies another type of motion compensation. The prediction by the motion compensator is rarely perfect, so the decoder 1800 also reconstructs prediction residuals.

An inverse quantizer 1870 inverse quantizes entropy-decoded data. In general, the inverse quantizer applies uniform, scalar inverse quantization to the entropy-decoded data with a step-size that varies on a picture-by-picture basis or other basis. Alternatively, the inverse quantizer applies another type of inverse quantization to the data, for example, to reconstruct after a non-uniform, vector, or non-adaptive quantization, or directly inverse quantizes spatial domain data in a decoder system that does not use inverse frequency transformations.

An inverse frequency transformer 1860 converts the quantized, frequency domain data into spatial domain video information. For block-based video pictures, the inverse frequency transformer 1860 applies an inverse DCT ["IDCT"], variant of IDCT, or other inverse block transform to blocks of the frequency transform coefficients, producing pixel data or prediction residual data for key pictures or predicted pictures, respectively. Alternatively, the inverse frequency transformer 1860 applies another conventional inverse frequency transform such as an inverse Fourier transform or uses wavelet or sub-band synthesis. The inverse frequency transformer 1860 may apply an 8×8, 8×4, 4×8, 4×4, or other size inverse frequency transform.

For a predicted picture, the decoder 1800 combines the reconstructed prediction residual 1845 with the motion compensated prediction 1835 to form the reconstructed picture 1805. When the decoder needs a reconstructed picture 1805 for subsequent motion compensation, one or both of the picture stores (e.g., picture store 1820) buffers the reconstructed picture 1805 for use in predicting the next picture. In some embodiments, the decoder 1800 applies a de-blocking filter to the reconstructed picture to adaptively smooth discontinuities and other artifacts in the picture.

III. Interlaced P-Frames

A typical interlaced video frame consists of two fields (e.g., a top field and a bottom field) scanned at different times. In general, it is more efficient to encode stationary regions of an interlaced video frame by coding fields together ("frame mode" coding). On the other hand, it is often more efficient to code moving regions of an interlaced video frame by coding fields separately ("field mode" coding), because the two fields tend to have different motion. A forward-predicted interlaced video frame may be coded as two separate forward-predicted fields—interlaced P-fields. Coding fields separately for a forward-predicted interlaced video frame may be efficient, for example, when there is high motion throughout the interlaced video frame, and hence much difference between the fields. An interlaced P-field references one or more previously decoded fields. For example, in some implementations, an interlaced P-field references either one or two previously decoded fields. For more information on interlaced P-fields, see U.S. Provisional Patent Application No. 60/501,081, entitled "Video Encoding and Decoding Tools and Techniques," filed Sep. 7, 2003, and U.S. patent application Ser. No. 10/857,473, entitled, "Predicting Motion Vectors for Fields of Forward-predicted Interlaced Video Frames," filed May 27, 2004, which is incorporated herein by reference.

Or, a forward-predicted interlaced video frame may be coded using a mixture of field coding and frame coding, as an interlaced P-frame. For a macroblock of an interlaced P-frame, the macroblock includes lines of pixels for the top and bottom fields, and the lines may be coded collectively in a frame-coding mode or separately in a field-coding mode.

A. Macroblock Types in Interlaced P-Frames

In some implementations, macroblocks in interlaced P-frames can be one of five types: 1MV, 2 Field MV, 4 Frame MV, 4 Field MV, and Intra.

In a 1MV macroblock, the displacement of the four luminance blocks in the macroblock is represented by a single motion vector. A corresponding chroma motion vector can be derived from the luma motion vector to represent the displacements of each of the two 8×8 chroma blocks for the motion vector. For example, referring again to the macroblock arrangement shown in FIG. 19, a 1MV macroblock 1900 includes four 8×8 luminance blocks and two 8×8 chrominance blocks. The displacement of the luminance blocks (Y1 through Y4) are represented by single motion vector, and a corresponding chroma motion vector can be derived from the luma motion vector to represent the displacements of each of the two chroma blocks (U and V).

Figure 21:
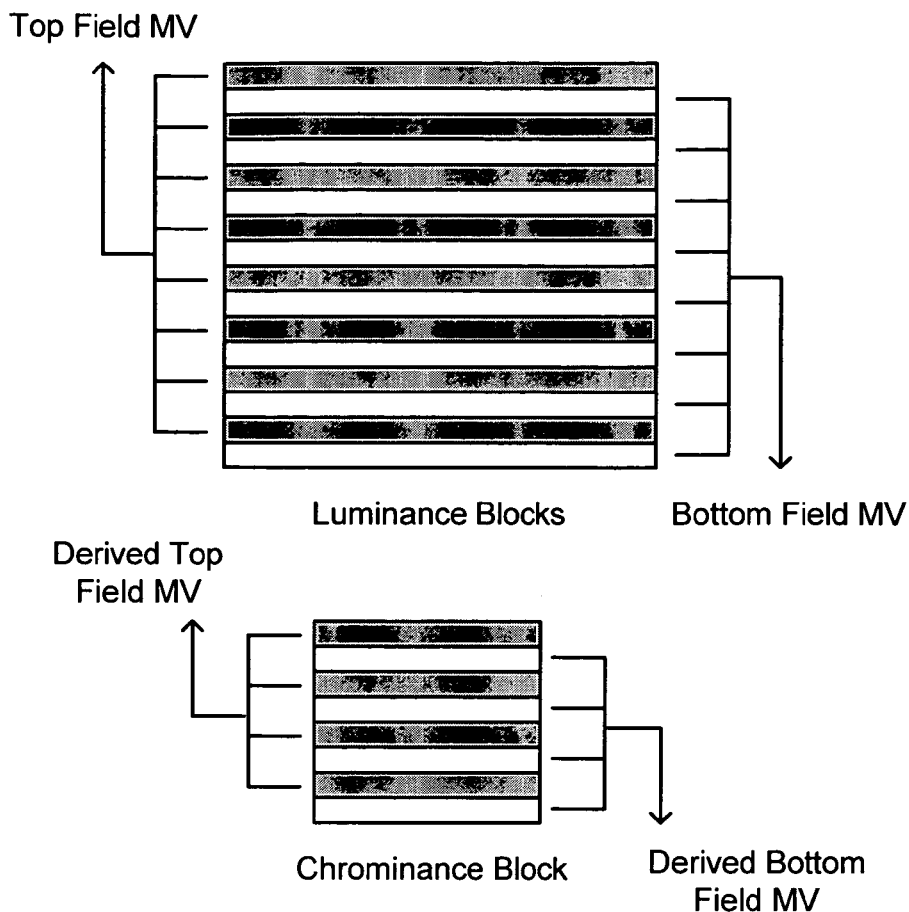
FIG. 21 is a diagram showing motion vectors for luminance blocks and derived motion vectors for chrominance blocks in a 2 field MV macroblock of an interlaced P-frame.

In a 2 Field MV macroblock, the displacement of each field for the 16×16 luminance component in the macroblock is described by a different motion vector. For example, FIG. 21 shows that a top field motion vector describes the displacement of the even lines of the luminance component and that a bottom field motion vector describes the displacement of the odd lines of the luminance component. Using the top field motion vector, an encoder can derive a corresponding top field chroma motion vector that describes the displacement of the even lines of the chroma blocks. Similarly, an encoder can derive a bottom field chroma motion vector that describes the displacements of the odd lines of the chroma blocks.

Figure 22:
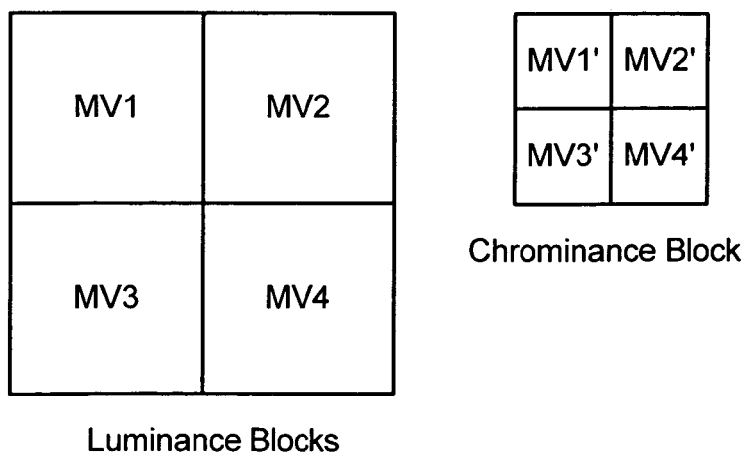
FIG. 22 is a diagram showing different motion vectors for each of four luminance blocks, and derived motion vectors for each of four chrominance sub-blocks, in a 4 frame MV macroblock of an interlaced P-frame.

Referring to FIG. 22, in a 4 Frame MV macroblock, the displacement of each of the four luminance blocks is described by a different motion vector (MV1, MV2, MV3 and MV4). Each chroma block can be motion compensated by using four derived chroma motion vectors (MV1', MV2', MV3' and MV4') that describe the displacement of four 4×4 chroma sub-blocks. A motion vector for each 4×4 chroma sub-block can be derived from the motion vector for the spatially corresponding luminance block.

Referring to FIG. 23, in a 4 Field MV macroblock, the displacement of each field in the 16×16 luminance component is described by two different motion vectors. The lines of the luminance component are subdivided vertically to form two 8×16 regions each comprised of an 8×8 region of even lines interleaved with an 8×8 region of odd lines. For the even lines, the displacement of the left 8×8 region is described by the top left field block motion vector and the displacement of the right 8×8 region is described by the top right field block motion vector. For the odd lines, the displacement of the left 8×8 region is described by the bottom left field block motion vector and the displacement of the right 8×8 region is described by the bottom right field block motion vector. Each chroma block also can be partitioned into four regions and each chroma block region can be motion compensated using a derived motion vector.

For Intra macroblocks, motion is assumed to be zero.

B. Computing Motion Vector Predictors in Interlaced P-Frames

In general, the process of computing the motion vector predictor(s) for a current macroblock in an interlaced P-frame consists of two steps. First, three candidate motion vectors for the current macroblock are gathered from its neighboring macroblocks. For example, in one implementation, candidate motion vectors are gathered based on the arrangement shown in FIGS. 24A-24B (and various special cases for top row macroblocks, etc.). Alternatively, candidate motion vectors can be gathered in some other order or arrangement. Second, the motion vector predictor(s) for the current macroblock is computed from the set of candidate motion vectors. For example, the predictor can be computed using median-of-3 prediction, or by some other method.

IV. Innovations in Macroblock Information Signaling for Interlaced Frame Coded Pictures Described embodiments include techniques and tools for signaling macroblock information for interlaced frame coded pictures (e.g., interlaced P-frames, interlaced B-frames, etc.). For example, described techniques and tools include techniques and tools for signaling macroblock information for interlaced P-frames, and techniques and tools for using and signaling skipped macroblocks in interlaced P-frames and other interlaced pictures (e.g., interlaced B-frames, interlaced P-fields, interlaced B-fields, etc.). Described embodiments implement one or more of the described techniques and tools including, but not limited to, the following:

1. Jointly coding motion compensation type (e.g., 1 Frame MV, 4 Frame MV, 2 Field MV, 4 Field MV, etc.), and potentially other information, with field/frame coding type information (e.g., using the macroblock-level syntax element MBMODE) for interlaced P-frames.
2. Signaling a macroblock skip condition. The signaling can be performed separately from other syntax elements such as MBMODE. The skip condition indicates that the macroblock is a 1MV macroblock, has a zero differential motion vector, and has no coded blocks. The skip information can be coded in a compressed bitplane.

The described techniques and tools can be used in combination with one another or with other techniques and tools, or can be used independently.

A. Skipped Macroblock Signaling

In some implementations, an encoder signals skipped macroblocks. For example, an encoder signals a skipped macroblock in an interlaced frame when a macroblock is coded with one motion vector, has a zero motion vector differential, and has no coded blocks (i.e., no residuals for any block). The skip information can coded as a compressed bitplane (e.g., at frame level) or can be signaled on a one bit per macroblock basis (e.g., at macroblock level). The signaling of the skip condition for the macroblock is separate from the signaling of a macroblock mode for the macroblock. A decoder performs corresponding decoding.

This definition of a skipped macroblock takes advantage of the observation that when more than one motion vector is used to encode a macroblock, the macroblock is rarely skipped because it is unlikely that all of the motion vector differentials will be zero and that all of the blocks will not be coded. Thus, when a macroblock is signaled as being skipped, the macroblock mode (1MV) is implied from the skip condition and need not be sent for the macroblock. In interlaced P-frames, a 1MV macroblock is motion compensated with one frame motion vector.

Figure 25:
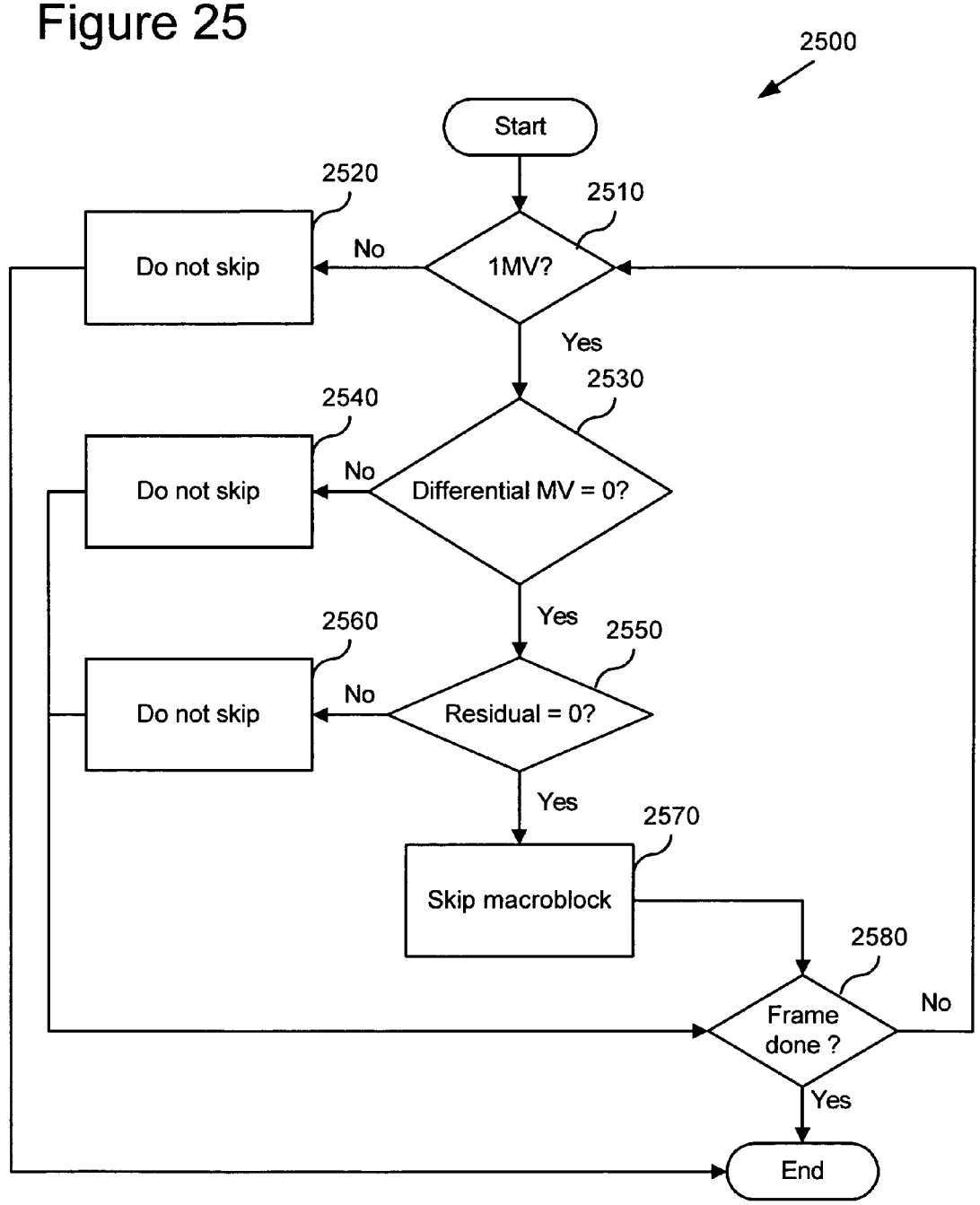
FIG. 25 is a flow chart showing a technique for determining whether to skip coding of particular macroblocks in an interlaced predicted frame.

FIG. 25 shows a technique 2500 for determining whether to skip coding of particular macroblocks in an interlaced predicted frame (e.g., an interlaced P-frame, an interlaced B-frame, or a frame comprising interlaced P-fields and/or interlaced B-fields). For a given macroblock, the encoder checks whether the macroblock is a 1MV macroblock at 2510. At 2520, if the macroblock is not a 1MV macroblock, the encoder does not skip the macroblock. Otherwise, at 2530, the encoder checks whether the one motion vector for the macroblock is equal to its causally predicted motion vector (e.g., whether the differential motion vector for the macroblock is equal to zero). At 2540, if the motion for a macroblock does not equal the causally predicted motion, the encoder does not skip the macroblock. Otherwise, at 2550, the encoder checks whether there is any residual to be encoded for the blocks of the macroblock. At 2560, if there is a residual to be coded, the encoder does not skip the macroblock. At 2570, if there is no residual for the blocks of the macroblock, the encoder skips the macroblock. At 2580, the encoder can continue to encode or skip macroblocks until encoding is done.

In one implementation, the macroblock-level SKIPMB-BIT field (which can also be labeled SKIPMB, etc.) indicates the skip condition for a macroblock. If the SKIPMBBIT field is 1, then the current macroblock is skipped and no other information is sent after the SKIPMBBIT field. On the other hand, if the SKIPMBBIT field is not 1, the MBMODE field is decoded to indicate the type of macroblock and other information regarding the current macroblock, such as information described below in Section IV.B.

At frame level, the SKIPMB field indicates skip information for macroblocks in the frame. In one implementation, the skip information can be encoded in one of several modes. For example, in raw coding mode, the SKIPMB field indicates the presence of SKIPMBBIT at macroblock level. In a bitplane coding mode, the SKIPMB field stores skip information in a compressed bit plane. Available bitplane coding modes include normal-2 mode, differential-2 mode, normal-6 mode, differential-6 mode, rowskip mode, and columnskip mode. Bitplane coding modes are described in further detail in Section V.C, below. The decoded SKIPMB bitplane contains one bit per macroblock and indicates the skip condition for each respective macroblock.

Alternatively, skipped macroblocks are signaled in some other way or at some other level in the bitstream. For example, a compressed bitplane is sent at field level. As another alternative, the skip condition can be defined to imply information about a skipped macroblock other than and/or in addition to the information described above.

B. Macroblock Mode Signaling

In some implementations, an encoder jointly encodes motion compensation type and potentially other information about a macroblock with field/frame coding type information for the macroblock. For example, an encoder jointly encodes one of five motion compensation types (1MV, 4 Frame MV, 2 Field MV, 4 Field MV, and intra) with a field transform/frame transform/no coded blocks event using one or more variable length coding tables. A decoder performs corresponding decoding.

Jointly coding motion compensation type and field/frame coding type information for a macroblock takes advantage of the observation that certain field/frame coding types are more likely to occur in certain contexts for a macroblock of a given motion compensation type. Variable length coding can then be used to assigned shorter codes to the more likely combinations of motion compensation type and field/frame coding type. For even more flexibility, multiple variable length coding tables can be used, and an encoder can switch between the tables depending on the situation. Thus, jointly coding motion compensation type and field/frame coding type information for a macroblock can provide savings in coding overhead that would otherwise be used to signal field/frame coding type separately for each macroblock.

For example, in some implementations an encoder selects a motion compensation type (e.g., 1MV, 4 Frame MV, 2 Field MV, or 4 Field MV) and a field/frame coding type (e.g., field, frame, or no coded blocks) for a macroblock. The encoder jointly encodes the motion compensation type and the field/frame coding type for the macroblock. The encoder also can encode other information jointly with the motion compensation type and field/frame coding type. For example, the encoder can jointly encode information indicating the presence or absence of a differential motion vector for the macroblock (e.g., for a macroblock having one motion vector).

Figure 26:
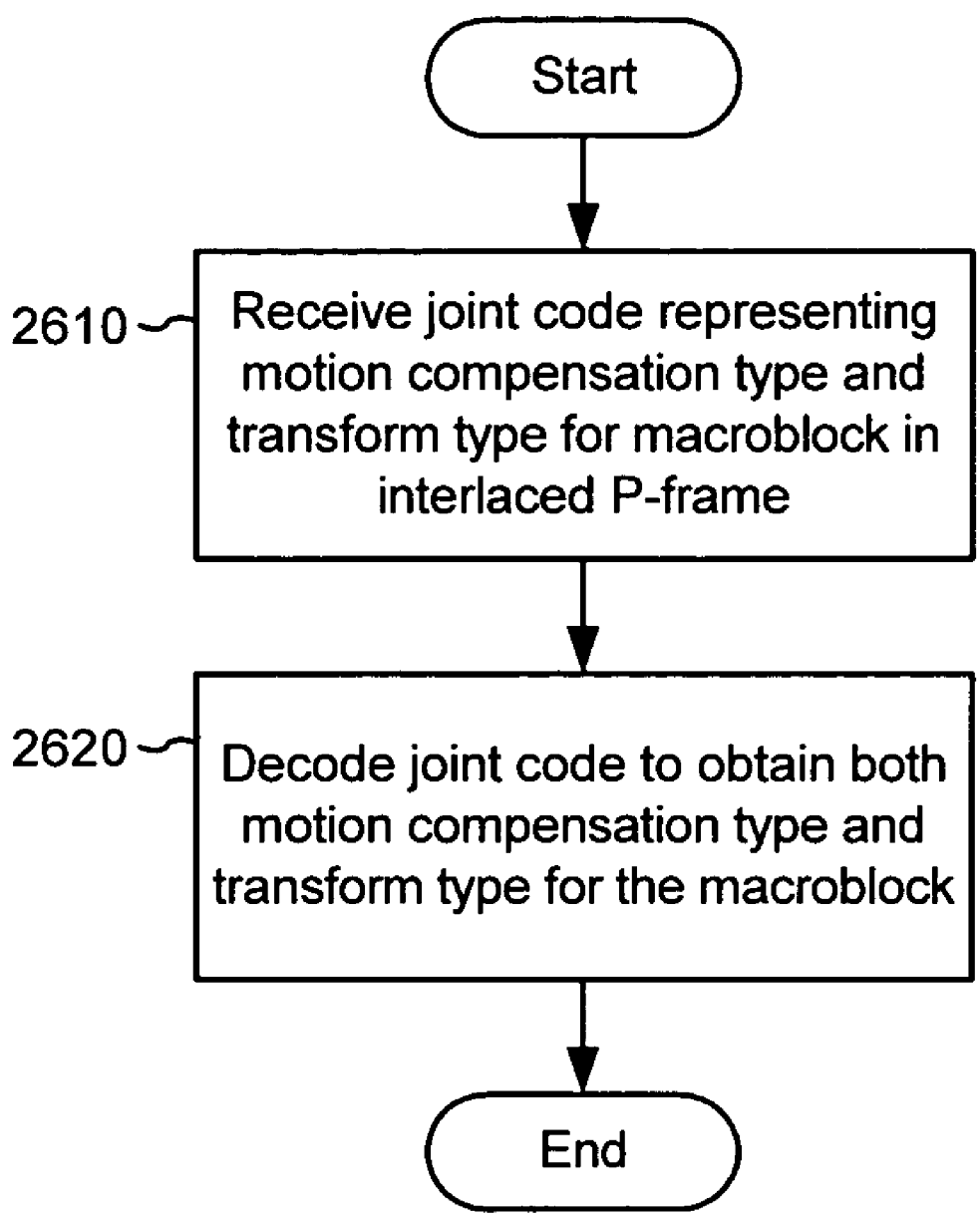
FIG. 26 is a flow chart showing a technique for decoding jointly coded motion compensation type information and field/frame coding type information for a macroblock in an interlaced P-frame.

A decoder performs corresponding decoding. For example, FIG. 26 shows a technique 2600 for decoding jointly coded motion compensation type information and field/frame coding type information for a macroblock in an interlaced P-frame in some implementations. At 2610, a decoder receives macroblock information which includes a joint code (e.g., a variable length code from a variable coding table) representing motion compensation type and field/frame coding type for a macroblock. At 2620, the decoder decodes the joint code (e.g., by looking up the joint code in a variable length coding table) to obtain motion compensation type information and field/frame coding type information for the macroblock.

In one implementation, the macroblock-level bitstream element MBMODE jointly specifies the type of macroblock (1MV, 4 Frame MV, 2 Field MV, 4 Field MV, or intra), field/frame coding types for inter-coded macroblock (field, frame, or no coded blocks), and whether there is a differential motion vector for a 1MV macroblock. In this example, MBMODE can take one of 15 possible values. Let <MVP> denote the signaling of whether a nonzero 1MV differential motion vector is present or absent. Let <Field/Frame transform> denote the signaling of whether the residual of the macroblock is (1) frame-coded; (2) field-coded; or (3) zero coded blocks (i.e. CBP=0). MBMODE signals the following information jointly:

MBMODE={<1MV, MVP, Field/Frame transform>, <2 Field MV, Field/Frame transform>, <4 Frame MV, Field/Frame transform>, <4 Field MV, Field/Frame transform>, <INTRA>};

The case <1MV, MVP=0, CBP=0>, is not signaled by MBMODE, but is signaled by the skip condition. (Examples of signaling this skip condition are provided above in Section IV.A.)

In this example, for inter-coded macroblocks, the CBPCY syntax element is not decoded when <Field/frame Transform> in MBMODE indicates no coded blocks. On the other hand, if <Field/frame Transform> in MBMODE indicates field or frame transform, then CBPCY is decoded. For non-1MV inter-coded macroblocks, an additional field is sent to indicate which of the differential motion vectors is non-zero. In the case of 2 Field MV macroblocks, the 2MVBP field is sent to indicate which of the two motion vectors contain nonzero differential motion vectors. Similarly, the 4MVBP field is sent to indicate which of four motion vectors contain nonzero differential motion vectors. For intra-coded macroblocks, the Field/Frame coding types and zero coded blocks are coded in separate fields.

Alternatively, an encoder/decoder uses joint coding with different combinations of motion compensation types and field/frame coding types. As another alternative, an encoder/decoder jointly encodes/decodes additional information other than the presence of motion vector differentials.

In some implementations, an encoder/decoder uses one of several variable length code tables to encode MBMODE and can adaptively switch between code tables. For example, in some implementations, the frame-level syntax element MBMODETAB is a 2-bit field that indicates the table used to decode the MBMODE for macroblocks in the frame. In this example, the tables are grouped into sets of four tables, and the set of tables used depends on whether four-motion-vector coding is enabled for the frame.

Exemplary MBMODE variable length code tables (e.g., Tables 0-3 for each set—Mixed MV or 1MV) are provided below in Tables 1-8:

TABLE 1

Interlace P-Frame Mixed MV MB Mode Table 0

| MB Type | MV Present | Transform | VLC Codeword | VLC Size | VLC (binary) |
|---|---|---|---|---|---|
| 1 MV | 1 | Frame | 22 | 5 | 10110 |
| 1 MV | 1 | Field | 17 | 5 | 10001 |
| 1 MV | 1 | No CBP | 0 | 2 | 00 |
| 1 MV | 0 | Frame | 47 | 6 | 101111 |
| 1 MV | 0 | Field | 32 | 6 | 100000 |
| 2 Field MV | N/A | Frame | 10 | 4 | 1010 |
| 2 Field MV | N/A | Field | 1 | 2 | 01 |
| 2 Field MV | N/A | No CBP | 3 | 2 | 11 |
| 4 Frame MV | N/A | Frame | 67 | 7 | 1000011 |
| 4 Frame MV | N/A | Field | 133 | 8 | 10000101 |
| 4 Frame MV | N/A | No CBP | 132 | 8 | 10000100 |
| 4 Field MV | N/A | Frame | 92 | 7 | 1011100 |
| 4 Field MV | N/A | Field | 19 | 5 | 10011 |
| 4 Field MV | N/A | No CBP | 93 | 7 | 1011101 |
| INTRA | N/A | N/A | 18 | 5 | 10010 |

TABLE 2

Interlace Frame Mixed MV MB Mode Table 1

| MB Type | MV Present | Transform | VLC Codeword | VLC Size | VLC (binary) |
|---|---|---|---|---|---|
| 1 MV | 1 | Frame | 3 | 3 | 011 |
| 1 MV | 1 | Field | 45 | 6 | 101101 |
| 1 MV | 1 | No CBP | 0 | 3 | 000 |
| 1 MV | 0 | Frame | 7 | 3 | 111 |
| 1 MV | 0 | Field | 23 | 5 | 10111 |
| 2 Field MV | N/A | Frame | 6 | 3 | 110 |
| 2 Field MV | N/A | Field | 1 | 3 | 001 |
| 2 Field MV | N/A | No CBP | 2 | 3 | 010 |
| 4 Frame MV | N/A | Frame | 10 | 4 | 1010 |
| 4 Frame MV | N/A | Field | 39 | 6 | 100111 |
| 4 Frame MV | N/A | No CBP | 44 | 6 | 101100 |
| 4 Field MV | N/A | Frame | 8 | 4 | 1000 |

TABLE 2-continued

Interlace Frame Mixed MV MB Mode Table 1

| MB Type | MV Present | Transform | VLC Codeword | VLC Size | VLC (binary) |
|---|---|---|---|---|---|
| 4 Field MV | N/A | Field | 18 | 5 | 10010 |
| 4 Field MV | N/A | No CBP | 77 | 7 | 1001101 |
| INTRA | N/A | N/A | 76 | 7 | 1001100 |

TABLE 3

Interlace Frame Mixed MV MB Mode Table 2

| MB Type | MV Present | Transform | VLC Codeword | VLC Size | VLC (binary) |
|---|---|---|---|---|---|
| 1 MV | 1 | Frame | 15 | 4 | 1111 |
| 1 MV | 1 | Field | 6 | 3 | 110 |
| 1 MV | 1 | No CBP | 28 | 5 | 11100 |
| 1 MV | 0 | Frame | 9 | 5 | 01001 |
| 1 MV | 0 | Field | 41 | 7 | 0101001 |
| 2 Field MV | N/A | Frame | 6 | 4 | 0110 |
| 2 Field MV | N/A | Field | 2 | 2 | 10 |
| 2 Field MV | N/A | No CBP | 15 | 5 | 01111 |
| 4 Frame MV | N/A | Frame | 14 | 5 | 01110 |
| 4 Frame MV | N/A | Field | 8 | 5 | 01000 |
| 4 Frame MV | N/A | No CBP | 40 | 7 | 0101000 |
| 4 Field MV | N/A | Frame | 29 | 5 | 11101 |
| 4 Field MV | N/A | Field | 0 | 2 | 00 |
| 4 Field MV | N/A | No CBP | 21 | 6 | 010101 |
| INTRA | N/A | N/A | 11 | 5 | 01011 |

TABLE 4

Interlace Frame Mixed MV MB Mode Table 3

| MB Type | MV Present | Transform | VLC Codeword | VLC Size | VLC (binary) |
|---|---|---|---|---|---|
| 1 MV | 1 | Frame | 7 | 4 | 0111 |
| 1 MV | 1 | Field | 198 | 9 | 011000110 |
| 1 MV | 1 | No CBP | 1 | 1 | 1 |
| 1 MV | 0 | Frame | 2 | 3 | 010 |
| 1 MV | 0 | Field | 193 | 9 | 011000001 |
| 2 Field MV | N/A | Frame | 13 | 5 | 01101 |
| 2 Field MV | N/A | Field | 25 | 6 | 011001 |
| 2 Field MV | N/A | No CBP | 0 | 2 | 00 |
| 4 Frame MV | N/A | Frame | 97 | 8 | 01100001 |
| 4 Frame MV | N/A | Field | 1599 | 12 | 011000111111 |
| 4 Frame MV | N/A | No CBP | 98 | 8 | 01100010 |
| 4 Field MV | N/A | Frame | 398 | 10 | 0110001100 |
| 4 Field MV | N/A | Field | 798 | 11 | 01100011110 |
| 4 Field MV | N/A | No CBP | 192 | 9 | 011000000 |
| INTRA | N/A | N/A | 1598 | 12 | 011000111110 |

TABLE 5

Interlace Frame 1 MV MB Mode Table 0

| MB Type | MV Present | Transform | VLC Codeword | VLC Size | VLC (binary) |
|---|---|---|---|---|---|
| 1 MV | 1 | Frame | 9 | 4 | 1001 |
| 1 MV | 1 | Field | 22 | 5 | 10110 |
| 1 MV | 1 | No CBP | 0 | 2 | 00 |
| 1 MV | 0 | Frame | 17 | 5 | 10001 |
| 1 MV | 0 | Field | 16 | 5 | 10000 |
| 2 Field MV | N/A | Frame | 10 | 4 | 1010 |
| 2 Field MV | N/A | Field | 1 | 2 | 01 |
| 2 Field MV | N/A | No CBP | 3 | 2 | 11 |
| INTRA | N/A | N/A | 23 | 5 | 10111 |

TABLE 6

Interlace Frame 1 MV MB Mode Table 1

| MB Type | MV Present | Transform | VLC Codeword | VLC Size | VLC (binary) |
|---|---|---|---|---|---|
| 1 MV | 1 | Frame | 7 | 3 | 111 |
| 1 MV | 1 | Field | 0 | 4 | 0000 |
| 1 MV | 1 | No CBP | 5 | 6 | 000101 |
| 1 MV | 0 | Frame | 2 | 2 | 10 |
| 1 MV | 0 | Field | 1 | 3 | 001 |
| 2 Field MV | N/A | Frame | 1 | 2 | 01 |
| 2 Field MV | N/A | Field | 6 | 3 | 110 |
| 2 Field MV | N/A | No CBP | 3 | 5 | 00011 |
| INTRA | N/A | N/A | 4 | 6 | 000100 |

TABLE 7

Interlace Frame 1 MV MB Mode Table 2

| MB Type | MV Present | Transform | VLC Codeword | VLC Size | VLC (binary) |
|---|---|---|---|---|---|
| 1 MV | 1 | Frame | 1 | 2 | 01 |
| 1 MV | 1 | Field | 0 | 2 | 00 |
| 1 MV | 1 | No CBP | 10 | 4 | 1010 |
| 1 MV | 0 | Frame | 23 | 5 | 10111 |
| 1 MV | 0 | Field | 44 | 6 | 101100 |
| 2 Field MV | N/A | Frame | 8 | 4 | 1000 |
| 2 Field MV | N/A | Field | 3 | 2 | 11 |
| 2 Field MV | N/A | No CBP | 9 | 4 | 1001 |
| INTRA | N/A | N/A | 45 | 6 | 101101 |

TABLE 8

Interlace Frame 1 MV MB Mode Table 3

| MB Type | MV Present | Transform | VLC Codeword | VLC Size | VLC (binary) |
|---|---|---|---|---|---|
| 1 MV | 1 | Frame | 7 | 4 | 0111 |
| 1 MV | 1 | Field | 97 | 8 | 01100001 |
| 1 MV | 1 | No CBP | 1 | 1 | 1 |
| 1 MV | 0 | Frame | 2 | 3 | 010 |
| 1 MV | 0 | Field | 49 | 7 | 0110001 |
| 2 Field MV | N/A | Frame | 13 | 5 | 01101 |
| 2 Field MV | N/A | Field | 25 | 6 | 011001 |
| 2 Field MV | N/A | No CBP | 0 | 2 | 00 |
| INTRA | N/A | N/A | 96 | 8 | 01100000 |

V. Combined Implementations

A detailed combined implementation for a bitstream syntax, semantics, and decoder are now described, in addition to an alternative combined implementation with minor differences from the main combined implementation.

A. Bitstream Syntax

In various combined implementations, data for interlaced pictures is presented in the form of a bitstream having plural layers (e.g., sequence, entry point, frame, field, macroblock, block and/or sub-block layers).

In the syntax diagrams, arrow paths show the possible flows of syntax elements. Syntax elements shown with square-edged boundaries indicate fixed-length syntax elements; those with rounded boundaries indicate variable-length syntax elements and those with a rounded boundary within an outer rounded boundary indicate a syntax element (e.g., a bitplane) made up of simpler syntax elements. A fixed-length syntax element is defined to be a syntax element for which the length of the syntax element is not dependent on data in the syntax element itself; the length of a fixed-length syntax element is either constant or determined by prior data in the syntax flow. A lower layer in a layer diagram (e.g., a macroblock layer in a frame-layer diagram) is indicated by a rectangle within a rectangle.

Figure 27:
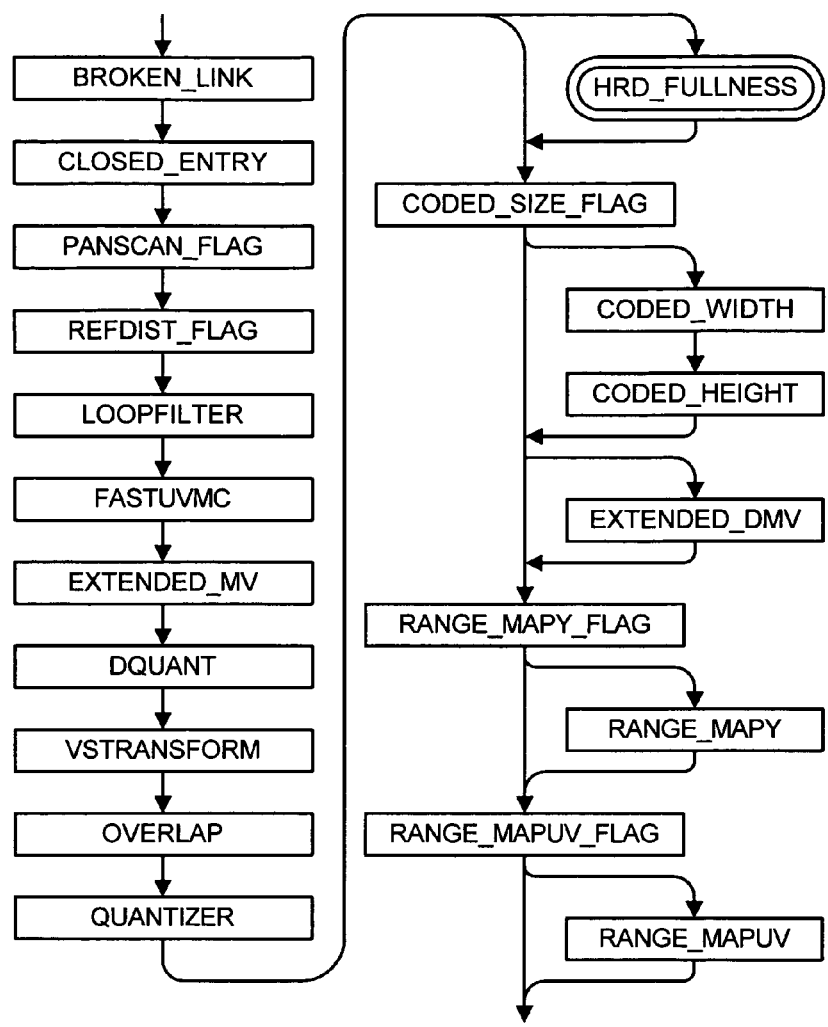
FIG. 27 is a diagram showing an entry-point-layer bitstream syntax in a combined implementation.

Entry-point-level bitstream elements are shown in FIG. 27. In general, an entry point marks a position in a bitstream (e.g., an I-frame or other key frame) at which a decoder can begin decoding. In other words, no pictures before the entry point in the bitstream are needed to decode pictures after the entry point. An entry point header can be used to signal changes in coding control parameters (e.g., enabling or disabling compression tools (e.g., in-loop deblocking filtering) for frames following an entry point).

Figure 28:
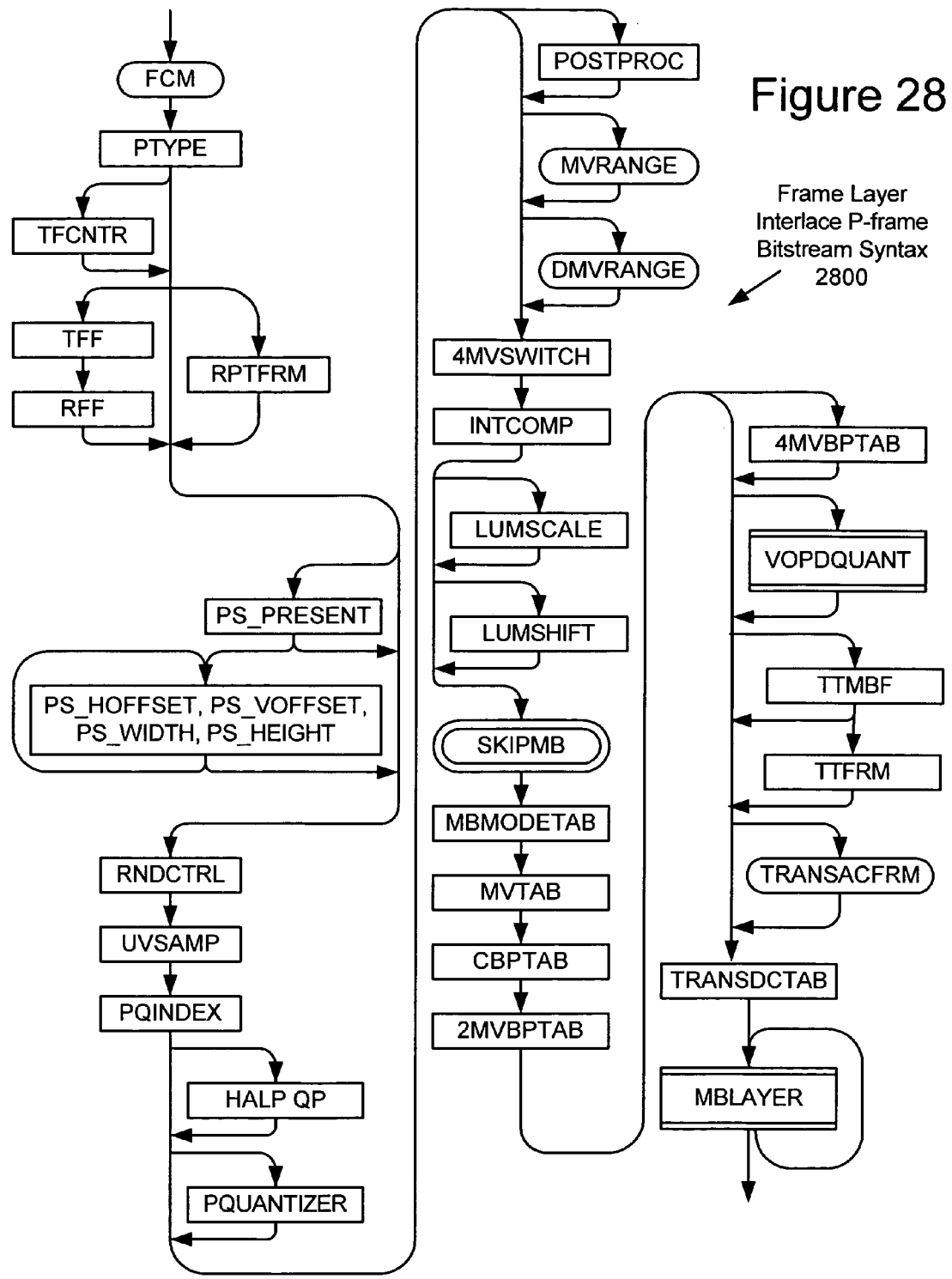
FIG. 28 is a diagram showing a frame-layer bitstream syntax for interlaced P-frames in a combined implementation.
Figure 29:
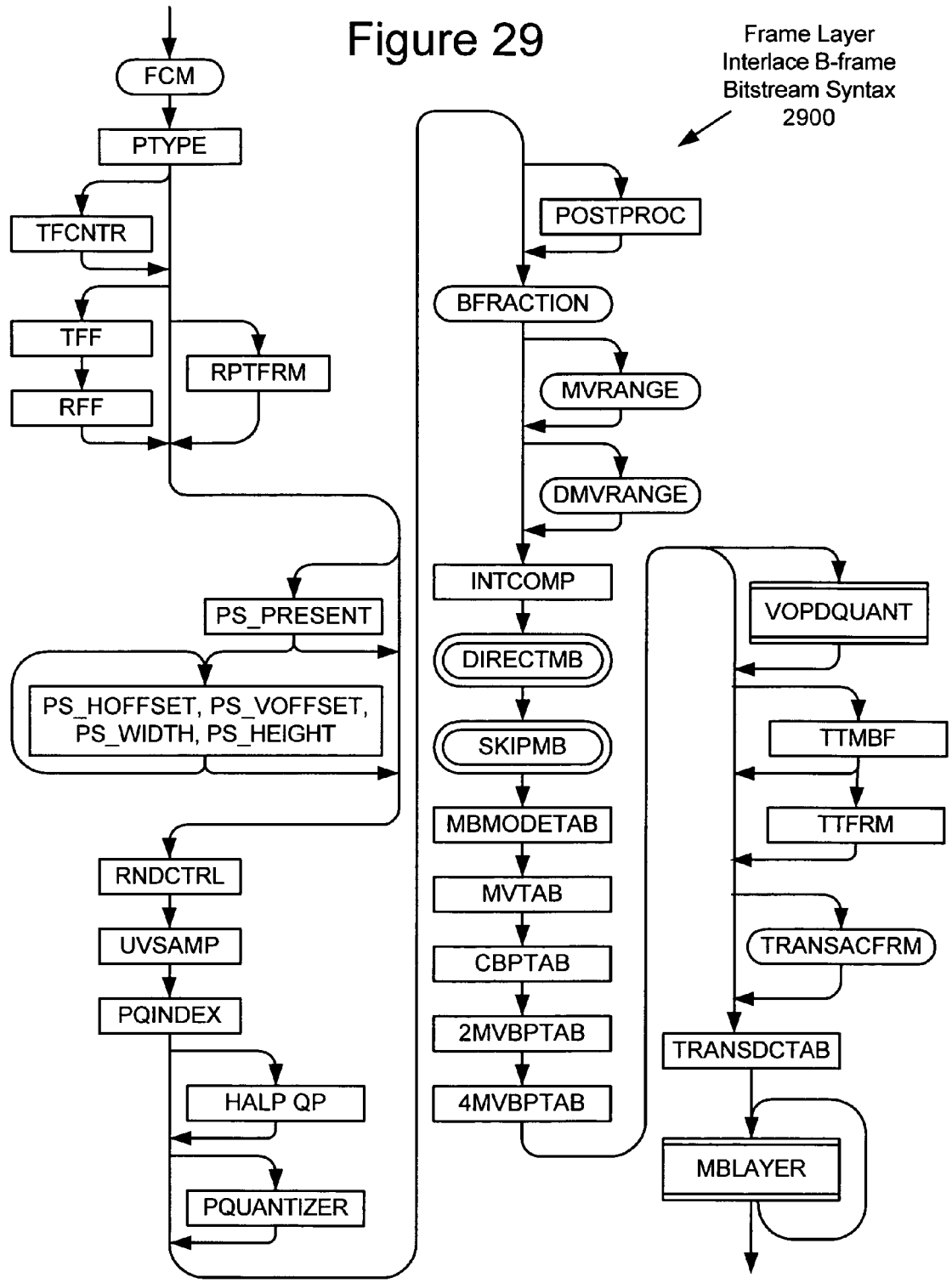
FIG. 29 is a diagram showing a frame-layer bitstream syntax for interlaced B-frames in a combined implementation.
Figure 31:
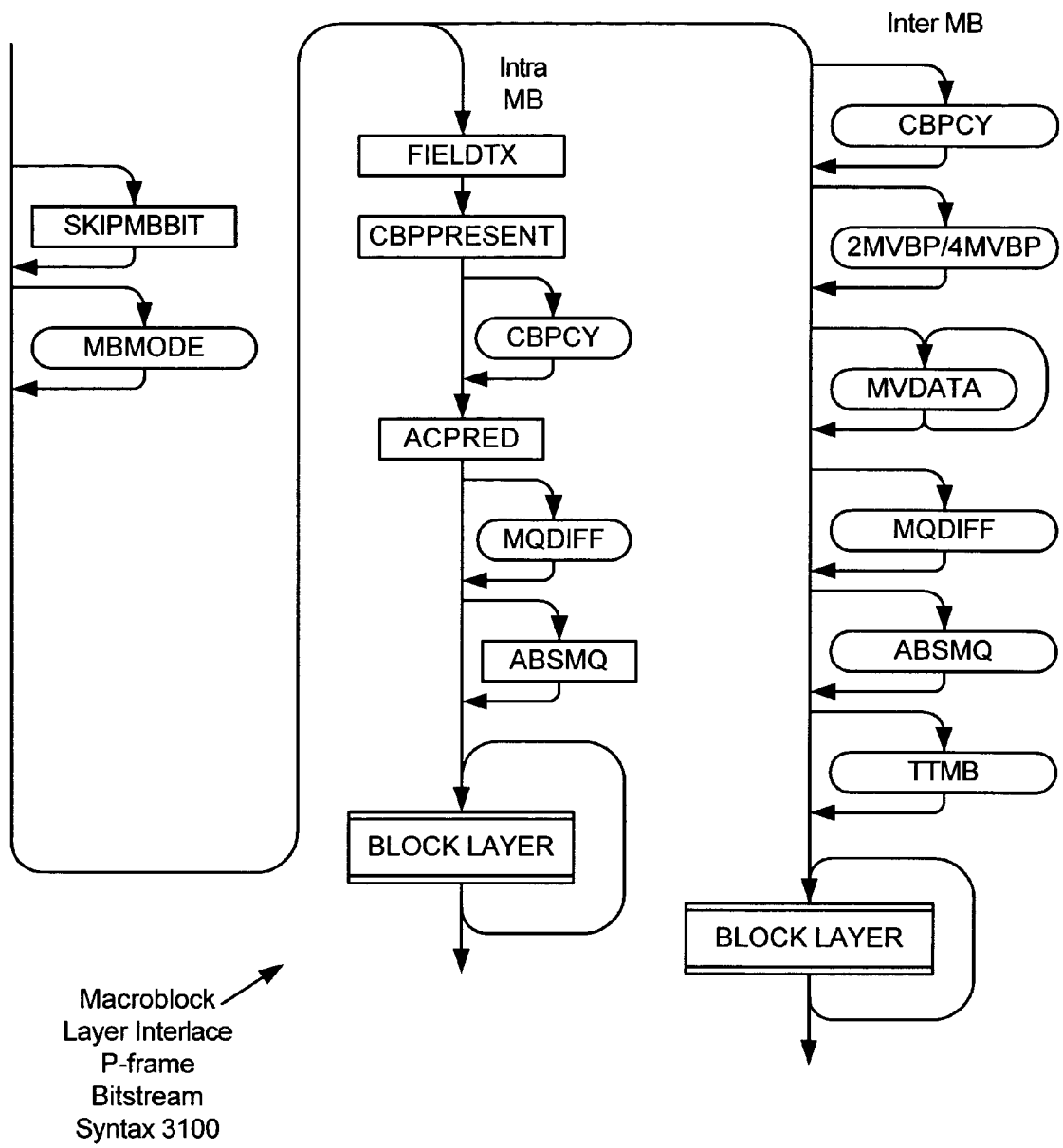
FIG. 31 is a diagram showing a macroblock-layer bitstream syntax for macroblocks of interlaced P-frames in a combined implementation.

For interlaced P-frames and B-frames, frame-level bitstream elements are shown in FIGS. 28 and 29, respectively. Data for each frame consists of a frame header followed by data for the macroblock layer (whether for intra or various inter type macroblocks). The bitstream elements that make up the macroblock layer for interlaced P-frames (whether for intra or various inter type macroblocks) are shown in FIG. 31. Bitstream elements in the macroblock layer for interlaced P-frames may be present for macroblocks in other interlaced pictures (e.g., interlaced B-frames, interlaced P-fields, interlaced B-fields, etc.)

Figure 30:
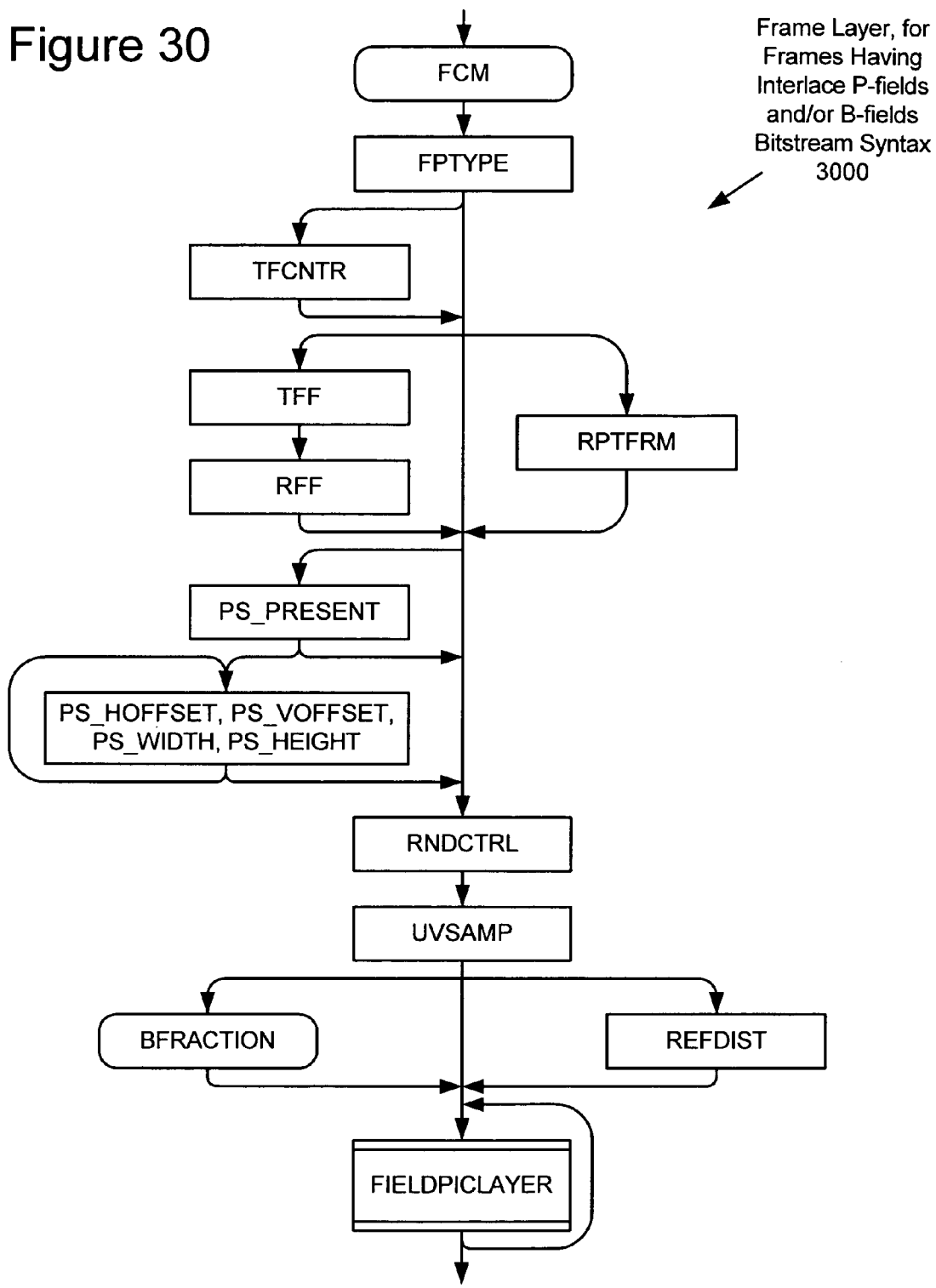
FIG. 30 is a diagram showing a frame-layer bitstream syntax for interlaced P-fields or B-fields in a combined implementation.

For interlaced video frames with interlaced P-fields and/or B-fields, frame-level bitstream elements are shown in FIG. 30. Data for each frame consists of a frame header followed by data for the field layers (shown as the repeated "FieldPicLayer" element per field) and data for the macroblock layers (whether for intra, 1MV, or 4MV macroblocks).

The following sections describe selected bitstream elements in the frame and macroblock layers that are related to signaling for interlaced pictures. Although the selected bitstream elements are described in the context of a particular layer, some bitstream elements can be used in more than one layer.

1. Selected Entry Point Layer Elements

Loop Filter (LOOPFILTER) (1 Bit)

LOOPFILTER is a Boolean flag that indicates whether loop filtering is enabled for the entry point segment. If LOOPFILTER=0, then loop filtering is not enabled. If LOOPFILTER=1, then loop filtering is enabled. In an alternative combined implementation, LOOPFILTER is a sequence level element.

Extended Motion Vectors (EXTENDED_MV) (1 Bit)

EXTENDED_MV is a 1-bit syntax element that indicates whether extended motion vectors is turned on (value 1) or off (value 0). EXTENDED_MV indicates the possibility of extended motion vectors (signaled at frame level with the syntax element MVRANGE) in P-frames and B-frames.

Extended Differential Motion Vector Range (EXTENDED_DMV) (1 Bit)

EXTENDED_DMV is a 1-bit syntax element that is present if EXTENDED_MV=1. If EXTENDED_DMV is 1, extended differential motion vector range (DMVRANGE) shall be signaled at frame layer for the P-frames and B-frames within the entry point segment. If EXTENDED_DMV is 0, DMVRANGE shall not be signaled.

FAST UV Motion Comp (FASTUVMC) (1 Bit)

FASTUVMC is a Boolean flag that controls the sub-pixel interpolation and rounding of chroma motion vectors. If FASTUVMC=1, the chroma motion vectors that are at quarter-pel offsets will be rounded to the nearest half or full-pel positions.

If FASTUVMC=0, no special rounding or filtering is done for chroma. The FASTUVMC syntax element is ignored in interlaced P-frames and interlaced B-frames.

Variable Sized Transform (VSTRANSFORM) (1 Bit)

VSTRANSFORM is a Boolean flag that indicates whether variable-sized transform coding is enabled for the sequence. If VSTRANSFORM=0, then variable-sized transform coding is not enabled. If VSTRANSFORM=1, then variable-sized transform coding is enabled.

2. Selected Frame Layer Elements

FIGS. 28 and 29 are diagrams showing frame-level bitstream syntaxes for interlaced P-frames and interlaced B-frames, respectively. FIG. 30 is a diagram showing a frame-layer bitstream syntax for frames containing interlaced P-fields, and/or B-fields (or potentially other kinds of interlaced fields). Specific bitstream elements are described below.

Frame Coding Mode (FCM) (Variable Size)

FCM is a variable length codeword ["VLC"] used to indicate the picture coding type. FCM takes on values for frame coding modes as shown in Table 9 below:

TABLE 9

| Frame Coding Mode VLC | |
|---|---|
| FCM value | Frame Coding Mode |
| 0 | Progressive |
| 10 | Frame-Interlace |
| 11 | Field-Interlace |

Field Picture Type (FPTYPE) (3 Bits)

FPTYPE is a three-bit syntax element present in the frame header for a frame including interlaced P-fields and/or interlaced B-fields, and potentially other kinds of fields. FPTYPE takes on values for different combinations of field types in the interlaced video frame, according to Table 10 below.

TABLE 10

| Field Picture Type FLC | | |
|---|---|---|
| FPTYPE FLC | First Field Type | Second Field Type |
| 000 | I | I |
| 001 | I | P |
| 010 | P | I |
| 011 | P | P |
| 100 | B | B |
| 101 | B | BI |
| 110 | BI | B |
| 111 | BI | BI |

Picture Type (PTYPE) (Variable Size)

PTYPE is a variable size syntax element present in the frame header for interlaced P-frames and interlaced B-frames (or other kinds of interlaced frames such as interlaced I-frames). PTYPE takes on values for different frame types according to Table 11 below.

TABLE 11

| Picture Type VLC | |
|---|---|
| PTYPE VLC | Picture Type |
| 110 | I |
| 0 | P |
| 10 | B |
| 1110 | BI |
| 1111 | Skipped |

If PTYPE indicates that the frame is skipped then the frame is treated as a P-frame which is identical to its reference frame. The reconstruction of the skipped frame is equivalent conceptually to copying the reference frame. A skipped frame means that no further data is transmitted for this frame.

UV Sampling Format (UVSAMP) (1 Bit)

UVSAMP is a 1-bit syntax element that is present when the sequence-level field INTERLACE=1. UVSAMP indicates the type of chroma subsampling used for the current frame. If UVSAMP=1, then progressive subsampling of the chroma is used, otherwise, interlace subsampling of the chroma is used. This syntax element does not affect decoding of the bitstream.

Extended MV Range (MVRANGE) (Variable Size)

MVRANGE is a variable-sized syntax element present when the entry-point-layer EXTENDED_MV bit is set to 1. The MVRANGE VLC represents a motion vector range.

Extended Differential MV Range (DMVRANGE) (Variable Size)

DMVRANGE is a variable-sized syntax element present if the entry-point-layer syntax element EXTENDED_DMV=1. The DMVRANGE VLC represents a motion vector differential range.

4 Motion Vector Switch (4MVSWITCH) (Variable Size or 1 Bit)

For interlaced P-frames, the 4MVSWITCH syntax element is a 1-bit flag. If 4MVSWITCH is set to zero, the macroblocks in the picture have only one motion vector or two motion vectors, depending on whether the macroblock has been frame-coded or field-coded, respectively. If 4MVSWITCH is set to 1, there may be 1, 2 or 4 motion vectors per macroblock.

Skipped Macroblock Decoding (SKIPMB) (Variable Size)

For interlaced P-frames, the SKIPMB syntax element is a compressed bitplane containing information that indicates the skipped/not-skipped status of each macroblock in the picture. The decoded bitplane represents the skipped/not-skipped status for each macroblock with 1-bit values. A value of 0 indicates that the macroblock is not skipped. A value of 1 indicates that the macroblock is coded as skipped. A skipped status for a macroblock in interlaced P-frames means that the decoder treats the macroblock as 1MV with a motion vector differential of zero and a coded block pattern of zero. No other information is expected to follow for a skipped macroblock.

Macroblock Mode Table (MBMODETAB) (2 or 3 Bits)

The MBMODETAB syntax element is a fixed-length field. For interlaced P-frames, MBMODETAB is a 2-bit value that indicates which one of four code tables is used to decode the macroblock mode syntax element (MBMODE) in the macroblock layer. There are two sets of four code tables and the set that is being used depends on whether 4MV is used or not, as indicated by the 4MVSWITCH flag.

Motion Vector Table (MVTAB) (2 or 3 Bits)

The MVTAB syntax element is a fixed length field. For interlaced P-frames, MVTAB is a 2-bit syntax element that indicates which of the four progressive (or, one-reference) motion vector code tables are used to code the MVDATA syntax element in the macroblock layer.

2MV Block Pattern Table (2MVBPTAB) (2 Bits)

The 2MVBPTAB syntax element is a 2-bit value that signals which of four code tables is used to decode the 2MV block pattern (2MVBP) syntax element in 2MV field macroblocks.

4MV Block Pattern Table (4MVBPTAB) (2 Bits)

The 4MVBPTAB syntax element is a 2-bit value that signals which of four code tables is used to decode the 4MV block pattern (4MVBP) syntax element in 4MV macroblocks. For interlaced P-frames, it is present if the 4MVSWITCH syntax element is set to 1.

Macroblock-Level Transform Type Flag (TTMBF) (1 Bit)

This syntax element is present in P-frames and B-frames if the sequence-level syntax element VSTRANSFORM=1. TTMBF is a one-bit syntax element that signals whether transform type coding is enabled at the frame or macroblock level. If TTMBF=1, the same transform type is used for all blocks in the frame. In this case, the transform type is signaled in the Frame-level Transform Type (TTFRM) syntax element that follows. If TTMBF=0, the transform type may vary throughout the frame and is signaled at the macroblock or block levels.

Frame-Level Transform Type (TTFRM) (2 Bits)

This syntax element is present in P-frames and B-frames if VSTRANSFORM=1 and TTMBF=1. TTFRM signals the transform type used to transform the 8×8 pixel error signal in predicted blocks. The 8×8 error blocks may be transformed using an 8×8 transform, two 8×4 transforms, two 4×8 transforms or four 4×4 transforms.

3. Selected Macroblock Layer Elements

FIG. 31 is a diagram showing a macroblock-level bitstream syntax for macroblocks interlaced P-frames in the combined implementation. Specific bitstream elements are described below. Data for a macroblock consists of a macroblock header followed by block layer data. Bitstream elements in the macroblock layer for interlaced P-frames (e.g., SKIPMBBIT) may potentially be present for macroblocks in other interlaced pictures (e.g., interlaced B-frames, etc.)

Skip MB Bit (SKIPMBBIT) (1 Bit)

SKIPMBBIT is a 1-bit syntax element present in interlaced P-frame macroblocks and interlaced B-frame macroblocks if the frame-level syntax element SKIPMB indicates that raw mode is used. If SKIPMBBIT=1, the macroblock is skipped. SKIPMBBIT also may be labeled as SKIPMB at the macroblock level.

Macroblock Mode (MBMODE) (Variable Size)

MBMODE is a variable-size syntax element that jointly specifies macroblock type (e.g., 1MV, 2 Field MV, 4 Field MV, 4 Frame MV or Intra), field/frame coding type (e.g., field, frame, or no coded blocks), and the presence of differential motion vector data for 1MV macroblocks. MBMODE is explained in detail below and in Section IV above.

2MV Block Pattern (2MVBP) (Variable Size)

2MVBP is a variable-sized syntax element present in interlaced P-frame and interlaced B-frame macroblocks. In interlaced P-frame macroblocks, 2MVBP is present if MBMODE indicates that the macroblock has two field motion vectors. In this case, 2MVBP indicates which of the 2 luma blocks contain non-zero motion vector differentials.

4MV Block Pattern (4MVBP) (Variable Size)

4MVBP is a variable-sized syntax element present in interlaced P-field, interlaced B-field, interlaced P-frame and interlaced B-frame macroblocks. In interlaced P-frame, 4MVBP is present if MBMODE indicates that the macroblock has four motion vectors. In this case, 4MVBP indicates which of the four luma blocks contain non-zero motion vector differentials.

Field Transform Flag (FIELDTX) (1 Bit)

FIELDTX is a 1-bit syntax present in interlaced B-frame intra-coded macroblocks. This syntax element indicates whether a macroblock is frame or field coded (basically, the internal organization of the macroblock). FIELDTX=1 indicates that the macroblock is field-coded. Otherwise, the macroblock is frame-coded. In inter-coded macroblocks, this syntax element can be inferred from MBMODE as explained in detail below and in Section IV above.

CBP Present Flag (CBPPRESENT) (1 Bit)

CBPPRESENT is a 1-bit syntax present in intra-coded macroblocks in interlaced P-frames and interlaced B-frames. If CBPPRESENT is 1, the CBPCY syntax element is present for that macroblock and is decoded. If CBPPRESENT is 0, the CBPCY syntax element is not present and shall be set to zero.

Coded Block Pattern (CBPCY) (Variable Size)

CBPCY is a variable-length syntax element indicates the transform coefficient status for each block in the macroblock. CBPCY decodes to a 6-bit field which indicates whether coefficients are present for the corresponding block. For intra-coded macroblocks, a value of 0 in a particular bit position indicates that the corresponding block does not contain any non-zero AC coefficients. A value of 1 indicates that at least one non-zero AC coefficient is present. The DC coefficient is still present for each block in all cases. For inter-coded macroblocks, a value of 0 in a particular bit position indicates that the corresponding block does not contain any non-zero coefficients. A value of 1 indicates that at least one non-zero coefficient is present. For cases where the bit is 0, no data is encoded for that block.

Motion Vector Data (MVDATA) (Variable Size)

MVDATA is a variable sized syntax element that encodes differentials for the motion vector(s) for the macroblock, the decoding of which is described in detail in below.

MB-Level Transform Type (TTMB) (Variable Size)

TTMB is a variable-size syntax element in P-picture and B-picture macroblocks when the picture layer syntax element TTMBF=0. TTMB specifies a transform type, transform type signal level, and subblock pattern.

B. Decoding Interlaced P-Frames

A process for decoding interlaced P-frames in a combined implementation is described below.

1. Macroblock Layer Decoding of Interlaced P-Frames

In an interlaced P-frame, each macroblock may be motion compensated in frame mode using one or four motion vectors or in field mode using two or four motion vectors. A macroblock that is inter-coded does not contain any intra blocks. In addition, the residual after motion compensation may be coded in frame transform mode or field transform mode. More specifically, the luma component of the residual is re-arranged according to fields if it is coded in field transform mode but remains unchanged in frame transform mode, while the chroma component remains the same. A macroblock may also be coded as intra.

Motion compensation may be restricted to not include four (both field/frame) motion vectors, and this is signaled through 4MVSWITCH. The type of motion compensation and residual coding is jointly indicated for each macroblock through MBMODE and SKIPMB. MBMODE employs a different set of tables according to 4MVSWITCH.

Macroblocks in interlaced P-frames are classified into five types: 1MV, 2 Field MV, 4 Frame MV, 4 Field MV, and Intra. These five types are described in further detail in above in Section III. The first four types of macroblock are inter-coded while the last type indicates that the macroblock is intra-coded. The macroblock type is signaled by the MBMODE syntax element in the macroblock layer along with the skip bit. (A skip condition for the macroblock also can be signaled at frame level in a compressed bit plane.) MBMODE jointly encodes macroblock types along with various pieces of information regarding the macroblock for different types of macroblock.

Skipped Macroblock Signaling

The macroblock-level SKIPMBBIT field indicates the skip condition for a macroblock. (Additional detail regarding skip conditions and corresponding signaling is provided in Section IV, above.) If the SKIPMBBIT field is 1, then the current macroblock is said to be skipped and there is no other information sent after the SKIPMBBIT field. (At frame level, the SKIPMB field indicates the presence of SKIPMBBIT at macroblock level (in raw mode) or stores skip information in a compressed bit plane. The decoded bitplane contains one bit per macroblock and indicates the skip condition for each respective macroblock.) The skip condition implies that the current macroblock is 1MV with zero differential motion vector (i.e. the macroblock is motion compensated using its 1MV motion predictor) and there are no coded blocks (CBP=0). In an alternative combined implementation, the residual is assumed to be frame-coded for loop filtering purposes.

On the other hand, if the SKIPMB field is not 1, the MBMODE field is decoded to indicate the type of macroblock and other information regarding the current macroblock, such as information described in the following section.

Macroblock Mode Signaling

MBMODE jointly specifies the type of macroblock (1MV, 4 Frame MV, 2 Field MV, 4 Field MV, or intra), types of transform for inter-coded macroblock (i.e. field or frame or no coded blocks), and whether there is a differential motion vector for a 1MV macroblock. (Additional detail regarding signaling of macroblock information is provided in Section IV, above.) MBMODE can take one of 15 possible values:

Let <MVP> denote the signaling of whether a nonzero 1MV differential motion vector is present or absent. Let <Field/Frame transform> denote the signaling of whether the residual of the macroblock is (1) frame transform coded; (2) field transform coded; or (3) zero coded blocks (i.e. CBP=0). MBMODE signals the following information jointly:

MBMODE={<1MV, MVP, Field/Frame transform>, <2 Field MV, Field/Frame transform>, <4 Frame MV, Field/Frame transform>, <4 Field MV, Field/Frame transform>, <INTRA>};

The case <1MV, MVP=0, CBP=0>, is not signaled by MBMODE, but is signaled by the skip condition.

For inter-coded macroblocks, the CBPCY syntax element is not decoded when <Field/frame Transform> in MBMODE indicates no coded blocks. On the other hand, if <Field/frame Transform> in MBMODE indicates field or frame transform, then CBPCY is decoded. The decoded <Field/frame Transform> is used to set the flag FIELDTX. If it indicates that the macroblock is field transform coded, FIELDTX is set to 1. If it indicates that the macroblock is frame transform coded, FIELDTX is set to 0. If it indicates a zero-coded block, FIELDTX is set to the same type as the motion vector, i.e., FIELDTX is set to 1 if it is a field motion vector and to 0 if it is a frame motion vector.

For non-1MV inter-coded macroblocks, an additional field is sent to indicate which of the differential motion vectors is non-zero. In the case of 2 Field MV macroblocks, the 2MVBP field is sent to indicate which of the two motion vectors contain nonzero differential motion vectors. Similarly, the 4MVBP field is sent to indicate which of the four motion vectors contain nonzero differential motion vectors.

For intra-coded macroblocks, the Field/Frame transform and zero coded blocks are coded in separate fields.

2. Motion Vector Decoding for Interlaced P-Frames

Motion Vector Predictors for Interlaced P-Frames

The process of computing the motion vector predictor(s) for the current macroblock consists of two steps. First, three candidate motion vectors for the current macroblock are gathered from its neighboring macroblocks. Second, the motion vector predictor(s) for the current macroblock is computed from the set of candidate motion vectors. FIGS. 24A-24B show neighboring macroblocks from which the candidate motion vectors are gathered. The order of the collection of candidate motion vectors is important. In this combined implementation, the order of collection always starts at A, proceeds to B, and ends at C. A predictor candidate is considered to be non-existent if the corresponding block is outside the frame boundary or if the corresponding block is part of a different slice. Thus, motion vector prediction is not performed across slice boundaries.

The following sections describe how the candidate motion vectors are collected for different types of macroblocks and how the motion vector predictors are computed.

1MV Candidate Motion Vectors

In this combined implementation, the pseudo-code 3200 in FIG. 32 is used to collect the up to three candidate motion vectors for the motion vector.

4 Frame MV Candidate Motion Vectors

For 4 Frame MV macroblocks, for each of the four frame block motion vectors in the current macroblock, the candidate motion vectors from the neighboring blocks are collected. In this combined implementation, the pseudo-code 3300 in FIG. 33 is used to collect the up to three candidate motion vectors for the top left frame block motion vector. The pseudo-code 3400 in FIG. 34 is used to collect the up to three candidate motion vectors for the top right frame block motion vector. The pseudo-code 3500 in FIG. 35 is used to collect the up to three candidate motion vectors for the bottom left frame block motion vector. The pseudo-code 3600 in FIG. 36 is used to collect the up to three candidate motion vectors for the bottom right frame block motion vector.

2 Field MV Candidate Motion Vectors

For 2 Field MV macroblocks, for each of the two field motion vectors in the current macroblock, the candidate motion vectors from the neighboring blocks are collected. The pseudo-code 3700 in FIG. 37 is used to collect the up to three candidate motion vectors for the top field motion vector.

The pseudo-code 3800 in FIG. 38 is used to collect the up to three candidate motion vectors for the bottom field motion vector.

4 Field MV Candidate Motion Vectors

For 4 Field MV macroblocks, for each of the four field blocks in the current macroblock, the candidate motion vectors from the neighboring blocks are collected. The pseudo-code 3900 in FIG. 39 is used to collect the up to three candidate motion vectors for the top left field block motion vector. The pseudo-code 4000 in FIG. 40 is used to collect the up to three candidate motion vectors for the top right field block motion vector. The pseudo-code 4100 in FIG. 41 is used to collect the up to three candidate motion vectors for the bottom left field block motion vector. The pseudo-code 4200 in FIG. 42 is used to collect the up to three candidate motion vectors for the bottom right field block motion vector.

Average Field Motion Vectors

Given two field motion vectors $(MVX_1, MVY_1)$ and $(MVX_2, MVY_2)$, the average operation used to form a candidate motion vector $(MVX_A, MVY_A)$ is:

$$MVX_A = (MVX_1 + MVX_2 + 1) >> 1;$$

$$MVY_A = (MVY_1 + MVY_2 + 1) >> 1;$$

Computing Frame MV Predictors from Candidate Motion Vectors

This section describes how motion vector predictors are calculated for frame motion vectors given a set of candidate motion vectors. In this combined implementation, the operation is the same for computing the predictor for 1MV or for each one of the four frame block motion vectors in 4 Frame MV macroblocks.

The pseudo-code 4300 in FIG. 43 describes how the motion vector predictor $(PMV_x, PMV_y)$ is computed for frame motion vectors. In the pseudo-code 4300, TotalValidMV denotes the total number of motion vectors in the set of candidate motion vectors (TotalValidMV=0, 1, 2, or 3), and the ValidMV array denotes the motion vector in the set of candidate motion vectors.

Computing Field MV Predictors from Candidate Motion Vectors

This section describes how motion vector predictors are computed for field motion vectors given the set of candidate motion vectors. In this combined implementation, the operation is the same for computing the predictor for each of the two field motion vectors in 2 Field MV macroblocks or for each of the four field block motion vectors in 4 Field MV macroblocks.

First, the candidate motion vectors are separated into two sets, where one set contains only candidate motion vectors that point to the same field as the current field and the other set contains candidate motion vectors that point to the opposite field. Assuming that the candidate motion vectors are represented in quarter pixel units, the following check on its y-component verifies whether a candidate motion vector points to the same field:

```
if (ValidMV_y & 4) {
    ValidMV points to the opposite field:
} else {
    ValidMV points to the same field.
}
```

The pseudo-code 4400 in FIG. 44 describes how the motion vector predictor $(PMV_x, PMV_y)$ is computed for field motion vectors. In the pseudo-code 4400, SameFieldMV and OppFieldMV denote the two sets of candidate motion vectors and NumSameFieldMV and NumOppFieldMV denote the number of candidate motion vectors that belong to each set. The order of candidate motion vectors in each set starts with candidate A if it exists, followed by candidate B if it exists, and then candidate C if it exists. For example, if the set SameFieldMV contains only candidate B and candidate C, then SameFieldMV[0] is candidate B.

Decoding Motion Vector Differentials

The MVDATA syntax elements contain motion vector differential information for the macroblock. Depending on the type of motion compensation and motion vector block pattern signaled at each macroblock, there may be from zero to four MVDATA syntax elements per macroblock. More specifically, For 1MV macroblocks, there may be either zero or one MVDATA syntax element present depending on the MVP field in MBMODE.

For 2 Field MV macroblocks, there may be either zero, one, or two MVDATA syntax element(s) present depending on 2MVBP.

For 4 Frame/Field MV macroblocks, there may be either zero, one, two, three, or four MVDATA syntax element(s) present depending on 4MVBP.

In this combined implementation, the motion vector differential is decoded in the same way as a one reference field motion vector differential for interlaced P-fields, without a half-pel mode. (The pseudo-code 4500 in FIG. 45A illustrates how the motion vector differential is decoded for a one-reference field. The pseudo-code 4510 in FIG. 45B illustrates how the motion vector differential is decoded for a one-reference field in an alternative combined implementation. Pseudo-code 4510 decodes motion vector differentials in a different way. For example, pseudo-code 4510 omits handling of extended motion vector differential ranges.)

Reconstructing Motion Vectors

Given the motion vector differential dmv, the luma motion vector is reconstructed by adding the differential to the predictor as follows:

$$mv\_x = (dmv\_x + predictor\_x) \text{ s mod range}\_x$$

$$mv\_y = (dmv\_y + predictor\_y) \text{ s mod range}\_y$$

The s mod operation ensures that the reconstructed vectors are valid. (A s mod b) lies within −b and b−1. range_x and range_y depend on MVRANGE.

Given a luma frame or field motion vector, a corresponding chroma frame or field motion vector is derived to compensate a portion (or potentially all) of the chroma $(C_b/C_r)$ block. The FASTUVMC syntax element is ignored in interlaced P-frames and interlaced B-frames. The pseudo-code 4600 in FIG. 46 describes how a chroma motion vector CMV is derived from a luma motion vector LMV in interlace P-frames.

C. Bitplane Coding

Macroblock-specific binary information such as skip bits may be encoded in one binary symbol per macroblock. For example, whether or not a macroblock is skipped may be signaled with one bit. In these cases, the status for all macroblocks in a field or frame may be coded as a bitplane and transmitted in the field or frame header. One exception for this rule is if the bitplane coding mode is set to Raw Mode, in which case the status for each macroblock is coded as one bit per symbol and transmitted along with other macroblock level syntax elements at the macroblock level.

Field/frame-level bitplane coding is used to encode two-dimensional binary arrays. The size of each array is rowMB×colMB, where rowMB and colMB are the number of macroblock rows and columns, respectively, in the field or frame in question. Within the bitstream, each array is coded as a set of consecutive bits. One of seven modes is used to encode each array. The seven modes are:

1. raw mode—information coded as one bit per symbol and transmitted as part of MB level syntax;
2. normal-2 mode—two symbols coded jointly;
3. differential-2 mode—differential coding of the bitplane, followed by coding two residual symbols jointly;
4. normal-6 mode—six symbols coded jointly;
5. differential-6 mode—differential coding of the bitplane, followed by coding six residual symbols jointly;
6. rowskip mode—one bit skip to signal rows with no set bits; and
7. columnskip mode—one bit skip to signal columns with no set bits.

The syntax elements for a bitplane at the field or frame level are in the following sequence: INVERT, IMODE, and DATABITS.

Invert Flag (INVERT)

The INVERT syntax element is a 1-bit value, which if set indicates that the bitplane has more set bits than zero bits. Depending on INVERT and the mode, the decoder shall invert the interpreted bitplane to recreate the original. Note that the value of this bit shall be ignored when the raw mode is used. Description of how the INVERT value is used in decoding the bitplane is provided below.

Coding Mode (IMODE)

The IMODE syntax element is a variable length value that indicates the coding mode used to encode the bitplane. Table 12 shows the code table used to encode the IMODE syntax element. Description of how the IMODE value is used in decoding the bitplane is provided below.

TABLE 12

IMODE VLC Codetable

| IMODE VLC | Coding mode |
|---|---|
| 10 | Norm-2 |
| 11 | Norm-6 |
| 010 | Rowskip |
| 011 | Colskip |
| 001 | Diff-2 |
| 0001 | Diff-6 |
| 0000 | Raw |

Bitplane Coding Bits (DATABITS)

The DATABITS syntax element is variable sized syntax element that encodes the stream of symbols for the bitplane. The method used to encode the bitplane is determined by the value of IMODE. The seven coding modes are described in the following sections.

Raw Mode

In this mode, the bitplane is encoded as one bit per symbol scanned in the raster-scan order of macroblocks, and sent as part of the macroblock layer. Alternatively, the information is coded in raw mode at the field or frame level and DATABITS is rowMB×colMB bits in length.

Normal-2 Mode

If rowMB×colMB is odd, the first symbol is encoded raw. Subsequent symbols are encoded pairwise, in natural scan order. The binary VLC table in Table 13 is used to encode symbol pairs.

TABLE 13

Norm-2/Diff-2 Code Table

| Symbol 2n | Symbol 2n + 1 | Codeword |
|---|---|---|
| 0 | 0 | 0 |
| 1 | 0 | 100 |
| 0 | 1 | 101 |
| 1 | 1 | 11 |

Diff-2 Mode

The Normal-2 method is used to produce the bitplane as described above, and then the $Diff^{-1}$ operation is applied to the bitplane as described below.

Normal-6 Mode

In the Norm-6 and Diff-6 modes, the bitplane is encoded in groups of six pixels. These pixels are grouped into either 2×3 or 3×2 tiles. The bitplane is tiled maximally using a set of rules, and the remaining pixels are encoded using a variant of row-skip and column-skip modes. 2×3 "vertical" tiles are used if and only if rowMB is a multiple of 3 and colMB is not. Otherwise, 3×2 "horizontal" tiles are used. FIG. 47A shows a simplified example of 2×3 "vertical" tiles. FIGS. 47B and 47C show simplified examples of 3×2 "horizontal" tiles for which the elongated dark rectangles are 1 pixel wide and encoded using row-skip and column-skip coding. For a plane tiled as shown in FIG. 47C, with linear tiles along the top and left edges of the picture, the coding order of the tiles follows the following pattern. The 6-element tiles are encoded first, followed by the column-skip and row-skip encoded linear tiles. If the array size is a multiple of 2×3 or of 3×2, the latter linear tiles do not exist and the bitplane is perfectly tiled.

The 6-element rectangular tiles are encoded using an incomplete Huffman code, i.e., a Huffman code which does not use all end nodes for encoding. Let N be the number of set bits in the tile, i.e. $0 \leq N \leq 6$. For N <3, a VLC is used to encode the tile. For N=3, a fixed length escape is followed by a 5 bit fixed length code, and for N>3, a fixed length escape is followed by the code of the complement of the tile. The rectangular tile contains 6 bits of information. Let k be the code associated with the tile, where $k=b_i 2^i$, $b_i$ is the binary value of the $i^{th}$ bit in natural scan order within the tile. Hence $0 \leq k < 64$. A combination of VLCs and escape codes please fixed length codes is used to signal k.

Diff-6 Mode

The Normal-6 method is used to produce the bitplane as described above, and then the $Diff^{-1}$ operation is applied to the bitplane as described below.

Rowskip Mode

In the rowskip coding mode, all-zero rows are skipped with one bit overhead. The syntax is as follows: for each row, a single ROWSKIP bit indicates if the row is skipped; if the row is skipped, the ROWSKIP bit for the next row is next; otherwise (the row is not skipped), ROWBITS bits (a bit for each macroblock in the row) are next. Thus, if the entire row is zero, a zero bit is sent as the ROWSKIP symbol, and ROWBITS is skipped. If there is a set bit in the row, ROWSKIP is set to 1, and the entire row is sent raw (ROWBITS). Rows are scanned from the top to the bottom of the field or frame.

Columnskip Mode

Columnskip is the transpose of rowskip. Columns are scanned from the left to the right of the field or frame.

Diff$^{-1}$::Inverse Differential Decoding

If either differential mode (Diff-2 or Diff-6) is used, a bitplane of "differential bits" is first decoded using the corresponding normal modes (Norm-2 or Norm-6 respectively). The differential bits are used to regenerate the original bitplane. The regeneration process is a 2-D DPCM on a binary alphabet. In order to regenerate the bit at location (i, j), the predictor $b_p(i,j)$ is generated as follows (from bits b(i, j) at positions (i, j)):

$$b_p(i, j) = \begin{cases} A & i = j = 0, \text{ or } b(i, j-1) \neq b(i-1, j) \\ b(0, j-1) & i = 0 \\ b(i-1, j) & \text{otherwise} \end{cases}$$

For the differential coding mode, the bitwise inversion process based on INVERT is not performed. However, the INVERT flag is used in a different capacity to indicate the value of the symbol A for the derivation of the predictor shown above. More specifically, A equal to 0 if INVERT equals to 0 and A equals to 1 if INVERT equals to 1. The actual value of the bitplane is obtained by xor'ing the predictor with the decoded differential bit value. In the above equation, b(i,j) is the bit at the i,jth position after final decoding (i.e. after doing Norm-2/Norm-6, followed by differential xor with its predictor).

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. In a computing device that implements a video encoder, a method of encoding video, the method comprising:
    with the computing device that implements the video encoder, encoding an interlaced P-frame to produce encoded information, including:
        selecting a variable length code table from among multiple available variable length code tables, wherein the multiple available variable length code tables include a first set of tables used when four-motion-vector coding is enabled for the interlaced P-frame and a second set of tables used when four-motion-vector coding is not enabled for the interlaced P-frame;
        selecting a motion compensation type for a macroblock in the interlaced P-frame;
        selecting a field/frame coding type for the macroblock; and
        jointly encoding the motion compensation type and the field/frame coding type for the macroblock using the selected variable length code table, in which plural different variable length codes represent plural different combinations of values for the motion compensation type and the field/frame coding type, wherein the plural different variable length codes vary in size in relation to respective likelihoods of the plural different combinations of values; and
    outputting, from the computing device that implements the video encoder, the encoded information in a bit stream, wherein the outputting comprises signaling in the bit stream a code table selection syntax element, and wherein the code-table selection syntax element indicates a selection among the first set of tables or indicates a selection among the second set of tables.

2. The method of claim 1 wherein the jointly encoding further encodes other information for the macroblock with the motion compensation type and the field/frame coding type as part of the plural different combinations of values.

3. The method of claim 2 wherein the other information for the macroblock comprises an indicator of presence of a differential motion vector for the macroblock.

4. The method of claim 1 wherein the jointly encoding further encodes an indicator of presence or absence of a differential motion vector for the macroblock with the motion compensation type and the field/frame coding type, wherein the macroblock is a one-motion-vector macroblock.

5. The method of claim 1 wherein the motion compensation type is selected from a group consisting of: 1MV, 4 Frame MV, 2 Field MV, or 4 Field MV.

6. The method of claim 1 wherein the field/frame coding type is selected from a group consisting of: field transform, frame transform, or no coded blocks.

7. In a computing device that implements a video decoder, a method of decoding video, the method comprising:
    receiving, at the computing device that implements the video decoder, encoded information for an interlaced P-frame from a bit stream, including:
        receiving a code table selection syntax element from the bit stream; and
        receiving macroblock information for a macroblock in the interlaced P-frame, the macroblock information including a joint code representing motion compensation type and field/frame coding type for the macroblock; and
    with the computing device that implements the video decoder, decoding the interlaced P-frame, including:
        selecting a variable length code table from among multiple available variable length code tables based at least in part upon the code table selection syntax element, wherein the multiple available variable length code tables include a first set of tables used when four-motion-vector coding is enabled for the interlaced P-frame and a second set of tables used when four-motion-vector coding is not enabled for the interlaced P-frame, and wherein the code-table selection syntax element indicates a selection among the first set of tables or indicates a selection among the second set of tables; and
        decoding the joint code to obtain both the motion compensation type and the field/frame coding type for the macroblock using the selected variable length code table, in which plural different variable length codes represent plural different combinations of values for the motion compensation type and the field/frame coding type, wherein the plural different variable length codes vary in size in relation to respective likelihoods of the plural different combinations of values, and wherein the joint code is one of the plural different variable length codes in the variable length code table.

8. The method of claim 7 wherein the decoding the joint code comprises looking up the joint code in the variable length code table.

9. The method of claim 7 wherein the joint code further represents other information for the macroblock as part of one of the plural different combinations of values.

10. The method of claim 9 wherein the other information for the macroblock comprises an indicator of presence of a differential motion vector for the macroblock.

11. The method of claim 7 wherein the joint code further represents, as part of one of the plural different combinations of values, an indicator of presence of a differential motion vector forte macroblock, wherein the macroblock is a one-motion-vector macroblock.

12. The method of claim 7 wherein the motion compensation type is selected from a group comprising: 1MV, 4 Frame MV, 2 Field MV, or 4 Field MV.

13. The method of claim 7 wherein the field/frame coding type is selected from a group comprising: field transform, frame transform, or no coded blocks.

14. The method of claim 1 wherein the joint encoding further indicates whether or not a coded block pattern syntax element is present in the bit stream for the macroblock.

15. The method of claim 1 wherein at least one of the plural different combinations indicates the macroblock uses field motion vectors and frame transform coding of residual blocks, and wherein at least one of the plural different combinations indicates the macroblock uses a frame motion vector and field transform coding of residual blocks.

16. The method of claim 7 wherein the decoding the joint code indicates whether or not a coded block pattern syntax element is present in the bit stream for the macroblock.

17. The method of claim 7 wherein at least one of the plural different combinations indicates the macroblock uses field motion vectors and frame transform coding of residual blocks, and wherein at least one of the plural different combinations indicates the macroblock uses a frame motion vector and field transform coding of residual blocks.

18. A computing device that implements a video encoder, the computing device comprising:
a processor;
memory;
at least one input device, output device or communication connection; and
storage storing computer-executable instructions for causing the computing device to perform a method comprising:
encoding an interlaced P-frame to produce encoded information, including:
selecting a variable length code table from among multiple available variable length code tables, wherein the multiple available variable length code tables include a first set of tables used when four-motion-vector coding is enabled for the interlaced P-frame and a second set of tables used when four-motion-vector coding is not enabled for the interlaced P-frame;
selecting a motion compensation type for a macroblock in the interlaced P-frame;
selecting a field/frame coding type for the macroblock; and
jointly encoding the motion compensation type and the field/frame coding type for the macroblock using the selected variable length code table, in which plural different variable length codes represent plural different combinations of values for the motion compensation type and the field/frame coding type, wherein the plural different variable length codes vary in size in relation to respective likelihoods of the plural different combinations of values; and
outputting the encoded information in a bit stream, wherein the outputting comprises signaling in the bit stream a code table selection syntax element, and wherein the code-table selection syntax element indicates a selection among the first set of tables or indicates a selection among the second set of tables.

19. The computing device of claim 18 wherein the jointly encoding the motion compensation type and the field/frame coding type further comprises jointly encoding an indicator of presence of a differential motion vector for the macroblock with the motion compensation type and the field/frame coding type.

20. The computing device of claim 18 wherein the motion compensation type is selected from a group consisting of 1MV, 4 Frame MV, 2 Field MV, and 4 Field MV, and wherein the field/frame coding type is selected from a group consisting of field transform, frame transform, and no coded blocks.

21. The computing device of claim 18 wherein at least one of the plural different combinations indicates the macroblock uses field motion vectors and frame transform coding of residual blocks, and wherein at least one of the plural different combinations indicates the macroblock uses a frame motion vector and field transform coding of residual blocks.

22. A computing device that implements a video decoder, the computing device comprising:
a processor;
memory;
at least one input device, output device or communication connection; and
storage storing computer-executable instructions for causing the computing device to perform a method comprising:
receiving encoded information for an interlaced P-frame from a bit stream, including:
receiving a code table selection syntax element from the bit stream; and
receiving macroblock information for a macroblock in the interlaced P-frame, the macroblock information including a joint code representing motion compensation type and field/frame coding type for the macroblock; and
decoding the interlaced P-frame, including:
selecting a variable length code table from among multiple available variable length code tables based at least in part upon the code table selection syntax element, wherein the multiple available variable length code tables include a first set of tables used when four-motion-vector coding is enabled for the interlaced P-frame and a second set of tables used when four-motion-vector coding is not enabled for the interlaced P-frame, and wherein the code-table selection syntax element indicates a selection among the first set of tables or indicates a selection among the second set of tables; and
decoding the joint code to obtain both the motion compensation type and the field/frame coding type for the macroblock using the selected variable length code table, in which plural different variable length codes represent plural different combinations of values for the motion compensation type and the field/frame coding type, wherein the plural different variable length codes vary in size in relation to respective likelihoods of the plural different combinations of values, and wherein the joint code is one of the plural different variable length codes in the variable length code table.

23. The computing device of claim 22 wherein the joint code further represents an indicator of presence of a differential motion vector for the macroblock.

24. The computing device of claim 22 wherein the motion compensation type is selected from a group consisting of 1MV, 4 Frame MV, 2 Field MV, and 4 Field MV, and wherein the field/frame coding type is selected from a group consisting of field transform, frame transform, and no coded blocks.

25. The computing device of claim 22 wherein at least one of the plural different combinations indicates the macroblock uses field motion vectors and frame transform coding of residual blocks, and wherein at least one of the plural different combinations indicates the macroblock uses a frame motion vector and field transform coding of residual blocks.

* * * * *

UNITED STATES PATENT AND TRADEMARK OFFICE
CERTIFICATE OF CORRECTION

PATENT NO. : 7,606,311 B2
APPLICATION NO. : 10/934929
DATED : October 20, 2009
INVENTOR(S) : Hsu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1386 days.

Signed and Sealed this

Fifth Day of October, 2010

David J. Kappos
*Director of the United States Patent and Trademark Office*